US012798383B2

(12) United States Patent
Kring et al.

(10) Patent No.: US 12,798,383 B2
(45) **Date of Patent: *Nov. 17, 2026**

(54) COMPONENT FOR VEHICLE INTERIOR

(71) Applicant: Yanfeng International Automotive Technology Co., Ltd., Novi, MI (US)

(72) Inventors: Christopher Kring, Holland, MI (US); Dale Todd Glynn, Holland, MI (US); Scott Allen Hansen, Holland, MI (US)

(73) Assignee: Yanfeng International Automotive Technology Co., Ltd., Novi, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/189,434

(22) Filed: Apr. 25, 2025

(65) Prior Publication Data

US 2025/0262938 A1 Aug. 21, 2025

Related U.S. Application Data

(63) Continuation of application No. 18/623,148, filed on Apr. 1, 2024, now Pat. No. 12,296,683, which is a (Continued)

(51) Int. Cl.
*B60K 35/50* (2024.01)
*B32B 3/30* (2006.01)
(Continued)

(52) U.S. Cl.
CPC ................ *B60K 35/50* (2024.01); *B32B 3/30* (2013.01); *B32B 27/08* (2013.01); *B60K 35/10* (2024.01); *B60K 35/22* (2024.01); *B60K 35/25* (2024.01); *B60Q 3/14* (2017.02); *B60Q 3/62* (2017.02); *B60R 13/02* (2013.01); (Continued)

(58) Field of Classification Search
CPC ........ B60K 35/10; B60K 35/22; B60K 35/25; B60K 2360/143; B60Q 3/14; B60Q 3/62; B32B 3/30; B32B 27/08; B32B 2307/41; B32B 2457/208; B32B 2605/003; B60R 13/02
See application file for complete search history.

(56) References Cited

U.S. PATENT DOCUMENTS

2009/0301852 A1* 12/2009 Keist ...................... B60K 35/10 200/341

* cited by examiner

*Primary Examiner* — Deeprose Subedi
(74) *Attorney, Agent, or Firm* — Amin, Turocy & Watson, LLP

(57) ABSTRACT

A component for a vehicle interior configured to present a user interface is disclosed. The component may comprise a composite structure comprising a cover structure; the user interface may comprise an input device and an output device; the base structure may support the cover structure; the cover structure may comprise a cover layer and a cover base; the input device may comprise a sensor; the output device may comprise a light. The cover base may comprise a core region and a perimeter region. The component may comprise a functional module for the user interface. The cover layer may comprise a compressible material. The cover layer may be molded on the cover base. The cover layer may comprise a projection fit within a recess in the cover base. The cover layer may comprise light-transmissive material; the cover base may comprise opaque material. The cover structure may comprise a decorative layer.

20 Claims, 25 Drawing Sheets

Related U.S. Application Data continuation of application No. PCT/US2023/081689, filed on Nov. 29, 2023.

(60) Provisional application No. 63/428,966, filed on Nov. 30, 2022.

(51) Int. Cl.

| | |
|---|---|
| ***B32B 27/08*** | (2006.01) |
| ***B60K 13/02*** | (2006.01) |
| ***B60K 35/10*** | (2024.01) |
| ***B60K 35/22*** | (2024.01) |
| ***B60K 35/25*** | (2024.01) |
| ***B60Q 3/14*** | (2017.01) |
| ***B60Q 3/62*** | (2017.01) |
| ***B60R 13/02*** | (2006.01) |

(52) U.S. Cl.

CPC ..... *B32B 2307/41* (2013.01); *B32B 2457/208* (2013.01); *B32B 2605/003* (2013.01); *B60K 2360/143* (2024.01); *B60K 2360/693* (2024.01); *B60R 2013/0287* (2013.01)

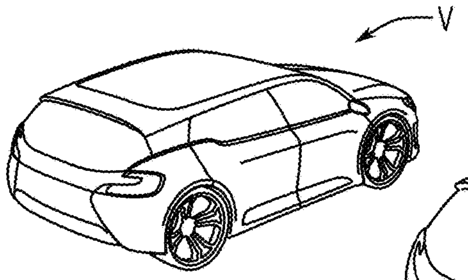
FIG. 1A
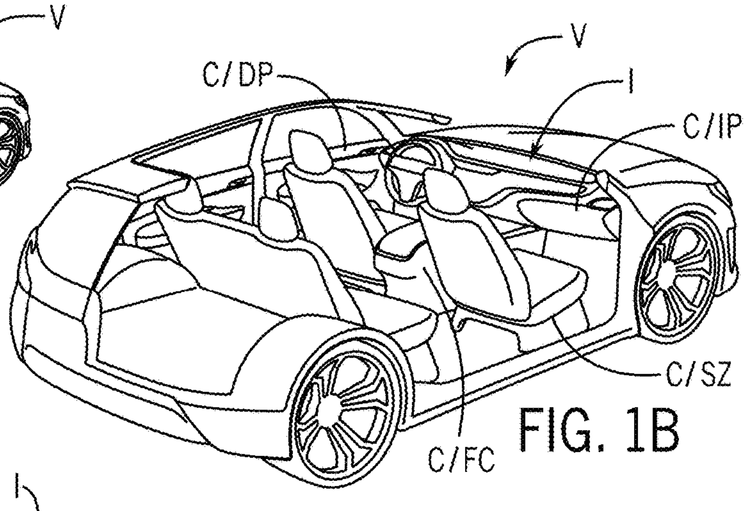
FIG. 1B
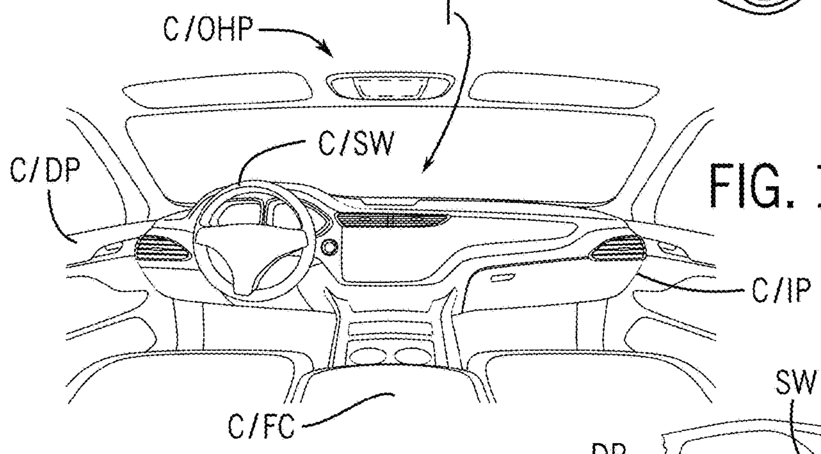
FIG. 1C
FIG. 1D
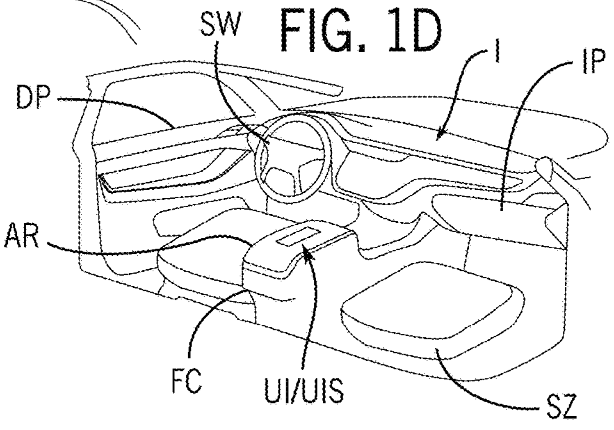
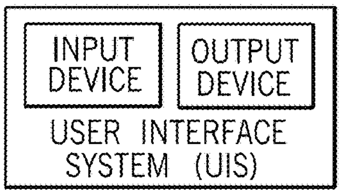
FIG. 2
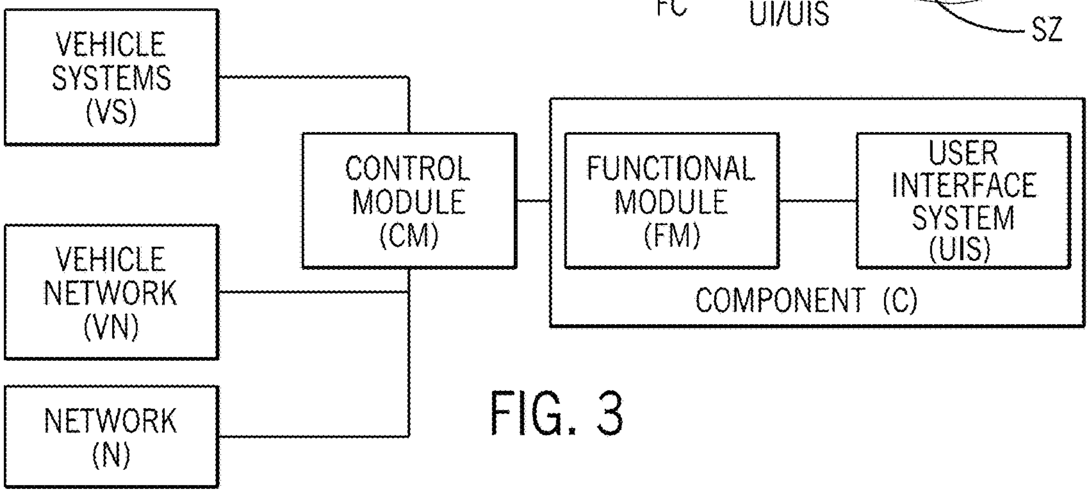
FIG. 3

COMPONENT FOR VEHICLE INTERIOR

CROSS-REFERENCE TO RELATED APPLICATIONS

The present application is a continuation of U.S. patent application Ser. No. 18/623,148 titled "COMPONENT FOR VEHICLE INTERIOR" filed Apr. 1, 2024, which is a continuation of PCT/International Patent Application No. PCT/US2023/81689 titled "COMPONENT FOR VEHICLE INTERIOR" filed Nov. 29, 2023, which claims the benefit of U.S. Provisional Patent Application No. 63/428,966 titled "COMPONENT FOR VEHICLE INTERIOR" filed Nov. 30, 2022.

The present application claims priority to and incorporates by reference in full the following patent applications: (a) U.S. Provisional Patent Application No. 63/428,966 titled "COMPONENT FOR VEHICLE INTERIOR" filed Nov. 30, 2022; (b) PCT/International Patent Application No. PCT/US2023/81689 titled "COMPONENT FOR VEHICLE INTERIOR" filed Nov. 29, 2023; (c) U.S. patent application Ser. No. 18/623,148 titled "COMPONENT FOR VEHICLE INTERIOR" filed Apr. 1, 2024.

FIELD

The present invention relates to a component for a vehicle interior.

The present invention relates to a component for a vehicle interior configured to present a user interface.

BACKGROUND

It is known to provide a component for a vehicle interior providing a user interface.

It would be advantageous to provide an improved component with a cover and comprising a user interface system configured to provide an input device and/or an output device presenting a user interface for a vehicle occupant.

SUMMARY

The present invention relates to a component for a vehicle interior configured to present a user interface comprising a composite structure comprising a base structure and a cover structure and a functional module configured to operate the user interface for the composite structure; the user interface may be configured to comprise an input device and/or an output device; the base structure may be configured to support the cover structure; the cover structure may comprise a cover layer and a cover base; the cover base may comprise a core region and a perimeter region; the functional module may be configured to present the user interface at the cover structure of the composite structure. The functional module may be provided at the base structure of the composite structure. The user interface may comprise the input device and an output device. The input device may comprise a sensor and/or a button and/or a switch. The input device may be integrated with the output device. The input device may comprise an illuminable object and/or the output device may comprise an illuminable object; the illuminable object may comprise an icon and/or a light and/or a light display. The base structure may comprise a carrier and/or a substrate. The cover structure may comprise the cover base and the cover layer and a cover surface; the cover layer may comprise a generally compressible material; the cover base may comprise a generally rigid material. The cover layer may be molded on the cover base. The cover layer may comprise a projection configured to fit within a recess in the cover base. The cover structure may comprise an integrally-formed structure. The cover layer may comprise a light-transmissive material; the cover base may comprise an opaque material. The cover structure may comprise a decorative layer. The decorative layer may comprise an opaque material; the cover layer may comprise a light-transmissive material; the cover base may comprise a light-transmissive material. The cover structure with the core region and the perimeter region may be configured to present the output device of the user interface of the user interface system. The functional module may be configured to operate at least one of a sensor and/or a switch and/or a detector and/or a light display and/or a display panel and/or a control panel and/or a transducer and/or a haptics actuator and/or a haptics transducer.

The present invention relates to a component for a vehicle interior configured to present a user interface comprising a composite structure comprising a cover structure; the user interface may be configured to comprise an input device and output device; the base structure may be configured to support the cover structure; the cover structure may comprise cover layer and a cover base; the input device may comprise a sensor; the output device may comprise a light. The composite structure may comprise a base structure and the cover structure may comprise a cover layer and a cover base. The cover base may comprise a core region and a perimeter region; the input device may comprise a button presented at the core region; the output device may comprise an icon presented at the core region. The component may comprise a user interface system comprising a functional module configured to operate the user interface for the composite structure. The present invention relates to a component for a vehicle interior configured to present a user interface comprising a composite structure comprising a base structure and a cover structure and a functional module configured to operate the user interface for the composite structure; the user interface may be configured to comprise an input device and/or an output device; the base structure may be configured to support the cover structure; the cover structure may comprise a cover layer and a cover base; the cover base may comprise a core region and a perimeter region; the functional module may be configured to present the user interface at the cover structure of the composite structure; the functional module may be provided at the base structure of the composite structure; the user interface may comprise the input device and an output device; the input device may comprise a sensor and/or a button and/or a switch; the input device may be integrated with the output device; the input device may comprise an illuminable object; the output device may comprise an illuminable object; the illuminable object may comprise an icon and/or a light and/or a light display; the output device may comprise a light; the light may comprise a light display; the light display may comprise an icon; the light may comprise an LED light; the base structure may comprise a carrier and/or a substrate; the base structure may comprise a functional module structure under the cover base comprising a functional module configured to operate the user interface; the cover structure may comprise the cover base and a cover layer and a cover surface; the cover layer may comprise a generally compressible material; the cover base may comprise a generally rigid material; the cover structure may be configured to provide the user interface; the functional module may be configured with or to operate at least one of a sensor or a switch or a detector or a light display or a display panel or a control panel or a transducer or a haptics actuator or a haptics transducer; the cover layer may comprise a light-transmissive material; the cover base may comprise an opaque material; the cover layer may be configured to transmit light from the light source between the core of the cover base and the perimeter of the cover base; the cover structure with the core and the perimeter may be configured to present the output device of the user interface of the user interface system; the composite structure may comprise a base structure configured to support the cover structure; the base structure may comprise a functional module structure under the cover base comprising a functional module configured to present the user interface; the cover structure may comprise a decorative layer on the cover layer; the decorative layer may provide the cover surface; the decorative layer may be configured to present the input device at the cover surface; the decorative layer may comprise an opaque material; the cover layer may comprise a light-transmissive material; the cover base may comprise a light-transmissive material; the cover layer may be molded on the cover base; the cover base may comprise an aperture; the cover layer may be molded in the aperture of the cover base; the cover layer may comprise a projection configured to fit within a recess in the cover base; the cover layer may be configured to deform between the core of the cover base and the perimeter of the cover base; the cover layer may comprise a feature; the feature may be configured to provide the input device for the user interface; the cover layer may provide the cover surface; the cover layer may comprise at least one of (a) a raised feature; (b) a depression; (c) an icon; the cover structure may comprise an integrally-formed structure; the user interface system may be configured to present the user interface at the cover surface comprising the input device; the cover surface may comprise a surface of the core of the cover base projecting above a surface of the cover layer; the cover layer may comprise a projection configured to fit within a recess in the cover base; the cover layer may be configured to deform between the core of the cover base and the perimeter of the cover base; the user interface system may be configured to present the user interface at the cover surface comprising (a) an output device comprising a light display configured to transmit light from a light source and (b) an input device.

The present invention relates to a component for a vehicle interior configured to present a user interface comprising a composite structure comprising a cover structure; the user interface may be configured to comprise an input device and output device; the base structure may be configured to support the cover structure; the cover structure may comprise a cover layer and a cover base; the input device may comprise a sensor; the output device may comprise a light; the composite structure may comprise a base structure; the cover structure may comprise a cover layer and a cover base; the cover base may comprise a core region and a perimeter region; the input device may comprise a button presented at the core region; the output device may comprise an icon presented at the core region; the component may further comprise a user interface system comprising a functional module configured to operate the user interface for the composite structure; the cover structure may comprise a decorative layer on the cover layer; the decorative layer may provide the cover surface; the decorative layer may be configured to present the input device at the cover surface; the decorative layer may comprise an opaque material; the cover layer may comprise a light-transmissive material; the cover base may comprise a light-transmissive material.

The present invention relates to a component for a vehicle interior configured to present a user interface comprising a composite structure comprising a cover structure comprising a cover base, a cover layer and a cover surface; and a user interface system configured to present the user interface at the cover surface comprising (a) an output device comprising a light display configured to transmit light from a light source and (b) an input device; the cover structure is configured to provide the user interface; the user interface may comprise the output device and the input device; the cover layer may be configured to cover at least a portion of the cover base; the cover base of the cover structure may comprise a core and a perimeter; the cover layer may comprise a light-transmissive material; the cover base may comprise an opaque material; the cover layer may be configured to transmit light from the light source between the core of the cover base and the perimeter of the cover base; the cover structure with the core and the perimeter may be configured to present the output device of the user interface of the user interface system; the composite structure may comprise a base structure configured to support the cover structure; the base structure may comprise a functional module structure under the cover base comprising a functional module configured to present the user interface; the cover layer may be configured to form an illuminated border around the core of the cover base; the cover layer may be configured to deform between the core of the cover base and the perimeter of the cover base; the cover structure may comprise an integrally-formed structure.

The present invention relates to a component for a vehicle interior configured to present a user interface comprising a composite structure comprising a cover structure comprising a cover base, a cover layer and a cover surface; and a user interface system configured to present the user interface at the cover surface comprising (a) an output device comprising an actuator configured to provide feedback at the cover surface and (b) an input device; the cover structure may be configured to provide the user interface; the user interface may comprise the output device and the input device; the cover layer may be configured to cover at least a portion of the cover base; the cover base of the cover structure may comprise a core and a perimeter; the actuator may be configured to deform the cover layer between the core of the cover base and the perimeter of the cover base; the cover structure with the core and the perimeter may be configured to present the output device of the user interface of the user interface system; the composite structure may comprise a base structure configured to support the cover structure; the base structure may comprise a functional module structure under the cover base comprising a functional module configured to present the user interface; the user interface system may comprise a light display configured to transmit light from a light source; the cover layer may provide the cover surface; the cover layer may comprise at least one of (a) a raised feature; (b) a depression; (c) an icon; the cover structure may comprise an integrally-formed structure.

The present invention relates to a component for a vehicle interior configured to present a user interface comprising a composite structure comprising a cover structure comprising a cover base, a cover layer and a cover surface; and a user interface system configured to present the user interface at the cover surface comprising (a) an output device comprising an actuator configured to provide feedback at the cover surface and (b) an input device; the cover structure may be configured to provide the user interface; the user interface may comprise the output device and the input device; the cover layer may be configured to cover at least a portion of the cover base; the cover base of the cover structure may comprise a core and a perimeter; the cover layer may be configured to transmit light from a light source between the core of the cover base and the perimeter of the cover base; the cover structure with the core and the perimeter may be configured to present the output device of the user interface of the user interface system; the composite structure may comprise a base structure configured to support the cover structure; the base structure may comprise a functional module structure under the cover base comprising a functional module configured to present the user interface; the cover layer may comprise a projection configured to fit within a recess in the cover base; the cover layer may comprise a feature; the feature may be configured to provide the input device for the user interface; the cover layer may be molded on the cover base.

The present invention relates to a component for a vehicle interior configured to present a user interface comprising: a composite structure comprising a cover structure comprising a cover base, a cover layer and a cover surface; a user interface system configured to present the user interface at the cover surface comprising (a) an output device comprising an actuator configured to provide feedback at the cover surface and (b) an input device, and a light guide; the cover structure may be configured to provide the user interface; the user interface may comprise the output device and the input device; the cover layer may be configured to cover at least a portion of the cover base; the cover base of the cover structure may comprise a core and a perimeter; the light guide may be configured to transmit light from a light source to the core of the cover base; the light guide may be configured to transmit at least one of (a) a force from the actuator to the cover surface; (b) vibration from the actuator to the cover surface; and/or (c) motion from the actuator to the cover surface;

the cover structure with the core and the perimeter may be configured to present the output device of the user interface of the user interface system; the composite structure may comprise a base structure configured to support the cover structure; the base structure may comprise a functional module structure under the cover base comprising a functional module configured to present the user interface; the component may comprise a sensor between the light guide and the core of the cover base; the sensor may comprise at least one of (a) a capacitive sensor; (b) a touch sensor; the actuator may be coupled to the core of the cover base.

The present invention relates to a component for a vehicle interior configured to present a user interface comprising a composite structure comprising a cover structure comprising a cover base, a cover layer and a cover surface; and a user interface system for the cover structure configured to present the user interface; the cover structure may be configured to provide the user interface; the user interface may comprise an output device and an input device; the cover layer may be configured to cover at least a portion of the cover base; the cover base of the cover structure may comprise a core and a perimeter; the user interface system may comprise the output device comprising a haptics system comprising a transducer and an actuator; the user interface system may be actuated by the input device; the cover structure with the core and the perimeter may be configured to present the output device and the input device of the user interface of the user interface system; the composite structure may comprise a base structure configured to support the cover structure;

the base structure may comprise a functional module structure under the cover base comprising a functional module configured to present the user interface; the output device may comprise a light display; the light display may be configured to present at least one of (a) an image; (b) an icon; the cover layer may provide the cover surface; the cover layer may comprise at least one of (a) a raised feature; (b) a depression; (c) an icon; the cover layer may comprise a feature; the feature may be configured to provide a decorative effect at the cover structure; the decorative effect may comprise the user interface.

The present invention relates to a component for a vehicle interior configured to present a user interface comprising a composite structure comprising a cover structure comprising a cover base, a cover layer and a cover surface; the cover structure may be configured to provide the user interface; the user interface may comprise an input device; the cover layer may be configured to cover at least a portion of the cover base; the cover base of the cover structure may comprise a core and a perimeter; the cover layer may comprise a first material and the cover base may comprise a second material different than the first material; the first material may be softer than the second material; the core of the cover base of the cover structure may be configured to present the input device for the user interface; the composite structure may comprise a base structure configured to support the cover structure; the base structure may comprise a functional module structure under the cover base comprising a functional module configured to present the user interface; the cover layer may be molded on the cover base; the cover base may comprise an aperture; the cover layer may be molded in the aperture of the cover base; the cover layer may comprise a projection configured to fit within a recess in the cover base; the cover layer may be configured to deform between the core of the cover base and the perimeter of the cover base; the cover layer may comprise a feature; the feature may be configured to provide the input device for the user interface; the cover layer may provide the cover surface; the cover layer may comprise at least one of (a) a raised feature; (b) a depression; (c) an icon; the cover structure may comprise an integrally-formed structure; the component may comprise a user interface system configured to present the user interface at the cover surface comprising the input device.

The present invention relates to a component for a vehicle interior configured to present a user interface comprising a composite structure comprising a cover structure comprising a cover base, a cover layer and a cover surface; the cover structure may be configured to provide the user interface; the user interface may comprise an input device; the cover layer may be configured to cover at least a portion of the cover base; the cover base of the cover structure may comprise a core and a perimeter; the cover surface may comprise a surface of the core of the cover base projecting above a surface of the cover layer material; the core of the cover base of the cover structure may be configured to present the input device for the user interface; the composite structure may comprise a base structure configured to support the cover structure; the base structure may comprise a functional module structure under the cover base comprising a functional module configured to present the user interface; the cover layer may comprise a projection configured to fit within a recess in the cover base; the cover layer may be configured to deform between the core of the cover base and the perimeter of the cover base.

The present invention relates to a component for a vehicle interior configured to present a user interface comprising a composite structure comprising a cover structure comprising a cover base, a cover layer and a cover surface; the cover structure may be configured to provide the user interface; the user interface may comprise an input device; the cover layer may be configured to cover at least a portion of the cover base; the cover base of the cover structure may comprise a core and a perimeter; the core of the cover base may provide the cover surface for the input device material; the core of the cover base of the cover structure may be configured to present the input device for the user interface; the composite structure may comprise a base structure configured to support the cover structure; the base structure may comprise a functional module structure under the cover base comprising a functional module configured to present the user interface; the cover layer may comprise a projection configured to fit within a recess in the cover base; the cover layer may be configured to deform between the core of the cover base and the perimeter of the cover base.

The present invention relates to a component for a vehicle interior configured to present a user interface comprising a composite structure comprising a cover structure comprising a cover base, a cover layer and a cover surface; the cover structure may be configured to provide the user interface; the user interface may comprise an input device; the cover layer may be configured to cover at least a portion of the cover base; the cover base of the cover structure may comprise a core and a perimeter; the cover structure may comprise a decorative layer on the cover layer; the decorative layer may comprise an aperture configured to present the input device at the cover surface material; the core of the cover base of the cover structure may be configured to present the input device for the user interface; the composite structure may comprise a base structure configured to support the cover structure; the base structure may comprise a functional module structure under the cover base comprising a functional module configured to present the user interface; material of the decorative layer may comprise a color different than a color of material of the cover layer; the aperture may be configured to present an icon comprising the color of the cover layer.

The present invention relates to a component for a vehicle interior configured to present a user interface comprising a composite structure comprising a cover structure comprising a cover base, a cover layer and a cover surface; the cover structure may be configured to provide the user interface; the user interface may comprise an input device; the cover layer may be configured to cover at least a portion of the cover base; the cover base of the cover structure may comprise a core and a perimeter; the cover structure may comprise a decorative layer on the cover layer; the decorative layer may provide the cover surface; the decorative layer may be configured to present the input device at the cover surface material; the core of the cover base of the cover structure may be configured to present the input device for the user interface; the composite structure may comprise a base configured to support the cover structure; the base structure may comprise a functional module structure under the cover base comprising a functional module configured to present the user interface; the decorative layer may comprise an opaque material; the cover layer may comprise a light-transmissive material; the cover base may comprise a light-transmissive material.

The present invention relates to a component for a vehicle interior configured to present a user interface comprising a composite structure comprising a cover structure comprising a cover base, a cover layer and a cover surface. The cover structure may be configured to provide the user interface. The user interface may comprise an input device. The cover layer may be configured to cover at least a portion of the cover base. The cover base may comprise a core and a perimeter. The cover layer may comprise a first material and the cover base may comprise a second material different than the first material. The first material may be softer than the second material. The cover layer may be molded on the cover base. The cover base may comprise an aperture; the cover layer may be molded in the aperture of the cover base. The cover layer may comprise a projection configured to fit within a recess in the cover base. The cover layer may be configured to deform between the core of the cover base and the perimeter of the cover base. The cover layer may comprise a feature; the feature may be configured to provide the input device for the user interface. The cover layer may provide the cover surface; the cover layer may comprise at least one of (a) a raised feature; (b) a depression; (c) an icon. The cover structure may comprise an integrally-formed structure. The component may comprise a user interface system configured to present the user interface at the cover surface comprising the input device.

The present invention relates to a component for a vehicle interior configured to present a user interface comprising a composite structure comprising a cover structure comprising a cover base, a cover layer and a cover surface. The cover structure may be configured to provide the user interface. The user interface may comprise an input device. The cover layer may be configured to cover at least a portion of the cover base. The cover base may comprise a core and a perimeter. The cover surface may comprise a surface of the core of the cover base projecting above a surface of the cover layer. The cover layer may comprise a projection configured to fit within a recess in the cover base. The cover layer may be configured to deform between the core of the cover base and the perimeter of the cover base.

The present invention relates to a component for a vehicle interior configured to present a user interface comprising a composite structure comprising a cover structure comprising a cover base, a cover layer and a cover surface. The cover structure may be configured to provide the user interface. The user interface may comprise an input device. The cover layer may be configured to cover at least a portion of the cover base. The cover base may comprise a core and a perimeter. The core of the cover base may provide the cover surface for the input device. The cover layer may comprise a projection configured to fit within a recess in the cover base. The cover layer may be configured to deform between the core of the cover base and the perimeter of the cover base.

The present invention relates to a component for a vehicle interior configured to present a user interface comprising a composite structure comprising a cover structure comprising a cover base, a cover layer and a cover surface. The cover structure may be configured to provide the user interface. The user interface may comprise an input device. The cover layer may be configured to cover at least a portion of the cover base. The cover base may comprise a core and a perimeter. The cover structure may comprise a decorative layer on the cover layer. The decorative layer may comprise an aperture configured to present the input device at the cover surface. Material of the decorative layer may comprise a color different than a color of material of the cover layer. The aperture may be configured to present an icon comprising the color of the cover layer.

The present invention relates to a component for a vehicle interior configured to present a user interface comprising a composite structure comprising a cover structure comprising a cover base, a cover layer and a cover surface. The cover structure may be configured to provide the user interface.

The user interface may comprise an input device. The cover layer may be configured to cover at least a portion of the cover base. The cover base may comprise a core and a perimeter. The cover structure may comprise a decorative layer on the cover layer. The decorative layer may provide the cover surface. The decorative layer may be configured to present the input device at the cover surface. The decorative layer may comprise an opaque material; the cover layer may comprise a light-transmissive material; the cover base may comprise a light-transmissive material.

The present invention relates to a component for a vehicle interior configured to present a user interface comprising a composite structure comprising a cover structure comprising a cover base, a cover layer and a cover surface. The cover structure may be configured to provide the user interface. The user interface may comprise an input device. The cover layer may be configured to cover at least a portion of the cover base. The cover base may comprise a core and a perimeter surrounding the core. The cover layer may extend into the cover base between the core of the cover base and the perimeter of the cover base. The cover layer may be configured to facilitate movement of the core of the cover base relative to the perimeter of the cover base. The component may comprise a gap between the core of the cover base and the perimeter of the cover base. The cover layer may be configured to form a border around the core of the cover base. The user interface may be configured for contact at the cover structure through the cover layer and the cover base. The cover layer may be molded on the cover base. The cover base may comprise an aperture surrounding the core of the cover base. The cover base may comprise an aperture between the core of the cover base and the perimeter of the cover base. The cover base may comprise an aperture configured to separate the core of the cover base and the perimeter of the cover base. The cover base may comprise an aperture; the cover layer may be molded in the aperture of the cover base. The cover base may comprise an aperture; the cover layer may extend into the aperture between the core of the cover base and the perimeter of the cover base. The cover base may comprise an aperture; the cover layer may fill the aperture between the core of the cover base and the perimeter of the cover base. The cover layer may comprise a first material and the cover base may comprise a second material different than the first material; the first material may be softer than the second material. The cover layer may provide the cover surface; the cover layer may comprise a projection configured to present the input device at the cover surface. The cover layer may provide the cover surface; the cover layer may comprise at least one of (a) a raised feature; (b) a depression; (c) an icon. The cover layer may be configured to deform as the input device is pressed. The cover surface may comprise (a) a surface of the core of the cover base and (b) a surface of the cover layer. The cover surface may comprise a surface of the core of the cover base projecting above a surface of the cover layer. The core of the cover base may provide the cover surface for the input device. The input device may comprise at least one of (a) a sensor; (b) a capacitive touch sensor; (c) a capacitive touch film. The cover base may comprise a runner configured to connect the core of the cover base and the perimeter of the cover base. The cover structure may comprise a decorative layer on the cover layer. The decorative layer may comprise an aperture configured to present the input device at the cover surface. Material of the decorative layer may comprise a color different than a color of material of the cover layer. The aperture may be configured to present an icon comprising the color of the cover layer. The decorative layer may comprise an aperture configured to transmit light from a light source to the cover surface. The decorative layer may provide the cover surface; the decorative layer may be configured to present the input device at the cover surface. The decorative layer may provide the cover surface; the decorative layer may comprise at least one of (a) a raised feature; (b) a depression; (c) an icon. The decorative layer may be laminated on the cover layer. The decorative layer may comprise at least one of (a) a paint material; (b) an ink material. The decorative layer may comprise a depression formed by removal of a portion of the at least one of (a) the paint material; (b) the ink material. The decorative layer may comprise an opaque material; the cover layer may comprise a light-transmissive material; the cover base may comprise a light-transmissive material. The cover layer may comprise at least one of (a) an injection molded polypropylene; (b) a generally transparent resin material; (c) a light-transmissive material; (d) a PC material; (e) an ABS material; (f) a nylon material; (g) a clear amorphous material; (h) a clarified resin. The cover base may comprise at least one of (a) an injection molded polypropylene; (b) a generally transparent resin material; (c) a light-transmissive material; (d) a PC material; (e) an ABS material; (f) a nylon material; (g) a clear amorphous material; (h) a clarified resin. The component may comprise a user interface system configured to present the user interface at the cover surface comprising (a) a light display configured to transmit light from a light source and (b) the input device. The cover structure may comprise a decorative layer on the cover layer; the decorative layer may comprise an aperture configured to transmit light from the light source to present the input device at the cover surface. The decorative layer may comprise a color different than a color the cover layer; the aperture may be configured to present an illuminated icon comprising the color of the cover layer. The decorative layer may comprise an opaque material; the cover layer may comprise a light-transmissive material; the cover base may comprise a light-transmissive material. The cover layer may comprise a light-transmissive material; the cover base may comprise an opaque material; the cover layer may be configured to form an illuminated border around the core of the cover base. The cover layer may comprise a light-transmissive material; the cover base may comprise an opaque material; the cover layer may be configured to transmit light from the light source between the core of the cover base and the perimeter of the cover base. The input device may comprise a light guide between the light source and the core of the cover base. The component may comprise a sensor between the light guide and the core of the cover base. The component may comprise a user interface system configured to present the user interface at the cover surface comprising (a) an actuator configured to provide feedback at the cover surface and (b) the input device. The actuator may be configured to provide at least one of (a) a force at the cover surface; (b) vibration at the cover surface; (c) motion at the cover surface. The actuator may be coupled to the core of the cover base. The actuator may be configured to deform the cover layer between the core of the cover base and the perimeter of the cover base. The cover structure may comprise a decorative layer on the cover layer; the decorative layer may comprise an aperture configured to transmit light from the light source to present a light display. The cover layer may be configured to transmit light from a light source between the core of the cover base and the perimeter of the cover base. The input device may comprise a light guide between a light source and the core of the cover base. The component may comprise a light guide configured to transmit light from a light source to the core of the cover base. The light guide may be configured to transmit at least one of (a) a force from the actuator to the cover surface; (b) vibration from the actuator to the cover surface; (c) motion from the actuator to the cover surface. The component may comprise a sensor between the light guide and the core of the cover base. The cover structure may be configured to facilitate deployment of an airbag into the vehicle interior. The cover base may comprise a recess formed as an indentation in a rear side of the cover base; the recess may be configured to direct deployment of the airbag through the cover structure. The input device may comprise a light guide configured to transmit light from a light source to the core of the cover base. The input device may comprise at least one of a sensor and/or a switch. The input device may comprise a sensor; the sensor may comprise at least one of (a) a detector; (b) a capacitive sensor; (c) a touch sensor; (d) a mechanical switch. The input device may comprise an operator control for at least one vehicle system. The user interface may comprise the input device and an output device. The output device may comprise at least one of a light display and/or a haptics transducer. The output device may comprise a light display; the light display may comprise at least one of (a) a panel; (b) a display panel; (c) a button panel; (d) lighting; (e) a light guide; (f) LED lighting. The output device may comprise a light display; the light display may be configured to present at least one of (a) an image; (b) an icon. The light display may be configured to present a decorative effect; the decorative effect may comprise an illuminated state. The component may comprise a user interface system for the cover structure configured to present the user interface. The user interface system may comprise at least one of (a) a haptics system; (b) a haptics system comprising a transducer; (c) a haptics system comprising a transducer and an actuator; (d) an output device comprising a haptics system; (e) an output device comprising a lighted panel. The user interface system may comprise an output device comprising a haptics system comprising a transducer and an actuator; the user interface system may be actuated by the input device. The component may comprise an assembly comprising the composite structure and a functional module; the functional module may be configured to operate at least one of (a) a sensor or (b) a switch or (c) a detector or (d) a light display or (e) a display panel or (f) a control panel or (g) a transducer or (h) a haptics actuator or (i) a haptics transducer. The composite structure may comprise a base; the base may comprise a functional module; the functional module may be configured to present the user interface. The cover structure may comprise at least one of (a) an integrally-formed structure; (b) an integrally-molded structure; (c) a molded structure; (d) a molded resin structure; (e) a resin structure; (f) a cover layer; (g) a single-layer cover. The cover layer may comprise a resin structure. The cover layer may comprise a feature. The feature may comprise at least one of (a) a projection; (b) a projection at a surface of the cover layer; (c) a projection below the cover layer; (d) a rib; (e) a set of ribs; (f) an aperture; (g) an indentation; (h) an indentation and a projection; (i) a projection configured to fit within a recess in the cover base. The feature may be configured to provide the input device for the user interface. The feature may be configured to provide a decorative effect at the cover structure; the decorative effect may comprise the user interface. The cover structure may comprise a decorative layer configured to provide a decorative effect at a surface. The decorative effect may comprise at least one of (a) an image; (b) an icon. The decorative effect may comprise a set of indicators for the input device. The cover layer may comprise a panel presenting the user interface. The cover layer may comprise a panel comprising the input device and an output device. The cover layer may comprise at least one of (a) a flexible structure; (b) a deformable structure. The cover structure of the composite structure may comprise a recess configured to facilitate formation of an airbag door in the cover structure during deployment of an airbag. The input device may comprise an operator control for at least one vehicle system; the at least one vehicle system may comprise at least one of (a) a vehicle communication system; (b) vehicle entry locks; (c) an HVAC system; (d) an occupant comfort system; (e) an occupant safety system; (f) vehicle lighting; (g) a vehicle entertainment system; (h) a vehicle audio system; (i) vehicle instrumentation; (j) vehicle status information; (k) vehicle operation system; (l) mobile device connectivity; (m) network connectivity. The component may comprise at least one of (a) a steering wheel assembly; (b) a console; (c) a floor console; (d) a center console; (e) an instrument panel; (f) a door panel; (g) a dashboard; (h) a display; (i) an arm rest; (j) a cockpit; (k) a trim panel, (l) an overhead console; (m) an overhead system; (n) an operator control.

The present invention relates to a component for a vehicle interior configured to provide a user interface for interaction with a vehicle occupant in a vehicle providing at least one vehicle system comprising (a) a cover structure comprising a cover surface; and (b) an input device. The cover structure may comprise a composite cover comprising a cover layer and a cover base. The cover layer may be configured to cover at least a portion of the cover base. The cover base may comprise a core and a perimeter surrounding the core. The input device may comprise the core of the cover base.

The present invention relates to a component for a vehicle interior configured to present a user interface comprising a composite structure comprising a cover structure comprising a cover base and a cover layer. The cover structure may be configured to provide the user interface. The user interface may comprise an input device. The cover structure may comprise the cover base and the cover layer and a cover surface. The cover layer may be configured to cover at least a portion of the cover base. The cover base may comprise a core and a perimeter surrounding the core. The cover layer extends into the cover base between the core of the cover base and the perimeter of the cover base. The cover layer may be configured to facilitate movement of the core of the cover base relative to the perimeter of the cover base. The component may comprise an air gap between the core of the cover base and the perimeter of the cover base. The cover layer may be configured to form a border around the core of the cover base. The user interface may be configured for contact at the cover structure through the cover layer and the cover base. The cover layer may be molded on the cover base. The cover base may comprise an aperture surrounding the core of the cover base. The cover base may comprise an aperture between the core of the cover base and the perimeter of the cover base. The cover base may comprise an aperture configured to separate the core of the cover base and the perimeter of the cover base. The cover base may comprise an aperture; the cover layer may be molded in the aperture of the cover base. The cover base may comprise an aperture; the cover layer extends into the aperture between the core of the cover base and the perimeter of the cover base. The cover base may comprise an aperture; the cover layer fills the aperture between the core of the cover base and the perimeter of the cover base. The cover layer may comprise a first material and the cover base may comprise a second material different than the first material; the first material may be softer than the second material. The cover layer may provide the cover surface; the cover layer may comprise a projection configured to present the input device at the cover surface. The cover layer may provide the cover surface; the cover layer may comprise at least one of (a) a raised feature; (b) a depression; (c) an icon. The cover layer may be configured to deform as the input device is depressed. The cover surface may comprise (a) a surface of the core of the cover base and (b) a surface of the cover layer. The cover surface may comprise a surface of the core of the cover base projecting above a surface of the cover layer. The core of the cover base may provide the cover surface for the input device. The input device may comprise at least one of (a) a sensor; (b) a capacitive touch sensor; (c) a capacitive touch film. The cover base may comprise a runner configured to connect the core of the cover base and the perimeter of the cover base. The cover structure may comprise a decorative layer on the cover layer. The decorative layer may comprise an aperture configured to present the input device at the cover surface. The aperture may comprise at least one of (a) a depression; (b) an icon. The decorative layer may comprise a material different than a material of the cover layer. The material of the decorative layer may comprise a color different than a color of the material of the cover layer. The aperture may be configured to present an icon comprising the color of the cover layer. The decorative layer may comprise an aperture configured to transmit light from a light source to the cover surface. The decorative layer may provide the cover surface; the decorative layer may be configured to present the input device at the cover surface. The decorative layer may provide the cover surface; the decorative layer may comprise at least one of (a) a raised feature; (b) a depression; (c) an icon. The decorative layer may comprise a laminate. The decorative layer may be laminated on the cover layer. The decorative layer may comprise at least one of (a) a paint material; (b) an ink material. The decorative layer may comprise a depression formed by removal of a portion of the at least one of (a) the paint material; (b) the ink material. The decorative layer may comprise an opaque material. The cover layer may comprise a light-transmissive material; the cover base may comprise a light-transmissive material. The cover layer may comprise at least one of (a) an injection molded polypropylene; (b) a generally transparent resin material; (c) a light-transmissive material; (d) a PC material; (e) an ABS material; (f) a nylon material; (g) a clear amorphous material; (h) a clarified resin. The cover base may comprise at least one of (a) an injection molded polypropylene; (b) a generally transparent resin material; (c) a light-transmissive material; (d) a PC material; (e) an ABS material; (f) a nylon material; (g) a clear amorphous material; (h) a clarified resin. The component may comprise a user interface system configured to present the user interface at the cover surface comprising (a) a light display configured to transmit light from a light source and (b) the input device. The cover structure may comprise a decorative layer on the cover layer; the decorative layer may comprise an aperture configured to transmit light from the light source to present the input device at the cover surface. The aperture may comprise at least one of (a) a depressed feature; (b) an icon. The decorative layer may comprise a color different than a color the cover layer; the aperture may be configured to present an illuminated icon comprising the color of the cover layer. The decorative layer may comprise an opaque material; the cover layer may comprise a light-transmissive material; the cover base may comprise a light-transmissive material. The cover layer may comprise a light-transmissive material; the cover base may comprise an opaque material; the cover layer may be configured to form an illuminated border around the core of the cover base. The cover layer may comprise a light-transmissive material; the cover base may comprise an opaque material; the cover layer may be configured to transmit light from the light source between the core of the cover base and the perimeter of the cover base. The input device may comprise a light guide between the light source and the core of the cover base. The light guide may be configured to transmit light from the light source to the core of the cover base. The component may comprise a sensor between the light guide and the core of the cover base. The sensor may comprise at least one of (a) a capacitive touch sensor; (b) a capacitive touch film. The component may comprise a user interface system configured to present the user interface at the cover surface comprising (a) an actuator configured to provide feedback at the cover surface and (b) the input device. The actuator may be configured to provide at least one of (a) a force at the cover surface; (b) vibration at the cover surface; and/or (c) motion at the cover surface. The cover layer may be configured to facilitate vibration of the core of the cover base. The actuator may be coupled to the core of the cover base. The actuator may be configured to deform the cover layer between the core of the cover base and the perimeter of the cover base. The user interface system may comprise a light display configured to transmit light from a light source. The cover structure may comprise a decorative layer on the cover layer; the decorative layer may comprise an aperture configured to transmit light from the light source to present the light display. The cover structure may comprise a decorative layer on the cover layer; the decorative layer may be configured to present an icon illuminated by the light source. The cover layer may be configured to transmit light from the light source between the core of the cover base and the perimeter of the cover base. The input device may comprise a light guide between the light source and the core of the cover base. The light guide may be configured to transmit light from the light source to the core of the cover base. The light guide may be coupled to the actuator. The light guide may be configured to transmit at least one of (a) a force from the actuator to the cover surface; (b) vibration from the actuator to the cover surface; and/or (c) motion from the actuator to the cover surface. The component may comprise a sensor between the light guide and the core of the cover base. The sensor may comprise at least one of (a) a capacitive touch sensor; (b) a capacitive touch film. The cover structure may be configured to facilitate deployment of an airbag into the vehicle interior. The cover base and the cover layer may be configured to break apart to facilitate deployment of the airbag into the vehicle interior. The cover base may comprise a recess formed as an indentation in the rear side of the cover base; the recess may be configured to direct deployment of the airbag through the cover structure. The cover layer may be configured to prevent visibility of the recess in the cover base. The cover structure may comprise a decorative layer on the cover layer; the decorative layer may be configured to prevent visibility of the recess in the cover base. The cover base may comprise a through hole configured to direct deployment of the airbag through the cover structure; the cover layer may be molded in the through hole. The input device may comprise a light guide configured to transmit light from a light source to the core of the cover base. The component may comprise at least one of (a) a steering wheel assembly; (b) a console; (c) a floor console; (d) a center console; (e) an instrument panel; (f) a door panel; (g) a dashboard; (h) a display; (i) an arm rest; (j) a cockpit. The user interface may comprise the input device and an output device. The input device may comprise at least one of a sensor and/or a switch. The sensor may comprise a detector. The sensor may comprise a capacitive sensor. The sensor may comprise a touch sensor. The switch may comprise a mechanical switch. The input device may comprise an operator control for at least one vehicle system. The output device may comprise at least one of a light display and/or a haptics transducer. The light display may comprise a panel. The light display may comprise a display panel. The light display may comprise a button panel. The light display may comprise lighting. Lighting may comprise LED lighting. The light display may comprise a light guide. The light display may comprise the light guide and LED lighting. The light display may be configured to present an image. The light display may be configured to present an image; the icon may comprise a set of icons. The light display may be configured to present an icon. The light display may be configured to present an icon; the icon may comprise a set of icons. The light display may be configured to present a decorative effect. The decorative effect may comprise an illuminated state and an unilluminated state. The illuminated state may comprise a set of icons. The haptics transducer may comprise a vibrating transducer. The haptics transducer may be configured to provide a tactile vibration. The component may comprise a user interface system for the cover structure configured to present the user interface. The component may comprise a functional module. The component may comprise an assembly comprising the composite structure and a functional module. The functional module may be configured to operate at least one of (a) a sensor or (b) a switch or (c) a detector or (d) a light display or (e) a display panel or (f) a control panel or (g) a transducer or (h) a haptics actuator or (i) a haptics transducer. The user interface system may be configured to provide the user interface with the functional module. The user interface system may comprise an interface with the functional module. The functional module may be coupled to vehicle systems. The functional module may be coupled to a network. The network may comprise a vehicle network. The network may comprise the internet. The network may comprise a communications network configured to provide data for the user interface. The functional module may be operated by a control module. The functional module may comprise a control module. The user interface system may comprise a haptics system. The user interface system may comprise a haptics system comprising a transducer. The user interface system may comprise a haptics system comprising a transducer and an actuator. The user interface system may comprise a haptics system comprising a transducer and an actuator; the user interface system may be actuated by the input device. The user interface system may comprise an output device comprising a haptics system. The user interface system may comprise an output device comprising a haptics system for the user interface. The user interface system may comprise an output device comprising a haptics system comprising a transducer and an actuator; the user interface system may be actuated by the input device. The user interface system may comprise an output device comprising a lighted panel. The user interface system may comprise an output device comprising a lighted panel for the user interface. The composite structure may comprise a base. The composite structure may comprise a substrate. The composite structure may comprise a panel. The cover structure may comprise a cover panel. The composite structure may comprise a base; the base may comprise a functional module; the functional module may be configured to present the user interface. The composite structure may comprise a base; the base may comprise a user interface system; the user interface system may comprise a functional module; the functional module may be configured to present the user interface. The cover structure may comprise an integrally-formed structure. The cover structure may comprise an integrally-molded structure. The cover structure may comprise a molded structure. The cover structure may comprise a molded resin structure. The cover structure may comprise a resin structure. The cover structure may comprise a cover layer. The cover structure may comprise a single-layer cover. The cover layer may comprise a resin structure. The cover structure may comprise a base structure comprising the cover base. The cover base may comprise an aperture. The cover layer may be configured to present the user interface. The cover layer may be configured to present a decorative effect. The cover layer may be configured to present a decorative effect and the user interface. The cover layer may comprise a feature. The feature may comprise a projection. The feature may comprise a projection at a surface of the cover layer. The feature may comprise a projection below the cover layer. The feature may comprise a rib. The feature may comprise a set of ribs. The feature may comprise an aperture. The feature may comprise an indentation. The feature may comprise an indentation and a projection. The feature may comprise a projection configured to fit within a recess in the cover base. The feature may be configured to provide the input device for the user interface. The feature may be configured to provide a decorative effect at the cover structure. The decorative effect of the input device may comprise the user interface. The cover structure may comprise a decorative layer. The cover structure may comprise a decorative layer on the cover layer. The cover structure may comprise a decorative layer configured to provide a decorative effect at a surface. The decorative effect may comprise an image. The decorative effect may comprise an icon. The decorative effect may comprise a set of icon. The decorative effect may comprise a set of indicators. The decorative effect may comprise a set of indicators for the input device. The decorative effect may comprise a set of indicators for a touch panel for the input device. The decorative effect may comprise a set of buttons for the input device. The cover layer may comprise a panel. The cover layer may comprise a panel within an aperture in the cover base. The cover layer may comprise a panel connected to the cover base. The cover layer may comprise a panel presenting the user interface. The cover layer may comprise a panel comprising the input device. The cover layer may comprise a panel comprising the input device comprising a touch panel. The cover layer may comprise a panel comprising the input device and an output device. The cover layer may comprise a flexible panel comprising the input device. The cover layer may comprise a flexible structure. The cover layer may comprise a deformable structure. The cover layer may comprise a deformable panel comprising the input device. The cover base may comprise a functional module for the user interface system. The cover base may comprise a sensor. The cover base may comprise a sensor element. The cover base may comprise a lighting system. The cover base may comprise a lighting system comprising a light guide and an LED system. The cover layer may comprise a light-transmissive material. The cover layer may comprise a light-transmissive material and an opaque material. The cover layer may comprise a light-transmissive material and an opaque material configured to provide an illumination effect. The composite structure may comprise a decorative layer; the cover layer may comprise a light-transmissive material and an opaque material configured to provide an illumination effect. The composite structure may be configured to provide a visual effect. The visual effect may comprise a decorative effect of the decorative layer. The visual effect may comprise the illumination effect. The visual effect may comprise a decorative effect of the decorative layer and the illumination effect. The composite structure may comprise a panel. The composite structure may comprise a fiber panel. The composite structure may be configured to facilitate deployment of an airbag. The composite structure may be configured to facilitate deployment of an airbag from an airbag module. The composite structure may be configured to facilitate deployment of an airbag through an airbag door formed in the cover structure. The composite structure may be configured to facilitate formation of an airbag door in the cover structure during deployment of an airbag. The composite structure may be configured to facilitate formation of an airbag door in the cover structure during deployment of an airbag from an airbag module. The cover structure of the composite structure may comprise a recess configured to facilitate formation of an airbag door in the cover structure during deployment of an airbag from an airbag module. The input device may comprise an operator control for at least one vehicle system; the vehicle system may comprise at least one of a vehicle communication system, vehicle entry locks, an HVAC system, an occupant comfort system, an occupant safety system, vehicle lighting, a vehicle entertainment system, a vehicle audio system, vehicle instrumentation, vehicle status information, vehicle operation system, mobile device connectivity, network connectivity. The component may comprise at least one of a trim panel, an instrument panel, a door panel, a console, a floor console, an overhead console, an overhead system, an operator control, a steering wheel. The cover structure may comprise a cover surface and the input device may comprise a button. The cover structure may comprise a composite cover comprising the cover layer and the cover base. The cover layer may be configured to cover at least a portion of the cover base. The cover base may comprise a core and a perimeter surrounding the core. The input device may comprise the core of the cover base. The cover structure may comprise a cover surface. The cover structure may comprise a composite cover comprising the cover layer and the cover base. The cover layer may be configured to cover at least a portion of the cover base. The cover base may comprise a core and a perimeter surrounding the core. The input device may comprise the core of the cover base.

The present invention relates to a component for a vehicle interior configured to provide a user interface for interaction with a vehicle occupant in a vehicle providing at least one vehicle system comprising (a) a cover structure comprising a cover surface; and (b) an input device comprising a button. The cover structure may comprise a composite cover comprising a cover layer and a cover base. The cover layer may be configured to cover at least a portion of the cover base. The cover base may comprise a core and a perimeter surrounding the core. The input device may comprise the core of the cover base.

The present invention relates to a component for a vehicle interior configured to provide a user interface for interaction with a vehicle occupant in a vehicle providing at least one vehicle system comprising (a) a cover structure comprising a cover surface; and (b) an input device comprising a button. The cover structure may comprise a composite cover comprising a cover layer and a cover base. The cover layer may be configured to cover at least a portion of the cover base. The cover base may comprise a core and a perimeter surrounding the core. The input device may comprise the core of the cover base. The cover layer may extend into the cover base between the core of the cover base and the perimeter of the cover base. The cover layer may be configured to facilitate movement of the core of the cover base relative to the perimeter of the cover base. The component may comprise an air gap between the core of the cover base and the perimeter of the cover base. The cover layer may be configured to form a border around the core of the cover base. The user interface may be configured for contact at the cover structure through the cover layer and the cover base. The cover layer may be molded on the cover base. The cover base may comprise an aperture surrounding the core of the cover base. The cover base may comprise an aperture between the core of the cover base and the perimeter of the cover base. The cover base may comprise an aperture configured to separate the core of the cover base and the perimeter of the cover base. The cover base may comprise an aperture; the cover layer may be molded in the aperture of the cover base. The cover base may comprise an aperture; the cover layer may extend into the aperture between the core of the cover base and the perimeter of the cover base. The cover base may comprise an aperture; the cover layer may fill the aperture between the core of the cover base and the perimeter of the cover base. The cover layer may comprise a first material and the cover base may comprise a second material different than the first material; the first material may be softer than the second material. The cover layer may provide the cover surface; the cover layer may comprise a projection configured to present the input device at the cover surface. The cover layer may provide the cover surface; the cover layer may comprise at least one of (a) a raised feature; (b) a depressed feature; (c) an icon. The cover layer may be configured to deform as the button is depressed. The cover surface may comprise (a) a surface of the core of the cover base and (b) a surface of the cover layer. The cover surface may comprise a surface of the core of the cover base projecting above a surface of the cover layer. The core of the cover base may provide the cover surface for the input device. The input device may comprise at least one of (a) a sensor; (b) a capacitive touch sensor; (c) a capacitive touch film. The cover base may comprise a runner configured to connect the core of the cover base and the perimeter of the cover base. The cover structure may comprise a decorative layer on the cover layer. The decorative layer may comprise an aperture configured to present the input device at the cover surface. The aperture may comprise at least one of (a) a depressed feature; (b) an icon. The decorative layer may comprise a material different than a material of the cover layer. The material of the decorative layer may comprise a color different than a color of the material of the cover layer. The aperture may be configured to present an icon comprising the color of the cover layer. The decorative layer may comprise an aperture configured to transmit light from a light source to the cover surface. The decorative layer may provide the cover surface; the decorative layer may be configured to present the input device at the cover surface. The decorative layer may provide the cover surface; the decorative layer may comprise at least one of (a) a raised feature; (b) a depressed feature; (c) an icon. The decorative layer may comprise a laminate. The decorative layer may be laminated on the cover layer. The decorative layer may comprise at least one of (a) a paint material; (b) an ink material. The decorative layer may comprise a depressed feature formed by removal of a portion of the at least one of (a) the paint material; (b) the ink material. The decorative layer may comprise an opaque material. The cover layer may comprise a light-transmissive material; the cover base may comprise a light-transmissive material. The cover layer may comprise at least one of (a) an injection molded polypropylene; (b) a generally transparent resin material; (c) a light-transmissive material; (d) a PC material; (e) an ABS material; (f) a nylon material; (g) a clear amorphous material; (h) a clarified resin. The cover base may comprise at least one of (a) an injection molded polypropylene; (b) a generally transparent resin material; (c) a light-transmissive material; (d) a PC material; (e) an ABS material; (f) a nylon material; (g) a clear amorphous material; (h) a clarified resin. The component may comprise a user interface system configured to present the user interface at the cover surface comprising (a) a light display configured to transmit light from a light source and (b) the input device. The cover structure may comprise a decorative layer on the cover layer; the decorative layer may comprise an aperture configured to transmit light from the light source to present the input device at the cover surface. The aperture may comprise at least one of (a) a depressed feature; (b) an icon. The decorative layer may comprise a color different than a color the cover layer; the aperture may be configured to present an illuminated icon comprising the color of the cover layer. The decorative layer may comprise an opaque material; the cover layer may comprise a light-transmissive material; the cover base may comprise a light-transmissive material. The cover layer may comprise a light-transmissive material; the cover base may comprise an opaque material; the cover layer may be configured to form an illuminated border around the core of the cover base. The cover layer may comprise a light-transmissive material; the cover base may comprise an opaque material; the cover layer may be configured to transmit light from the light source between the core of the cover base and the perimeter of the cover base. The input device may comprise a light guide between the light source and the core of the cover base. The light guide may be configured to transmit light from the light source to the core of the cover base. The component may comprise a sensor between the light guide and the core of the cover base. The sensor may comprise at least one of (a) a capacitive touch sensor; (b) a capacitive touch film. The component may comprise a user interface system configured to present the user interface at the cover surface comprising (a) an actuator configured to provide feedback at the cover surface and (b) the input device. The actuator may be configured to provide at least one of (a) a force at the cover surface; (b) vibration at the cover surface; and/or (c) motion at the cover surface. The cover layer may be configured to facilitate vibration of the core of the cover base. The actuator may be coupled to the core of the cover base. The actuator may be configured to deform the cover layer between the core of the cover base and the perimeter of the cover base. The user interface system may comprise a light display configured to transmit light from a light source. The cover structure may comprise a decorative layer on the cover layer; the decorative layer may comprise an aperture configured to transmit light from the light source to present the light display. The cover structure may comprise a decorative layer on the cover layer; the decorative layer may be configured to present an icon illuminated by the light source. The cover layer may be configured to transmit light from the light source between the core of the cover base and the perimeter of the cover base. The input device may comprise a light guide between the light source and the core of the cover base. The light guide may be configured to transmit light from the light source to the core of the cover base. The light guide may be coupled to the actuator. The light guide may be configured to transmit at least one of (a) a force from the actuator to the cover surface; (b) vibration from the actuator to the cover surface; and/or (c) motion from the actuator to the cover surface. The component may comprise a sensor between the light guide and the core of the cover base. The sensor may comprise at least one of (a) a capacitive touch sensor; (b) a capacitive touch film. The cover structure may be configured to facilitate deployment of an airbag into the vehicle interior. The cover base and the cover layer may be configured to break apart to facilitate deployment of the airbag into the vehicle interior. The cover base may comprise a recess formed as an indentation in the rear side of the cover base; the recess may be configured to direct deployment of the airbag through the cover structure. The cover layer may be configured to prevent visibility of the recess in the cover base. The cover structure may comprise a decorative layer on the cover layer; the decorative layer may be configured to prevent visibility of the recess in the cover base. The cover base may comprise a through hole configured to direct deployment of the airbag through the cover structure; the cover layer may be molded in the through hole. The input device may comprise a light guide configured to transmit light from a light source to the core of the cover base. The component may comprise at least one of (a) a steering wheel assembly; (b) a console; (c) a floor console; (d) a center console; (e) an instrument panel; (f) a door panel; (g) a dashboard; (h) a display; (i) an arm rest; (j) a cockpit.

FIGURES

FIG. 1A is a schematic perspective view of a vehicle according to an exemplary embodiment.

FIGS. 1B through 1D are schematic partial perspective views of a vehicle interior according to an exemplary embodiment.

FIG. 2 is a schematic block diagram of a user interface system for a vehicle interior component according to an exemplary embodiment.

FIG. 3 is a schematic block diagram of connection of a vehicle interior component with a user interface system to vehicle systems according to an exemplary embodiment.

DESCRIPTION

Figure 4:
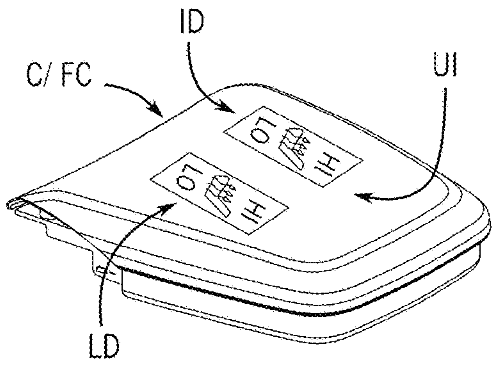
FIG. 4 is a schematic perspective view of a component for a vehicle interior according to an exemplary embodiment.
Figure 5:
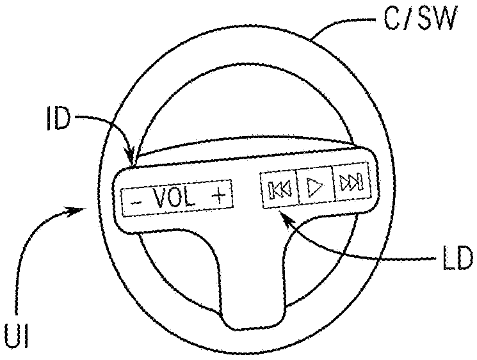
FIG. 5 is a schematic perspective view of a component for a vehicle interior according to an exemplary embodiment.
Figure 6:
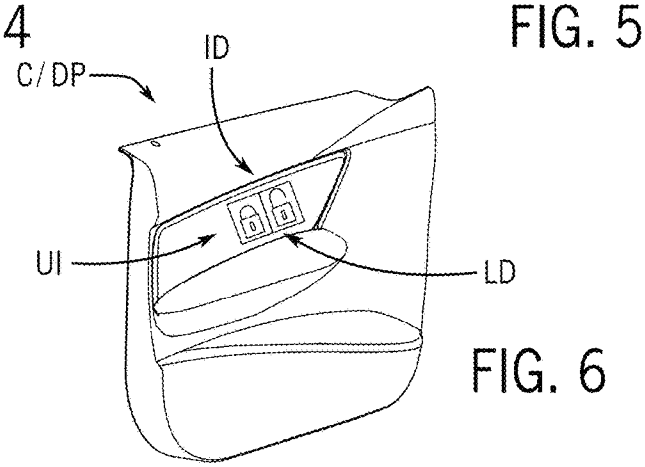
FIG. 6 is a schematic perspective view of a component for a vehicle interior according to an exemplary embodiment.
Figure 7:
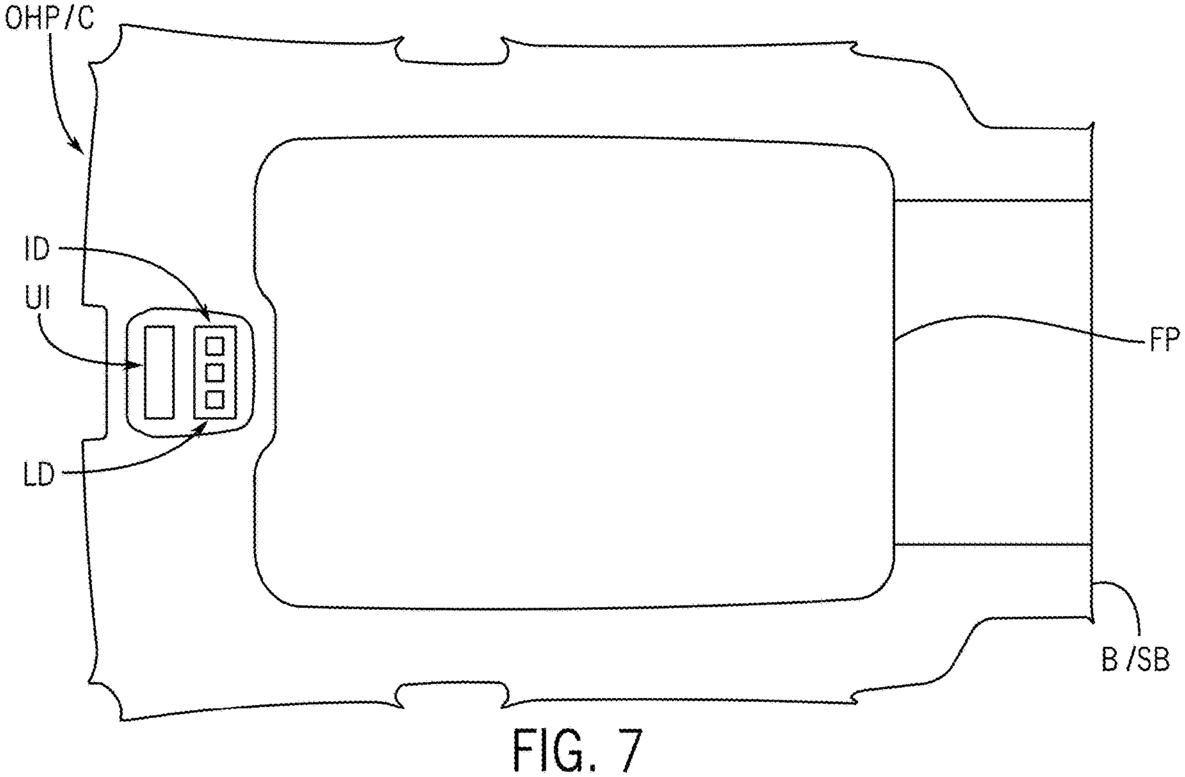
FIG. 7 is a schematic plan view of a component for a vehicle interior according to an exemplary embodiment.
Figure 8A:
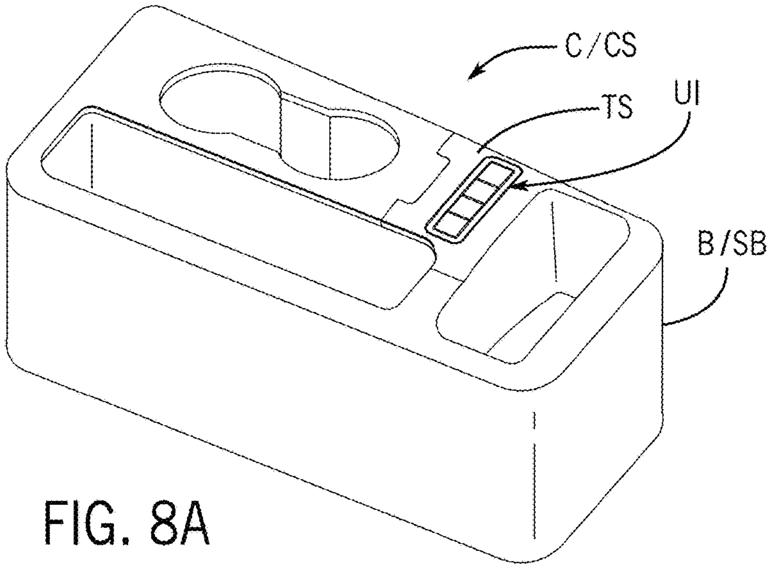
FIG. 8A is a schematic perspective view of a component for a vehicle interior according to an exemplary embodiment.
Figure 8B:
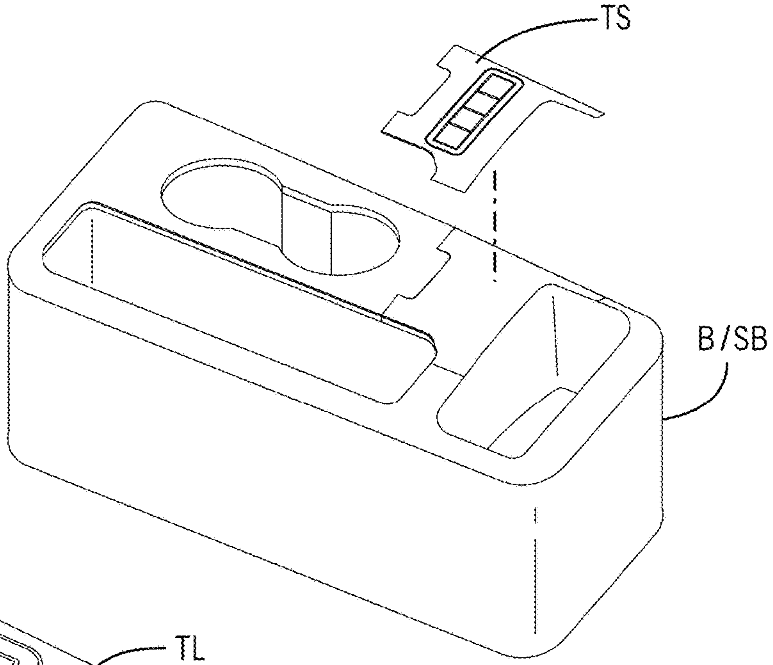
FIG. 8B is a schematic exploded perspective view of a component for a vehicle interior according to an exemplary embodiment.
Figure 8C:
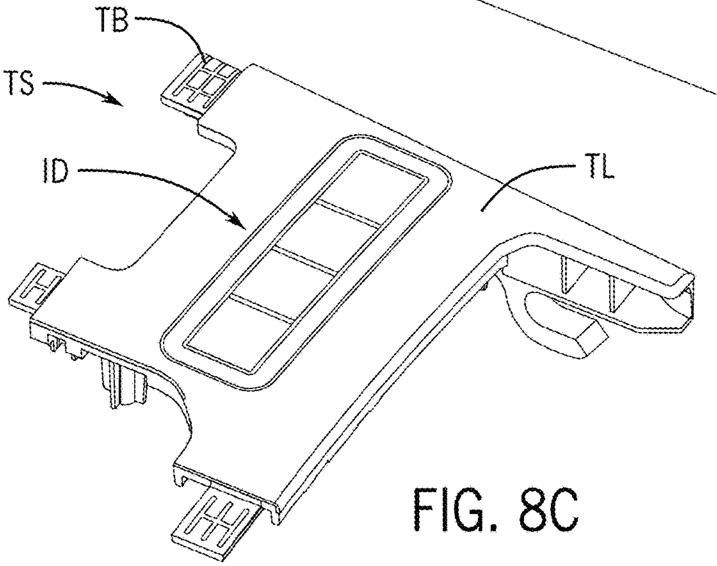
FIG. 8C is a schematic perspective view of a component for a vehicle interior according to an exemplary embodiment.
Figure 9A:
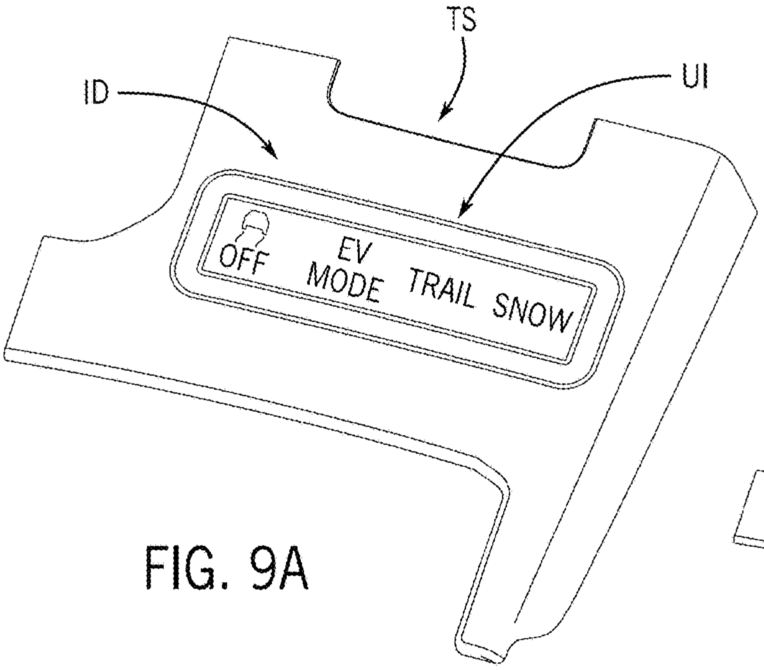
FIG. 9A is a schematic perspective view of a component for a vehicle interior according to an exemplary embodiment.
Figure 9B:
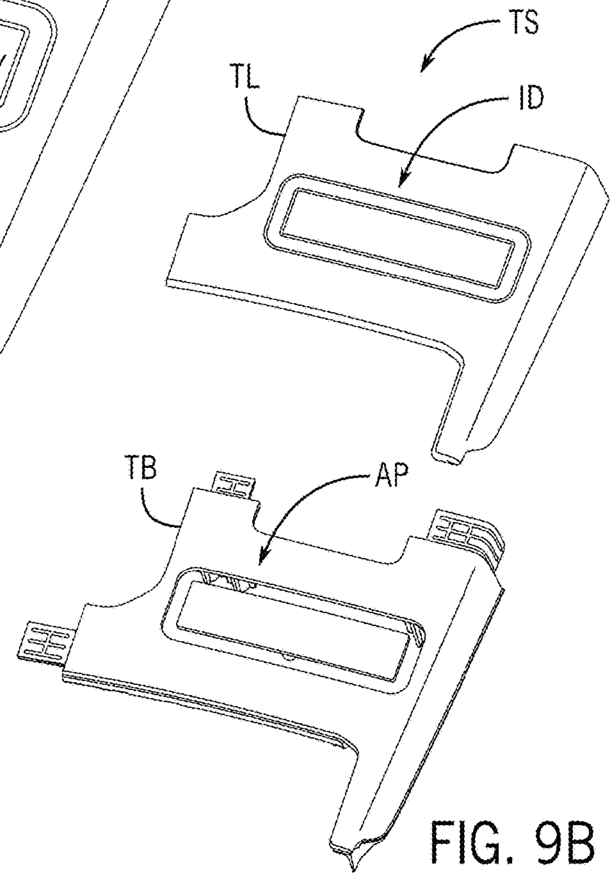
FIG. 9B is a schematic exploded perspective view of a component for a vehicle interior according to an exemplary embodiment.
Figure 9C:
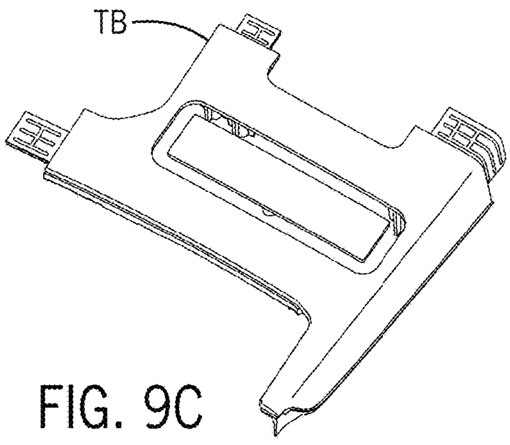
FIG. 9C is a schematic perspective view of a component for a vehicle interior according to an exemplary embodiment.
Figure 9D:
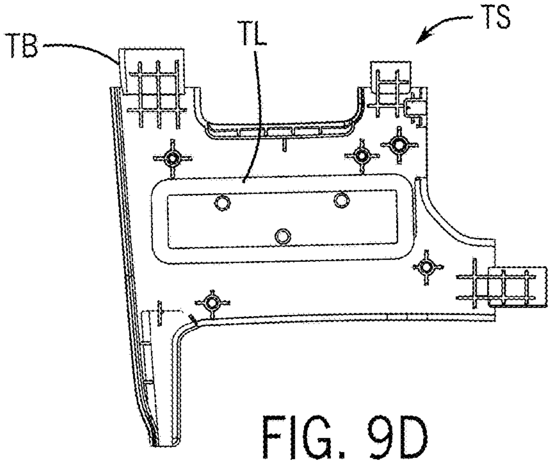
FIG. 9D is a schematic plan view of a component for a vehicle interior according to an exemplary embodiment.
Figure 10A:
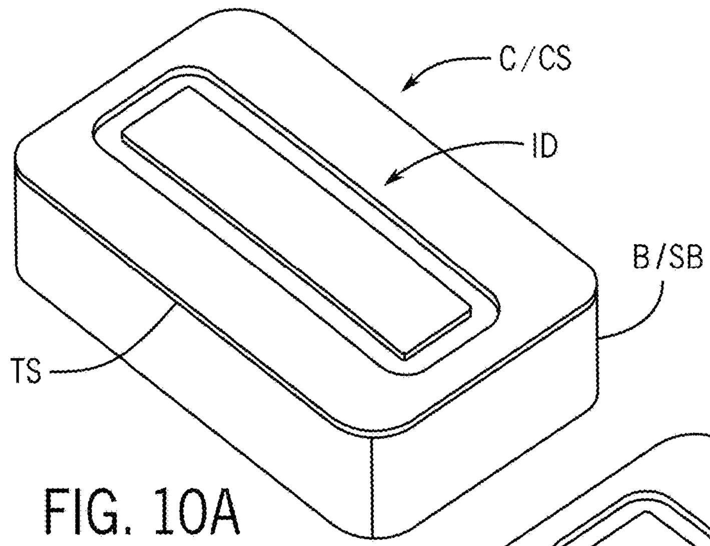
FIG. 10A is a schematic perspective view of a component for a vehicle interior according to an exemplary embodiment.
Figure 10B:
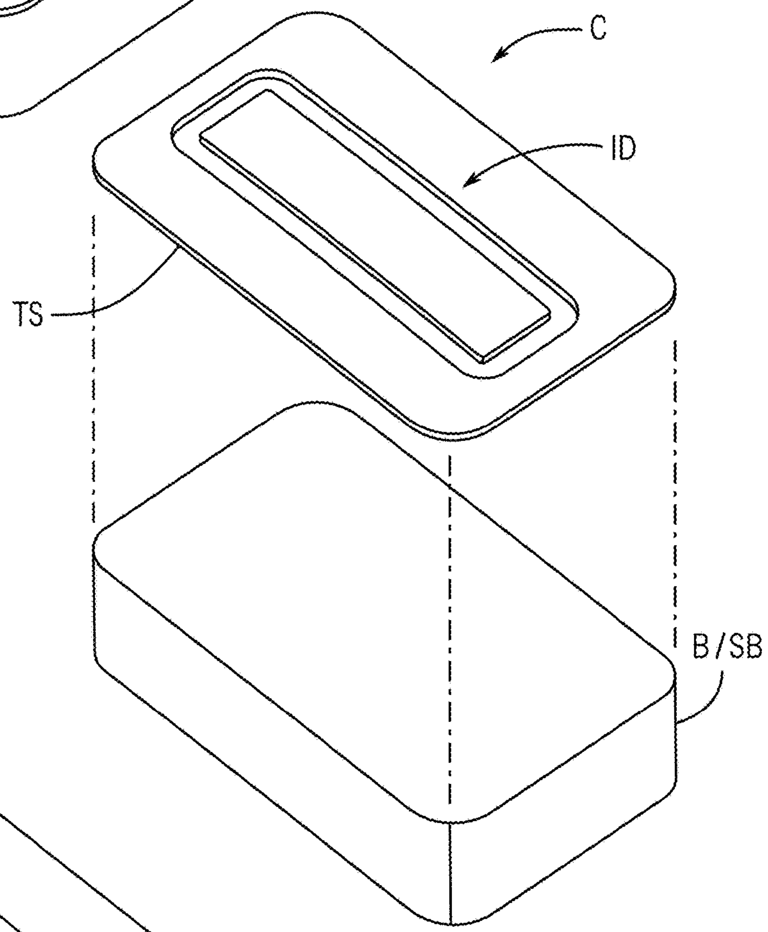
FIG. 10B is a schematic exploded perspective view of a component for a vehicle interior according to an exemplary embodiment.
Figure 10C:
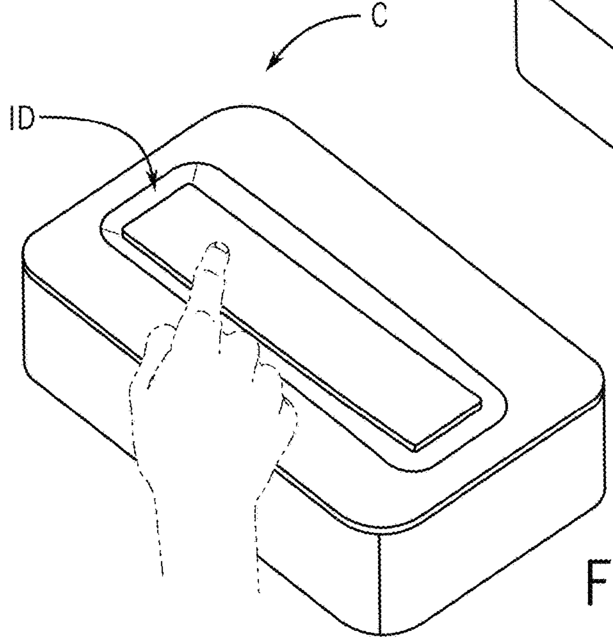
FIG. 10C is a schematic perspective view of a component for a vehicle interior according to an exemplary embodiment.
Figure 11:
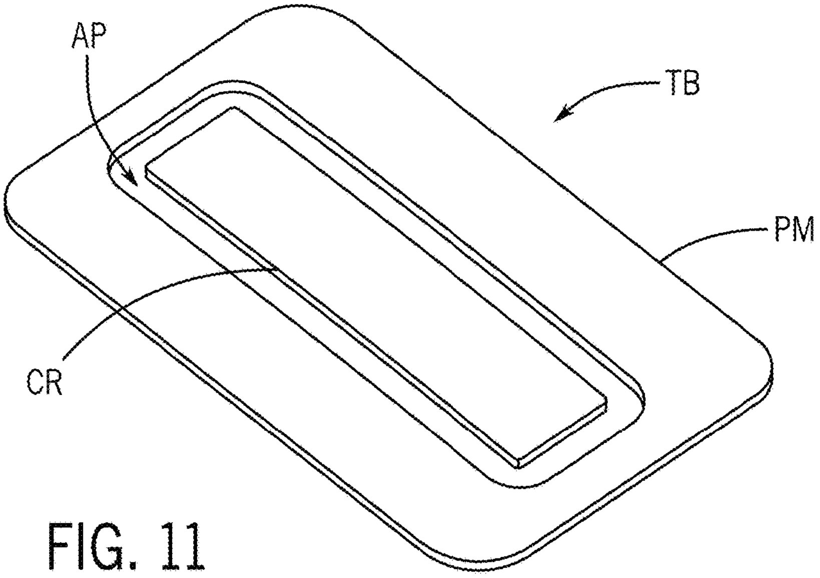
FIG. 11 is a schematic perspective view of a subcomponent of a component for a vehicle interior according to an exemplary embodiment.
Figure 12:
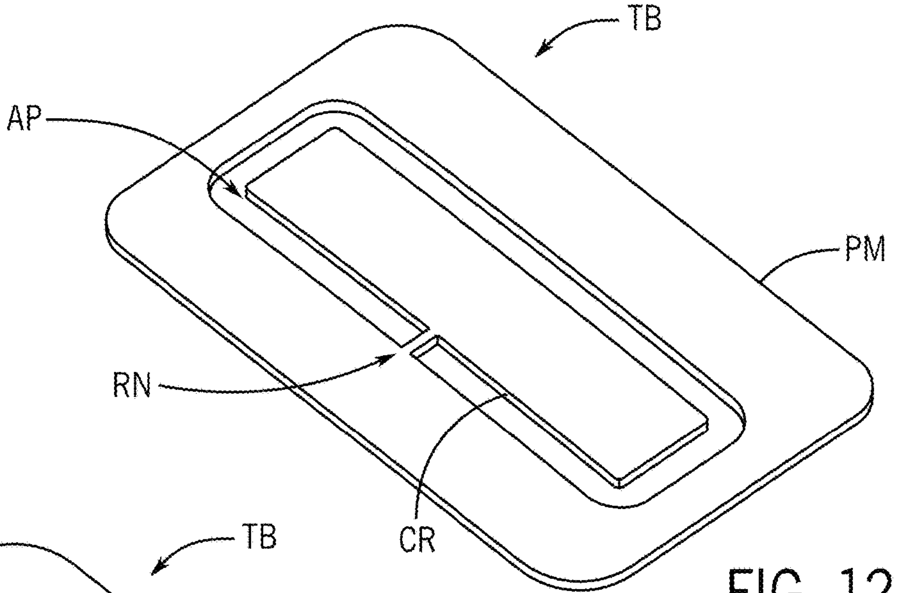
FIG. 12 is a schematic perspective view of a subcomponent of a component for a vehicle interior according to an exemplary embodiment.
Figure 13:
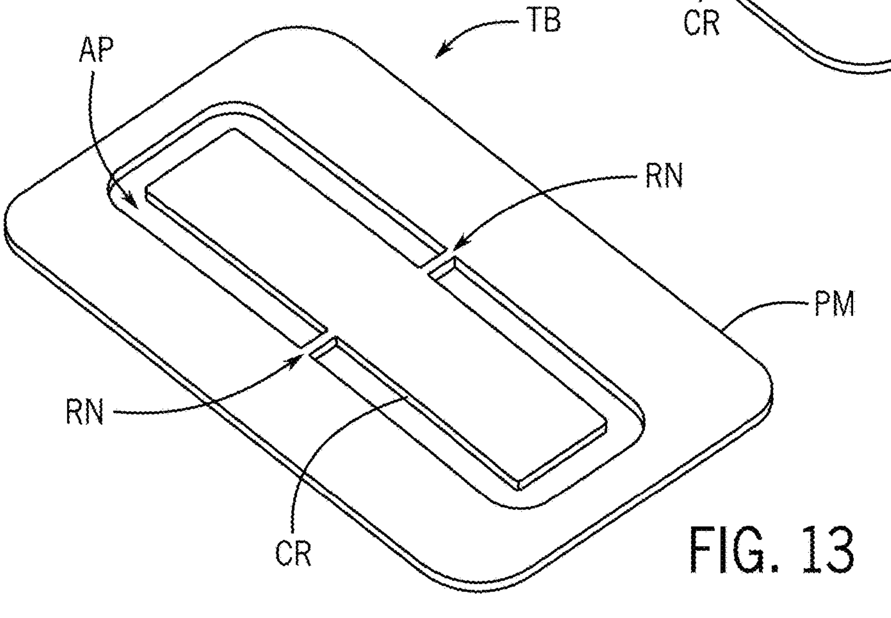
FIG. 13 is a schematic perspective view of a subcomponent of a component for a vehicle interior according to an exemplary embodiment.
Figure 14A:
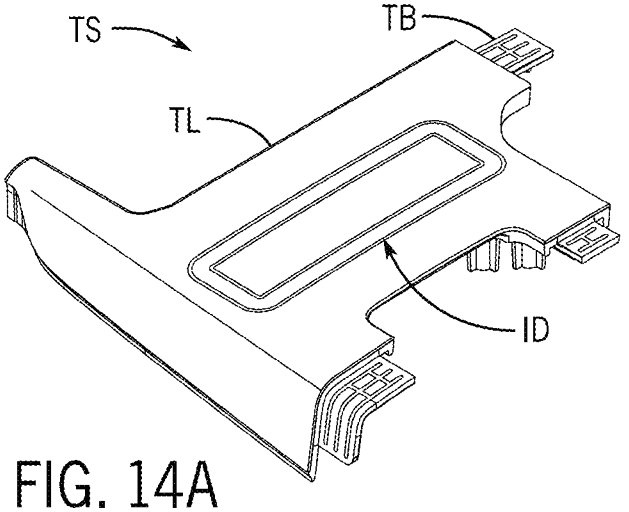
FIG. 14A is a schematic perspective view of a component for a vehicle interior according to an exemplary embodiment.
Figure 14B:
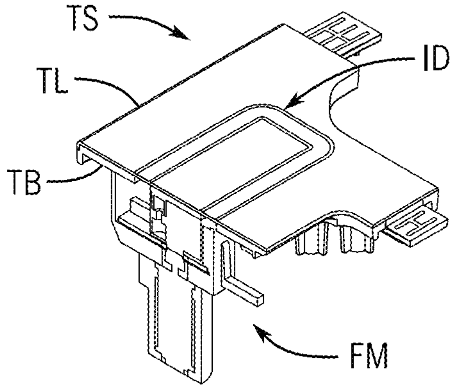
FIG. 14B is a schematic section perspective view of a component for a vehicle interior according to an exemplary embodiment.
Figure 14C:
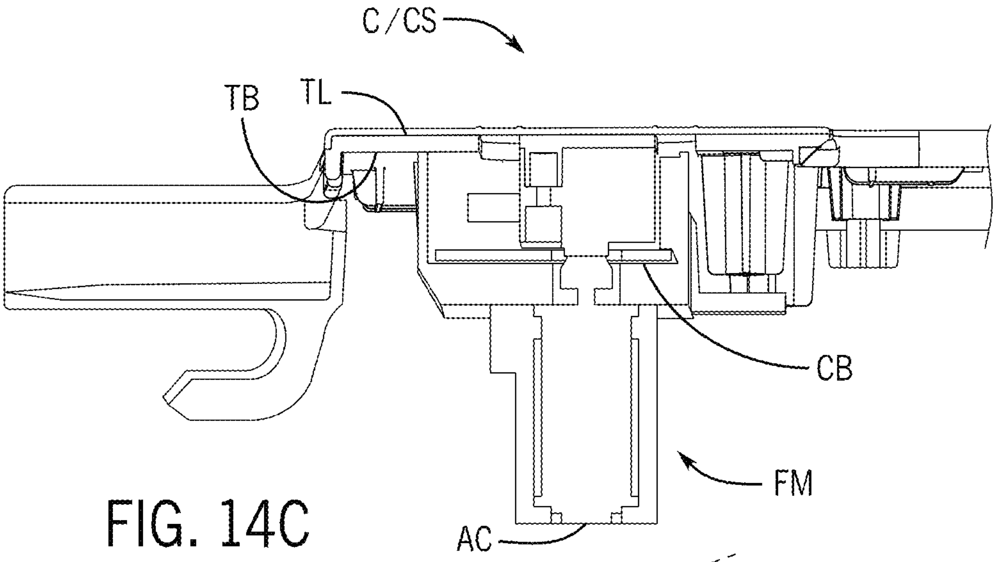
FIG. 14C is a schematic section view of a component for a vehicle interior according to an exemplary embodiment.
Figure 14D:
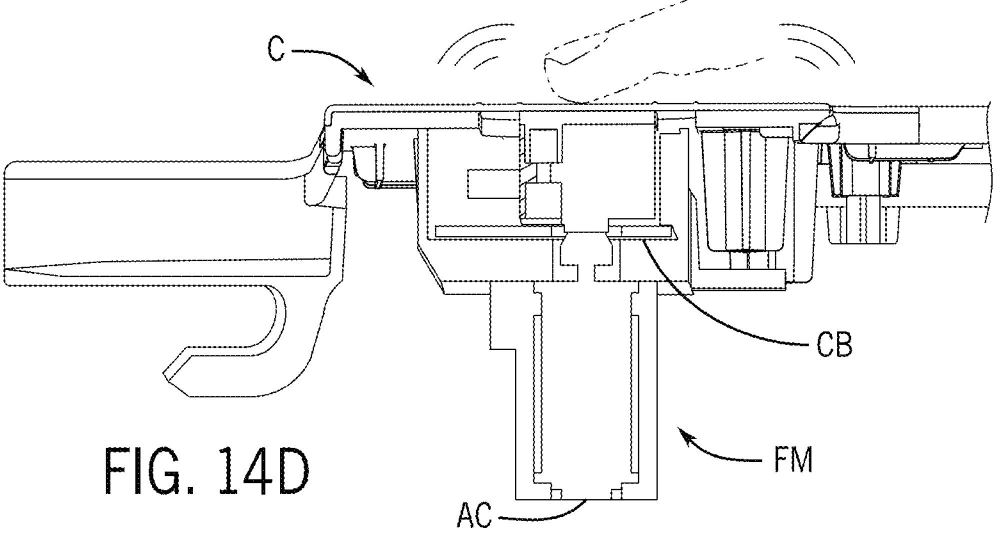
FIG. 14D is a schematic section view of a component for a vehicle interior according to an exemplary embodiment.
Figure 15A:
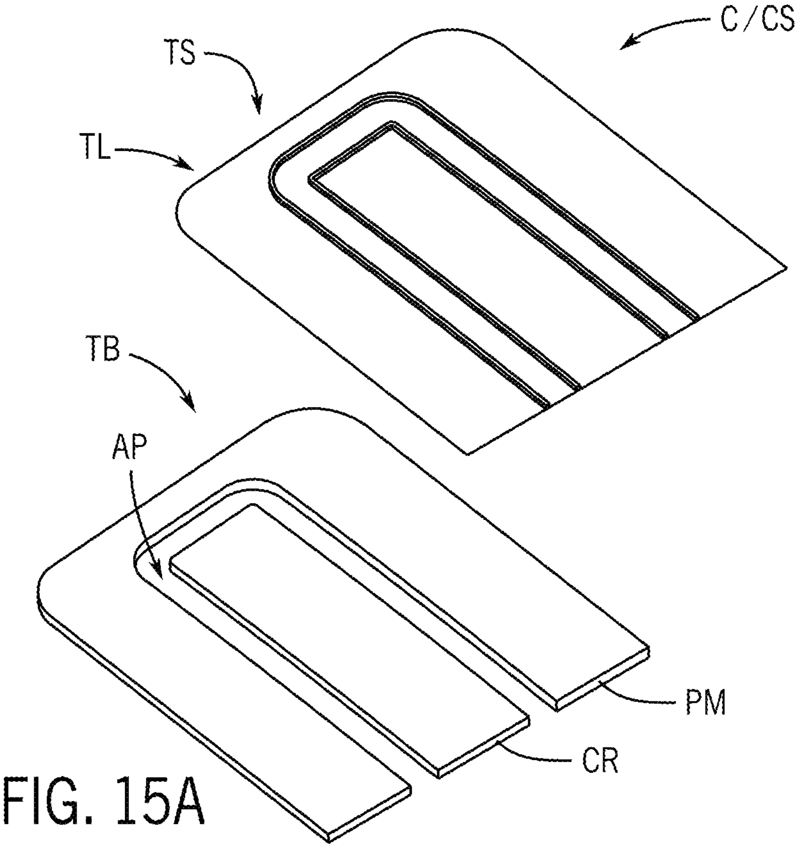
FIG. 15A is a schematic exploded partial perspective view of a component for a vehicle interior according to an exemplary embodiment.
Figure 15B:
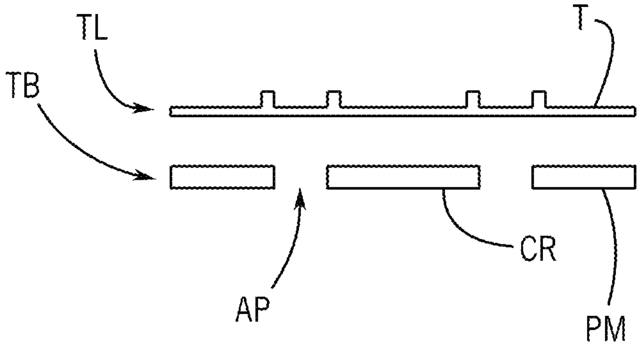
FIG. 15B is a schematic exploded partial section view of a component for a vehicle interior according to an exemplary embodiment.
Figure 15C:
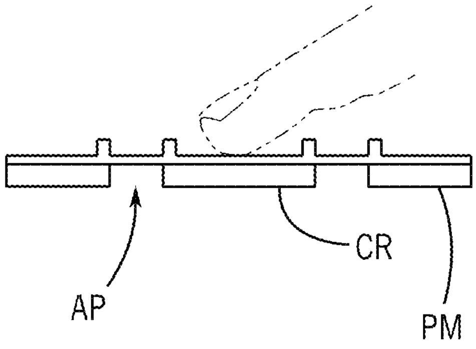
FIG. 15C is a schematic partial section view of a component for a vehicle interior according to an exemplary embodiment.
Figure 16A:
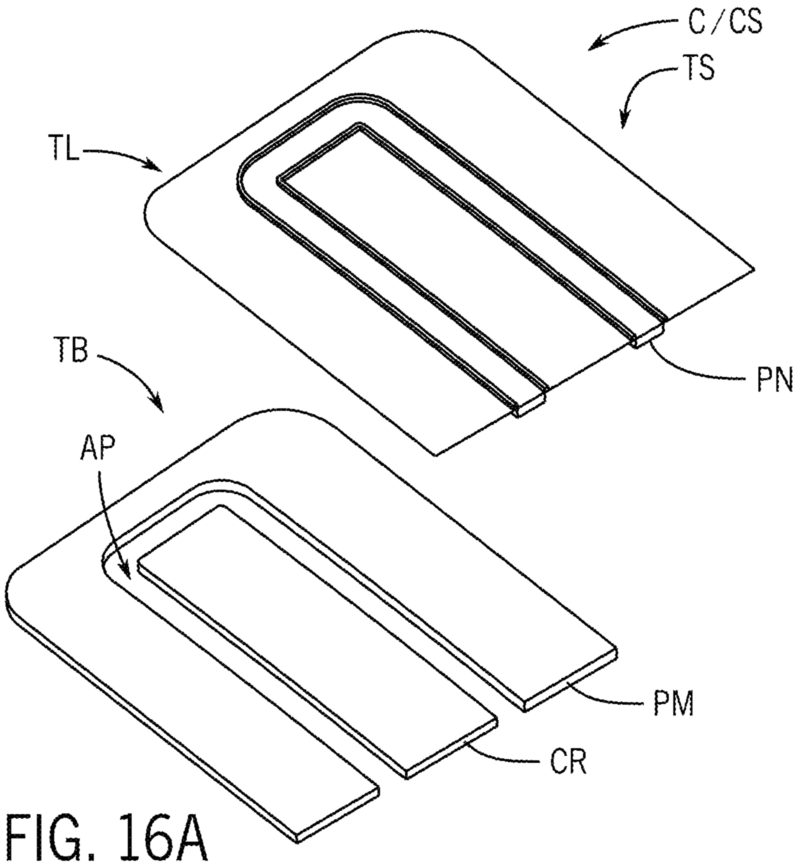
FIG. 16A is a schematic exploded partial perspective view of a component for a vehicle interior according to an exemplary embodiment.
Figure 16B:
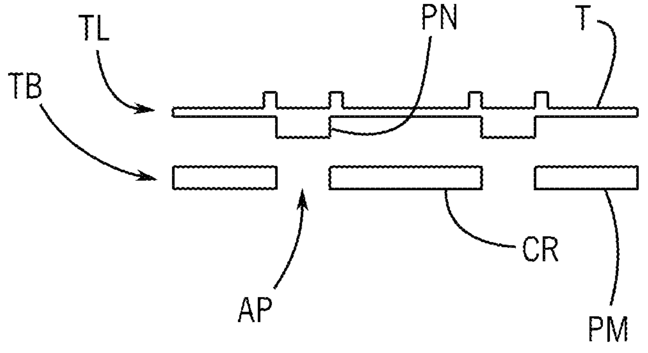
FIG. 16B is a schematic exploded partial section view of a component for a vehicle interior according to an exemplary embodiment.
Figure 16C:
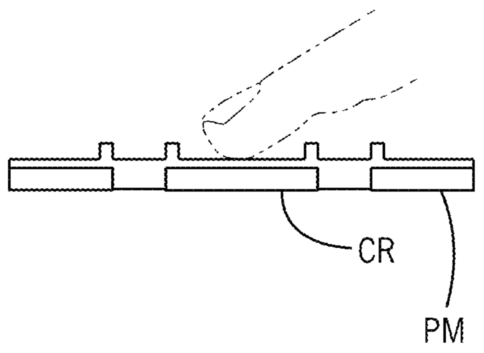
FIG. 16C is a schematic partial section view of a component for a vehicle interior according to an exemplary embodiment.
Figure 17A:
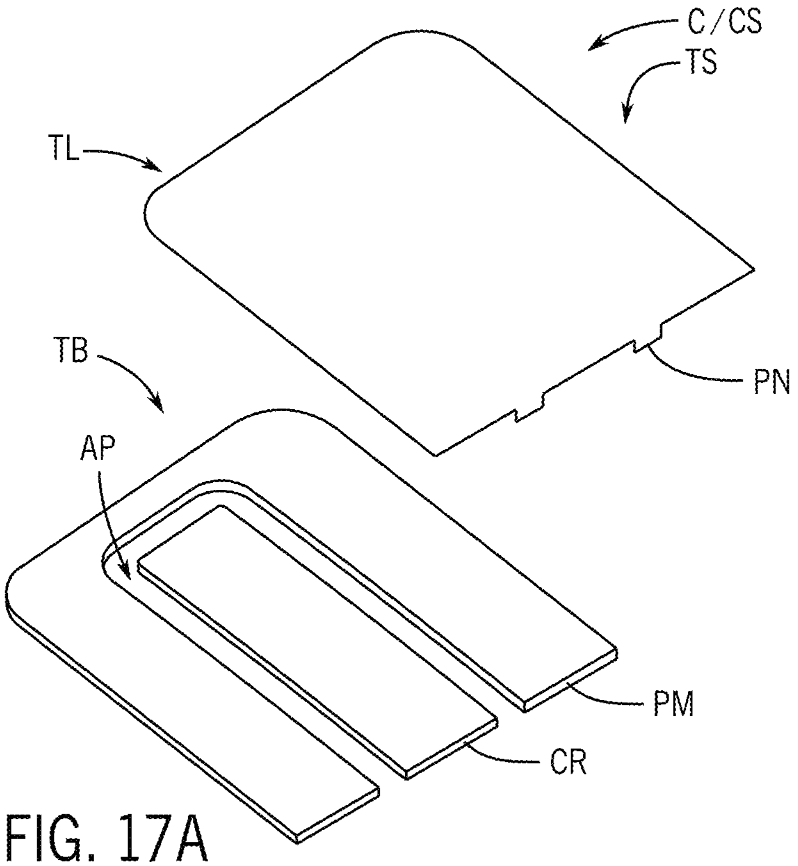
FIG. 17A is a schematic exploded partial perspective view of a component for a vehicle interior according to an exemplary embodiment.
Figure 17B:
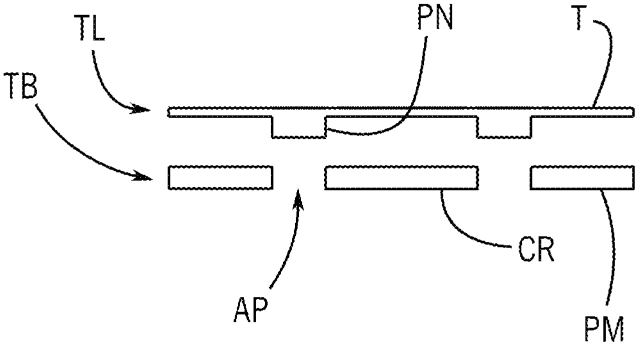
FIG. 17B is a schematic exploded partial section view of a component for a vehicle interior according to an exemplary embodiment.
Figure 17C:
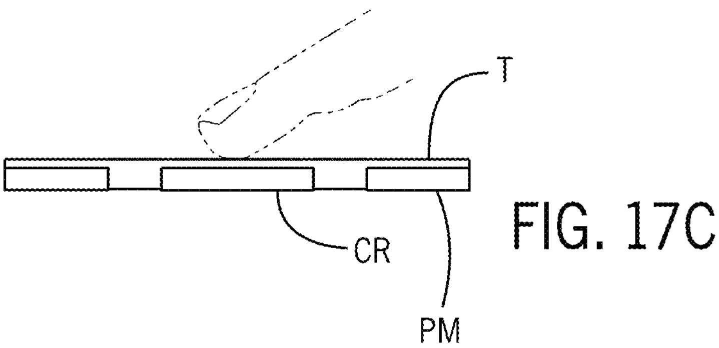
FIG. 17C is a schematic partial section view of a component for a vehicle interior according to an exemplary embodiment.
Figure 18A:
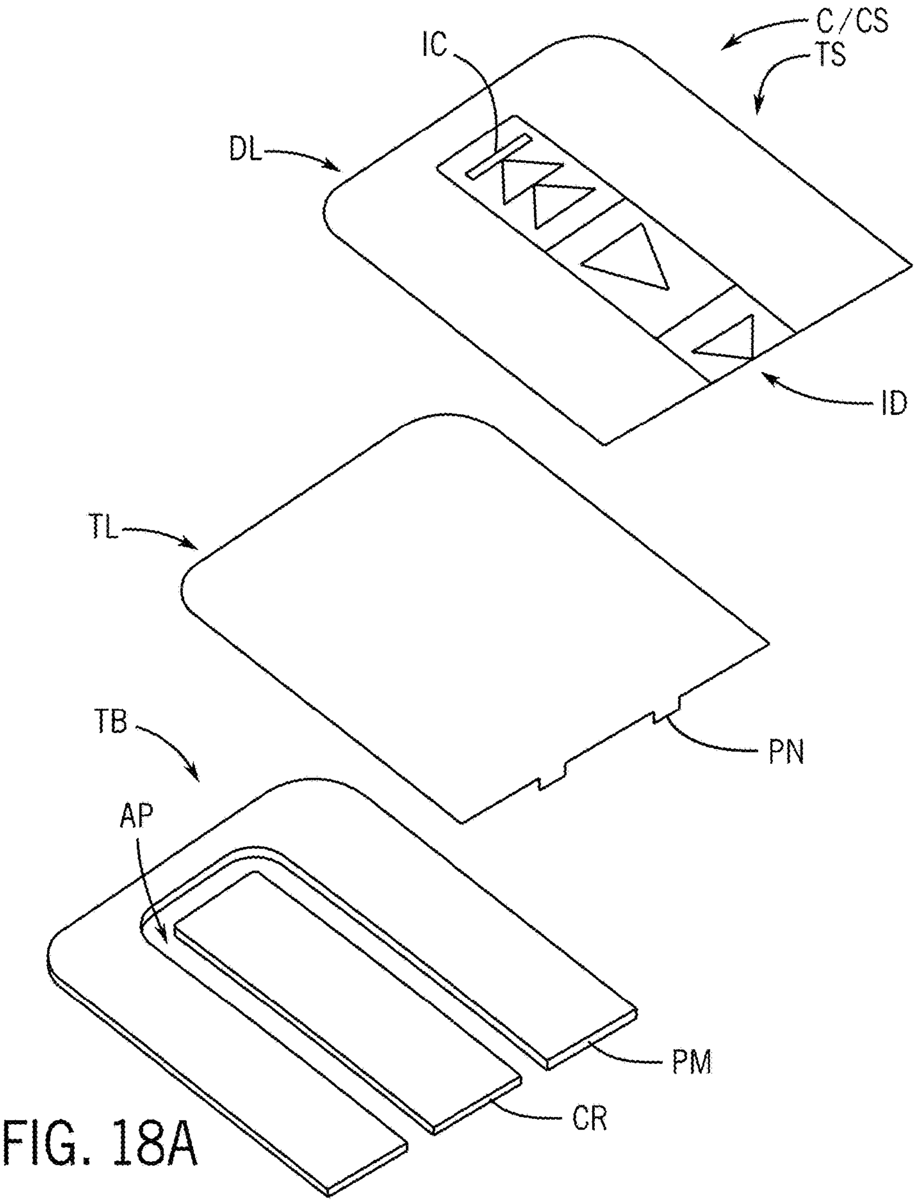
FIG. 18A is a schematic exploded partial perspective view of a component for a vehicle interior according to an exemplary embodiment.
Figure 18B:
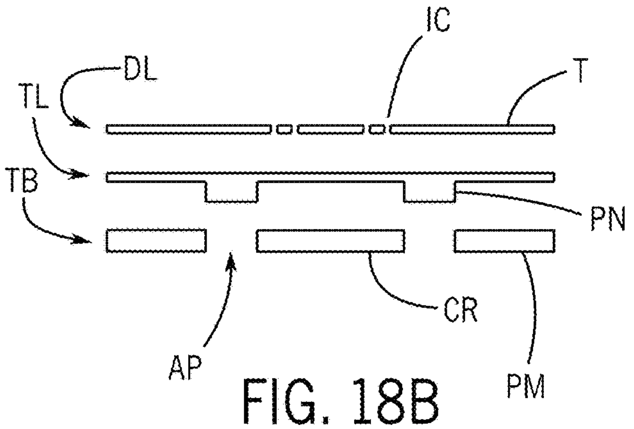
FIG. 18B is a schematic exploded partial section view of a component for a vehicle interior according to an exemplary embodiment.
Figure 18C:
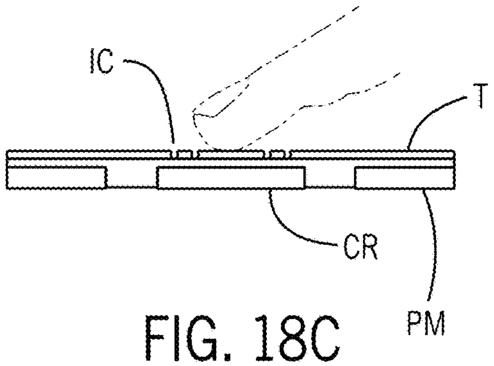
FIG. 18C is a schematic partial section view of a component for a vehicle interior according to an exemplary embodiment.
Figure 19A:
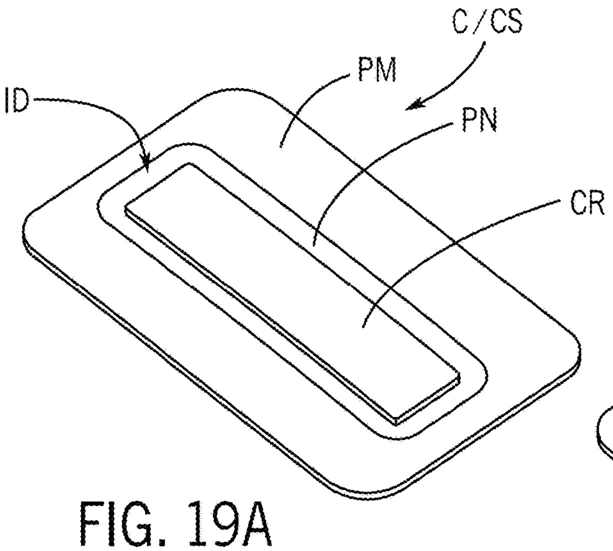
FIGS. 19A and 19B are schematic partial perspective views of a component for a vehicle interior according to an exemplary embodiment.
Figure 19B:
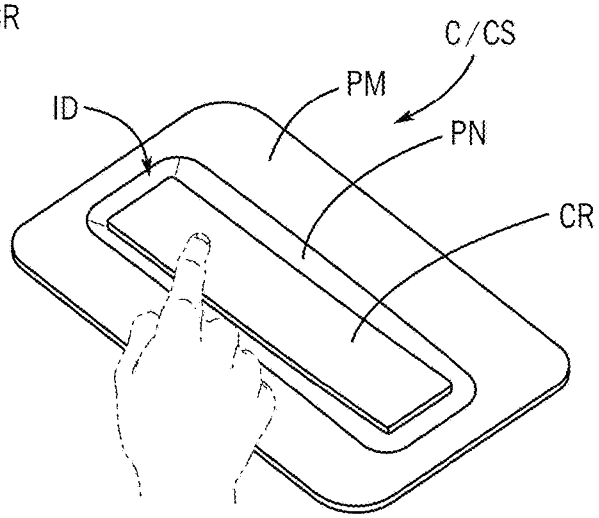
Figure 19C:
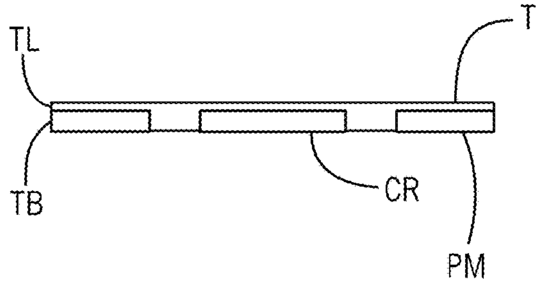
FIGS. 19C and 19D are schematic partial section views of a component for a vehicle interior according to an exemplary embodiment.
Figure 19D:
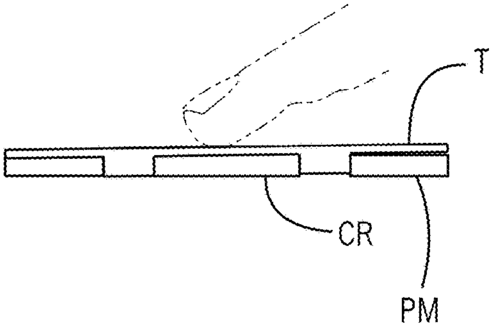
Figure 20A:
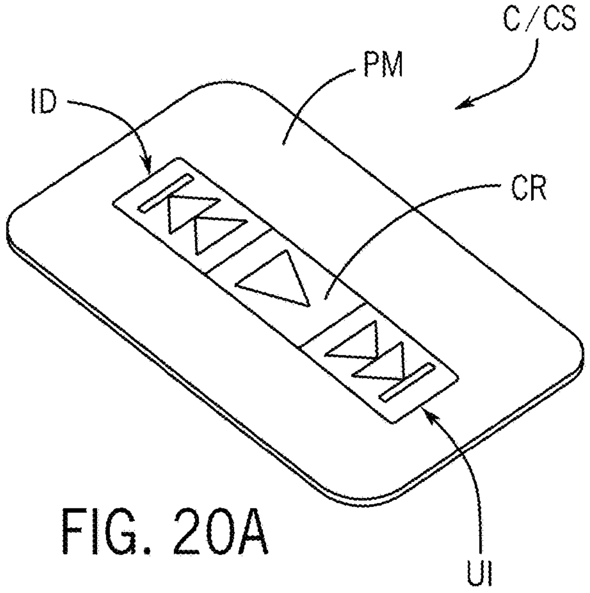
FIGS. 20A and 20B are schematic partial perspective views of a component for a vehicle interior according to an exemplary embodiment.
Figure 20B:
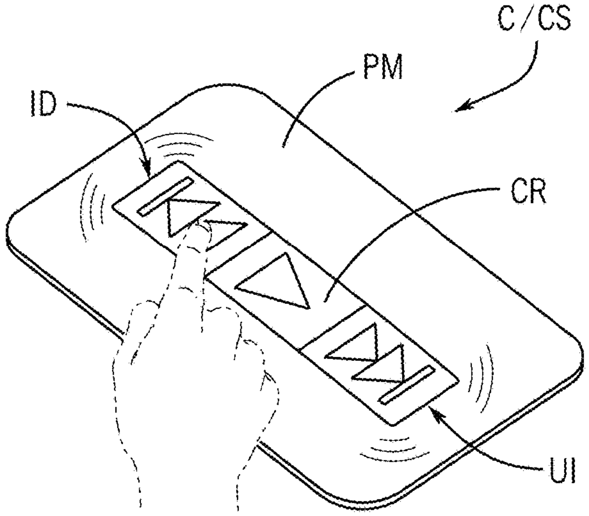
Figure 20C:
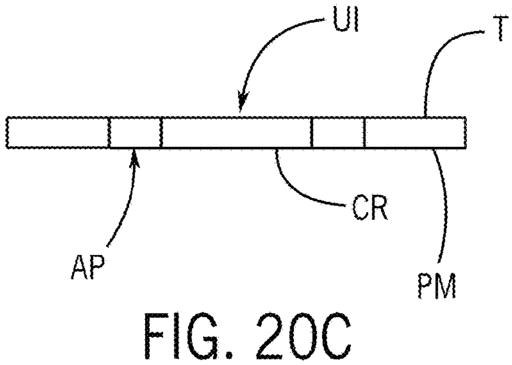
FIGS. 20C and 20D are schematic partial section views of a component for a vehicle interior according to an exemplary embodiment.
Figure 20D:
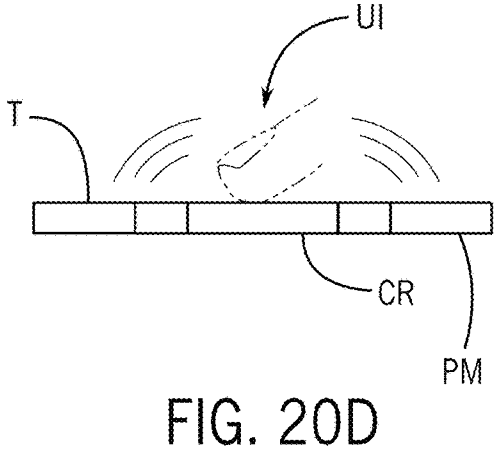
Figure 21A:
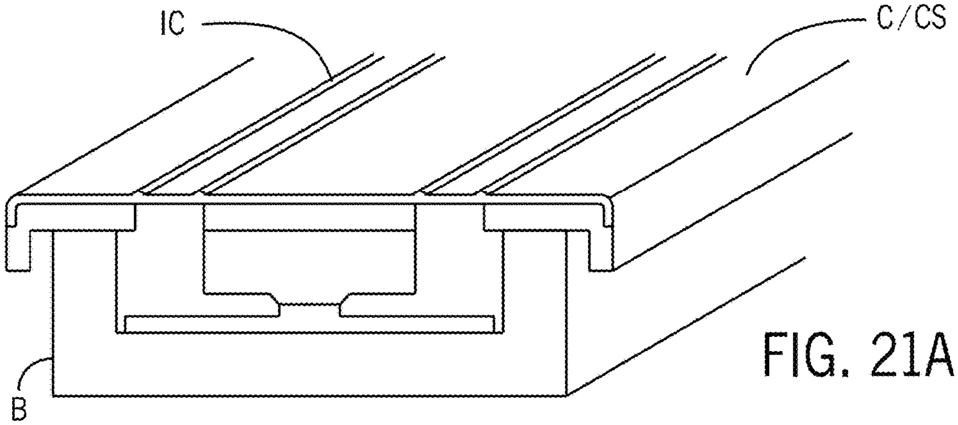
FIG. 21A is a schematic section perspective view of a component for a vehicle interior according to an exemplary embodiment.
Figure 21B:
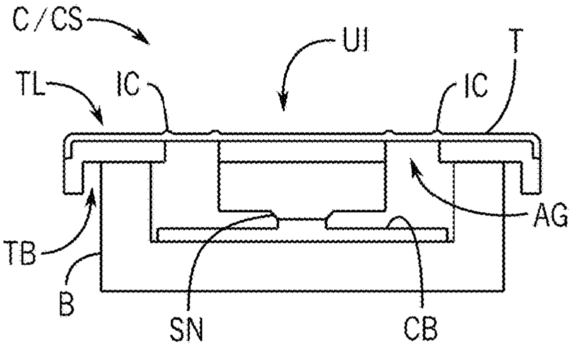
FIGS. 21B and 21C are schematic partial section views of a component for a vehicle interior according to an exemplary embodiment.
Figure 21C:
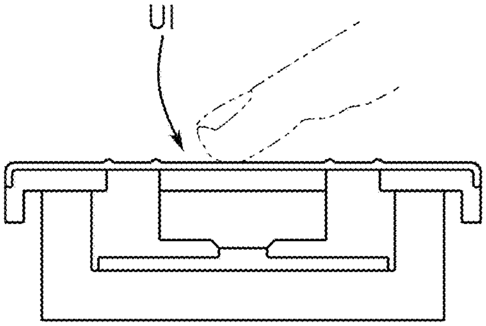
Figure 22:
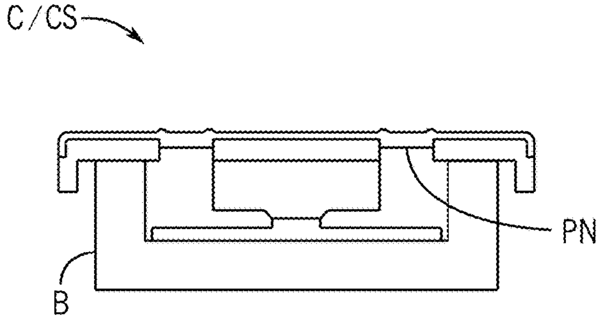
FIG. 22 is a schematic partial section view of a component for a vehicle interior according to an exemplary embodiment.
Figure 23:
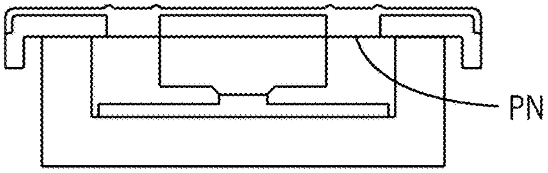
FIG. 23 is a schematic partial section view of a component for a vehicle interior according to an exemplary embodiment.
Figure 24:
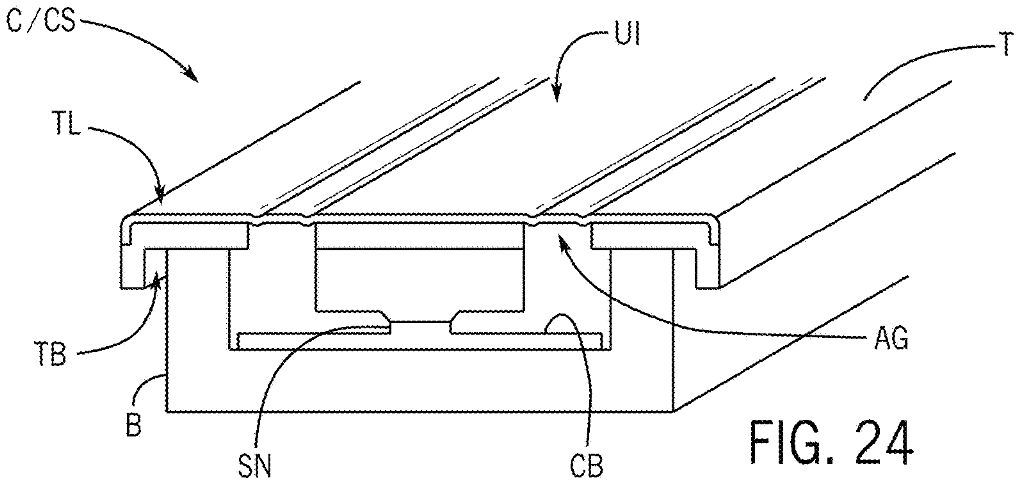
FIG. 24 is a schematic section perspective view of a component for a vehicle interior according to an exemplary embodiment.
Figure 25:
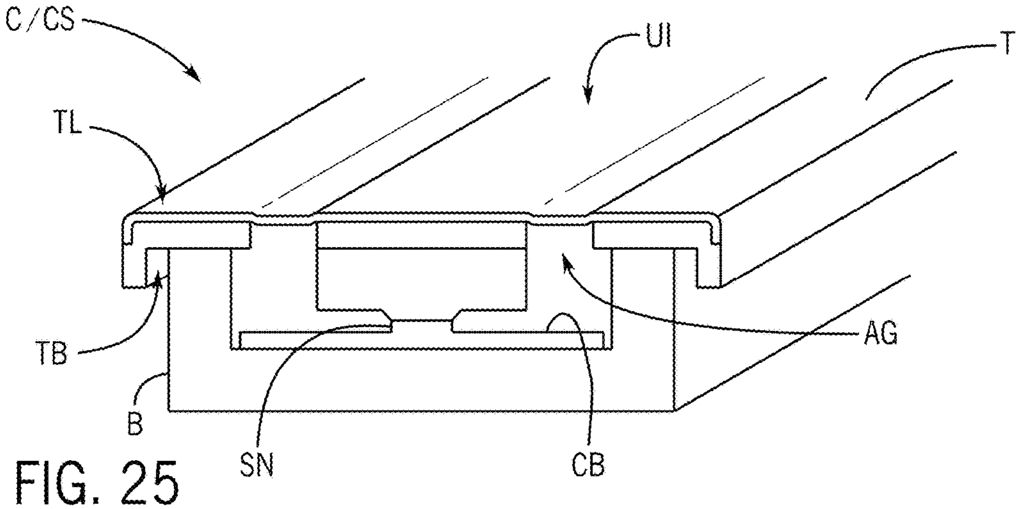
FIG. 25 is a schematic section perspective view of a component for a vehicle interior according to an exemplary embodiment.
Figure 26:
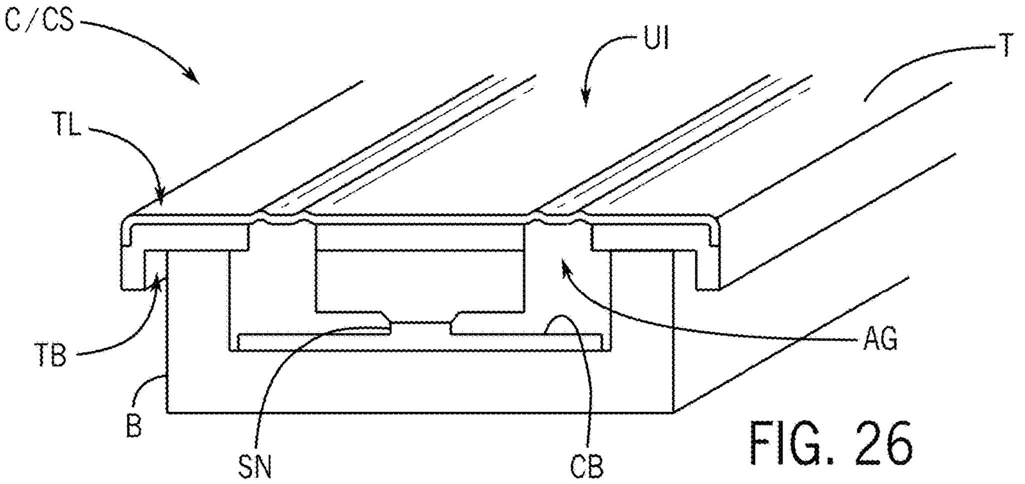
FIG. 26 is a schematic section perspective view of a component for a vehicle interior according to an exemplary embodiment.
Figure 27:
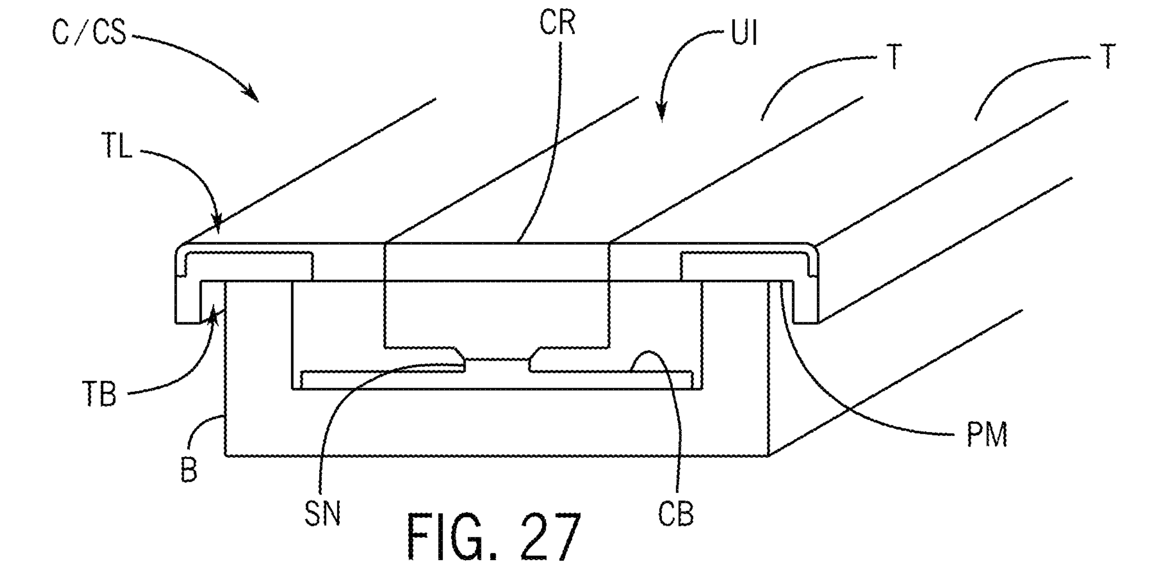
FIG. 27 is a schematic section perspective view of a component for a vehicle interior according to an exemplary embodiment.
Figure 28:
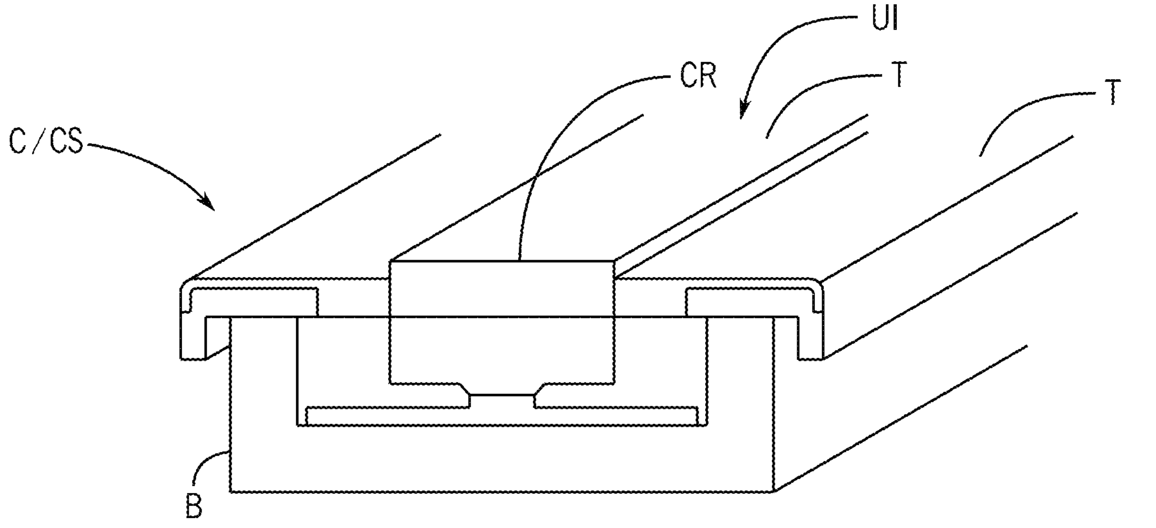
FIG. 28 is a schematic section perspective view of a component for a vehicle interior according to an exemplary embodiment.
Figure 29:
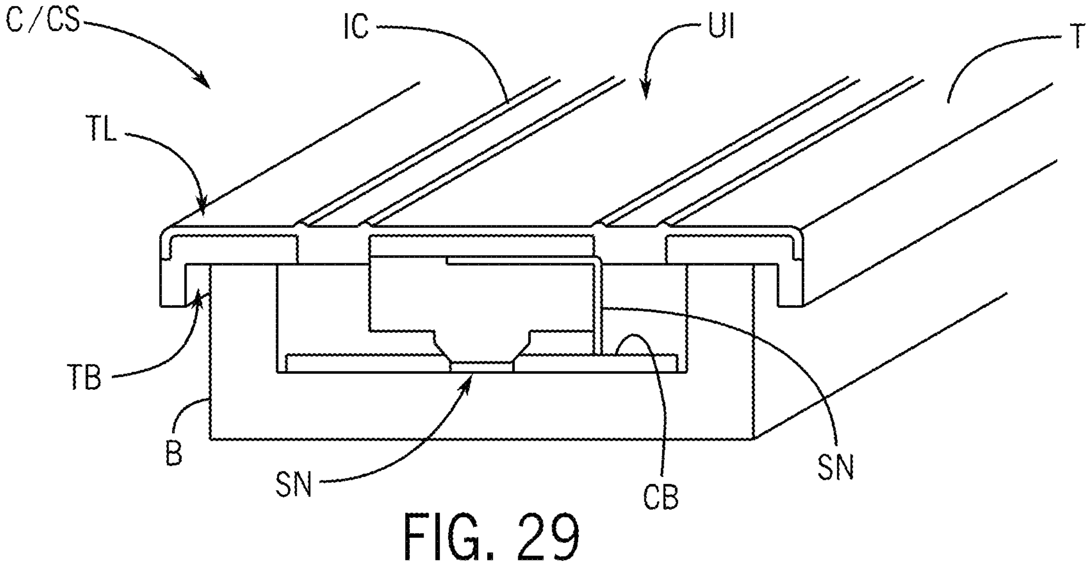
FIG. 29 is a schematic section perspective view of a component for a vehicle interior according to an exemplary embodiment.
Figure 30:
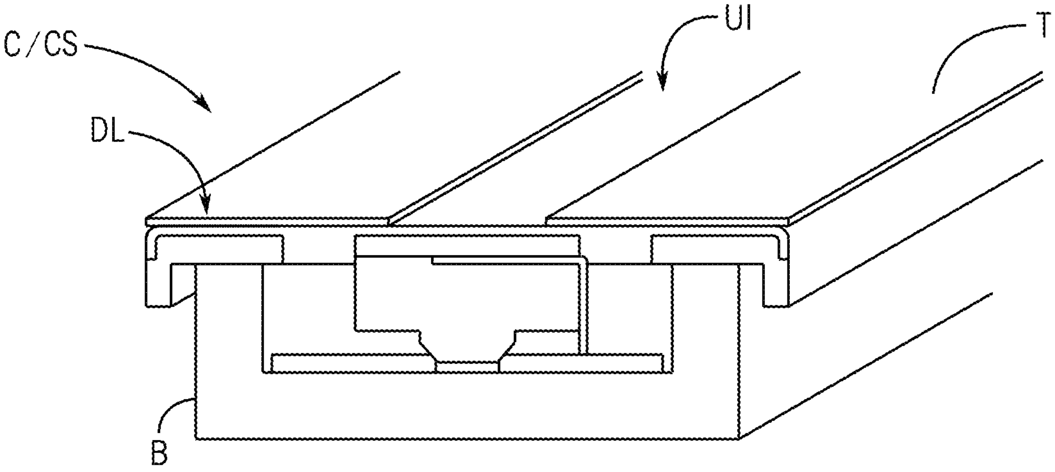
FIG. 30 is a schematic section perspective view of a component for a vehicle interior according to an exemplary embodiment.
Figure 31:
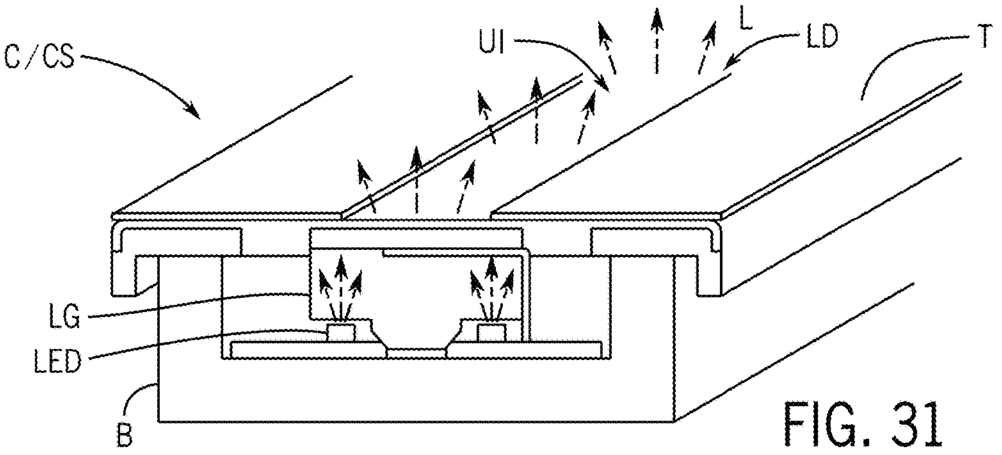
FIG. 31 is a schematic section perspective view of a component for a vehicle interior according to an exemplary embodiment.

Referring to FIGS. 1A and 1B, a vehicle V is shown schematically with an interior I. According to an exemplary embodiment as shown schematically in FIG. 1C, the vehicle interior may comprise vehicle interior components C shown (for example) as a console such as a floor console FC, a steering wheel SW, a door panel DP and an instrument panel IP. As indicated schematically according to an exemplary embodiment in FIGS. 4-7, the vehicle interior may comprise vehicle interior components C shown (for example) as a console such as a floor console FC, a steering wheel SW, a door panel DP and an overhead panel OHP.

Referring to FIGS. 1A-1D, a vehicle V is shown schematically with a vehicle interior I providing components C including a trim panel, an instrument panel IP, a door panel DP, a console such as a floor console FC and an overhead console for an overhead system/panel OHP, an operator control such as a steering wheel SW and seating for vehicle occupants shown as seats SZ. See FIGS. 4, 5, 6, 7 and 8A-8C.

As indicated schematically according to an exemplary embodiment in FIGS. 1B-1D, 2 and 3, a component C may comprise a user interface system UIS configured to present a user interface UI comprising an input device (such as a sensor, switch, button, audio device, video device, etc.) and/or an output device (such as a light display, haptics transducer, audio device, video device, etc.). See FIGS. 4, 5, 6, 7 and 8A-8C. As indicated schematically in FIGS. 4, 5, 6, 7 and 8A-8C, component C with user interface UI comprising input device ID and/or output device such as light display LD may comprise a console FC providing an armrest, a steering wheel SW, a door panel DP, an overhead system/panel OHP with a panel shown as fiber panel FP and base S/SB, etc. See FIGS. 8A-8C, 10A-10C and 34A-34C.

As indicated schematically in FIGS. 1C-1D, 2 and 3, component C may comprise a module configured to provide a user interface system UIS configured to provide user interface UI with input device ID and output device such as light display LD with a functional module FM and/or control module CM. As indicated schematically according to an exemplary embodiment in FIGS. 1C-1D, 2, 3, 4, 5, 6, 7 and 8A-8C, component C may provide user interface system UIS with user interface UI comprising the input device ID as an operator control for at least one vehicle system VS or with a connection to a network such as a vehicle network VN and/or other network N (including the internet); the vehicle system may comprise at least one of a vehicle communication system, vehicle entry locks, an HVAC system, an occupant comfort system, an occupant safety system, vehicle lighting, a vehicle entertainment system, a vehicle audio system, vehicle instrumentation, vehicle status information, vehicle operation system, mobile device connectivity, network connectivity.

As indicated schematically according to an exemplary embodiment in FIGS. 1C-1D, 2, 3, 4, 5, 6, 7, 8A-8C and 10A-10C, component C may comprise an assembly comprising a composite structure CS such as a cover structure TS and base/base structure B providing a substrate SB and a functional module FM for the user interface system with input device and output device; the functional module may be configured with or to operate at least one of a sensor or a switch or a detector or a light display or a display panel or a control panel or a transducer or a haptics actuator or a haptics transducer, etc.; user interface system UIS may be configured to provide the user interface (input device and/or output device) with functional module FM. See FIGS. 2, 3 and 14A-14D. The user interface system may comprise an interface with the functional module; the functional module may be coupled to vehicle systems and/or to a network. See FIGS. 2 and 3.

As indicated schematically according to an exemplary embodiment in FIGS. 4, 5, 6, 7, 8A-8C, 9A-9D, 10A-10C, 11, 12, 13, 14A-14D, 15A-15C, 16A-16C, 17A-17C, 18A-18C, 19A-19D and 20A-20D, component C may comprise an assembly comprising a composite structure comprising cover structure TS and base/substrate B/SB in any of a variety of configurations and arrangements. See FIGS. 21A-21C, 22, 23, 24, 25, 26, 27, 28, 29, 30, 31, 32, 33, 35, 36, 37 and 38. As indicated schematically, the composite structure may comprise a cover structure comprising a cover base and a cover layer configured to provide the user interface with an input device and/or an output device. The input device may comprise at least one of a sensor and/or a switch, a detector, a capacitive sensor, a touch sensor, a mechanical switch, etc.; the output device may comprise at least one of a light display and/or a haptics transducer; the light display may comprise a panel, a display panel, a button panel, lighting such as LED lighting, a light guide, etc.; the light display may be configured to present an image and/or icon display; the light display may be configured to present a decorative effect comprising an illuminated state and an unilluminated state; the haptics transducer may comprise a vibrating device/transducer to provide a tactile vibration for a haptics system; the user interface system may comprise a haptics system comprising a transducer and an actuator that may be actuated by the input device; the user interface system may comprise an output device comprising a haptics system for the user interface.

As indicated schematically according to an exemplary embodiment in FIGS. 9A-9D, 10A-10C, 11, 12, 13, 14A-14D, 15A-15C, 16A-16C, 17A-17C, 18A-18C, 19A-19D, 20A-20D, 21A-21C, 22, 23, 24, 25, 26, 27, 28, 29, 30, 31, 32, 33, 35, 36, 37 and 38, component C with composite structure comprising base B/SB with cover structure TS with cover base TB and cover layer TL may be formed in a variety of configurations and arrangements; the cover structure may be configured to present a variety of structural arrangements and a variety of decorative effects and configurations of a user interface with an input device and/or an output device for interaction with a vehicle operator (such as by touch, push, etc.). See FIGS. 2, 3, 4, 5, 6, 7 and 8A-8C. As indicated schematically according to an exemplary embodiment, the composite structure of the component may comprise a cover structure TS with a cover base TB and cover layer TL; the cover structure TS may comprise a core CR and perimeter PM comprising a feature such as an aperture AP (FIGS. 10A-10C and 11) and/or a connector/runner RN (FIGS. 12 and 13) and an arrangement with projection PN and/or gap AG (FIGS. 16A-16C, 17A-17C, 19A-19D, 22 and 23) and an arrangement with gap AG (FIGS. 24, 25, 26) and a decorative layer DL such as with elements such as presenting indicia/icons IC (FIGS. 18A-18C and 20A-20D) and integration with sensor SN such as detector element/layer (FIGS. 24, 25, 26, 27, 28, 29, 30, 35, 36, 37) and lighting system with a cover structure providing light-transmissive elements/segments for transmission of light L such as from light guide LG and/or LED lighting (FIGS. 31, 32, 33 and 38) and output device such as by a haptic system in a functional module that may comprise actuator AC (FIGS. 20A-20D and 32) and or a rib/set of ribs or groove/indentation arrangement (FIGS. 21A-21C, 22, 23, 24, 25, 26, 27, 28 and 29) and a decorative layer DL (FIGS. 18A-18C and 30). The cover structure may be configured to provide a decorative effect at the surface/cover layer; the decorative effect may comprise the input device for the user interface; the decorative effect may comprise an image, indicia, icon, set of icon, indicators, set of indicators, touch panel, buttons, etc.

As indicated schematically according to an exemplary embodiment in FIGS. 9A-9D, 10A-10C, 11, 12, 13, 14A-14D, 15A-15C, 16A-16C, 17A-17C, 18A-18C, 19A-19D, 20A-20D, 21A-21C, 22, 23, 24, 25, 26, 27, 28, 29, 30, 31, 32, 33, 35, 36, 37 and 38, component C with composite structure comprising base B/SB may comprise a cover structure TS with cover base TB and cover layer TL such as a panel; cover base TB may provide a core CR; cover base TB may provide a perimeter PM; the panel may be within an aperture AP in the cover base; the panel may comprise the user interface with an input device and/or an output device; the cover layer may comprise a flexible panel comprising the input device, a flexible structure, a deformable structure, a deformable panel comprising the input device, etc.

As indicated schematically according to an exemplary embodiment in FIGS. 9A-9D, 10A-10C, 11, 12, 13, 14A-14D, 15A-15C, 16A-16C, 17A-17C, 18A-18C, 19A-19D, 20A-20D, 21A-21C, 22, 23, 24, 25, 26, 27, 28, 29, 30, 31, 32, 33, 35, 36, 37 and 38, component C with composite structure comprising base B/SB may comprise a cover structure TS with a functional module FM comprising a sensor arrangement SN or a lighting system with lighting LED arrangement for the user interface system UIS. See FIGS. 2, 3 and 14A-14C. As indicated schematically in FIGS. 31, 32, 33 and 38, the cover structure may comprise a light-transmissive material and an opaque material configured to provide an illumination effect.

As indicated schematically according to an exemplary embodiment in FIGS. 9A-9D, 10A-10C, 11, 12, 13, 14A-14D, 15A-15C, 16A-16C, 17A-17C, 18A-18C, 19A-19D, 20A-20D, 21A-21C, 22, 23, 24, 25, 26, 27, 28, 29, 30, 31, 32, 33, 35, 36, 37 and 38, the composite structure may configured to provide a wide variety of visual effects; the visual effect may comprise a decorative effect of the decorative layer DL; the visual effect may comprise an illumination effect with indicia IC and light L from a lighting system with lighting elements LED; the visual effect may comprise a decorative effect of the decorative layer and the illumination effect.

As indicated schematically according to an exemplary embodiment in FIGS. 34A-34C, 35, 36, 37 and 38, the component shown as steering wheel SW with user interface UI with input device ID and output device shown as comprising light display LD may comprise a composite structure configured to facilitate deployment of an airbag AB through an airbag door ABD formed in cover structure TS; cover structure TS of the composite structure may comprise a recess RS configured to facilitate formation of the airbag door in the cover structure during deployment of an airbag from an airbag module.

As indicated schematically according to an exemplary embodiment in FIGS. 39A-39B, 40, 41A-41B, 42A-42C and 43A-43C, the component with composite structure comprising cover structure with cover base and cover layer may be formed in a variety of methods/processes into a variety of configurations and arrangements; the cover structure may comprise an integrally-formed structure such as an integrally-molded structure, a molded structure, a molded resin structure, a resin structure, a cover layer, a single-layer cover, a resin structure, etc.; the cover structure may comprise a base structure comprising the cover base.

Exemplary Embodiments—A

According to an exemplary embodiment as shown schematically in the FIGURES, a component for a vehicle interior configured to present a user interface may comprise a composite structure comprising a cover structure comprising a cover base, a cover layer and a cover surface. The cover structure may be configured to provide the user interface. The user interface may comprise an input device. The cover layer may be configured to cover at least a portion of the cover base. The cover base may comprise a core and a perimeter surrounding the core. The cover layer may extend into the cover base between the core of the cover base and the perimeter of the cover base. The cover layer may be configured to facilitate movement of the core of the cover base relative to the perimeter of the cover base. The component may comprise a gap between the core of the cover base and the perimeter of the cover base. The cover layer may be configured to form a border around the core of the cover base. The user interface may be configured for contact at the cover structure through the cover layer and the cover base. The cover layer may be molded on the cover base. The cover base may comprise an aperture surrounding the core of the cover base. The cover base may comprise an aperture between the core of the cover base and the perimeter of the cover base. The cover base may comprise an aperture configured to separate the core of the cover base and the perimeter of the cover base. The cover base may comprise an aperture; the cover layer may be molded in the aperture of the cover base. The cover base may comprise an aperture; the cover layer may extend into the aperture between the core of the cover base and the perimeter of the cover base. The cover base may comprise an aperture; the cover layer may fill the aperture between the core of the cover base and the perimeter of the cover base. The cover layer may comprise a first material and the cover base may comprise a second material different than the first material; the first material may be softer than the second material. The cover layer may provide the cover surface; the cover layer may comprise a projection configured to present the input device at the cover surface. The cover layer may provide the cover surface; the cover layer may comprise at least one of (a) a raised feature; (b) a depression; (c) an icon. The cover layer may be configured to deform as the input device is pressed. The cover surface may comprise (a) a surface of the core of the cover base and (b) a surface of the cover layer. The cover surface may comprise a surface of the core of the cover base projecting above a surface of the cover layer. The core of the cover base may provide the cover surface for the input device. The input device may comprise at least one of (a) a sensor; (b) a capacitive touch sensor; (c) a capacitive touch film. The cover base may comprise a runner configured to connect the core of the cover base and the perimeter of the cover base. The cover structure may comprise a decorative layer on the cover layer. The decorative layer may comprise an aperture configured to present the input device at the cover surface. Material of the decorative layer may comprise a color different than a color of material of the cover layer. The aperture may be configured to present an icon comprising the color of the cover layer. The decorative layer may comprise an aperture configured to transmit light from a light source to the cover surface. The decorative layer may provide the cover surface; the decorative layer may be configured to present the input device at the cover surface. The decorative layer may provide the cover surface; the decorative layer may comprise at least one of (a) a raised feature; (b) a depression; (c) an icon. The decorative layer may be laminated on the cover layer. The decorative layer may comprise at least one of (a) a paint material; (b) an ink material. The decorative layer may comprise a depression formed by removal of a portion of the at least one of (a) the paint material; (b) the ink material. The decorative layer may comprise an opaque material; the cover layer may comprise a light-transmissive material; the cover base may comprise a light-transmissive material. The cover layer may comprise at least one of (a) an injection molded polypropylene; (b) a generally transparent resin material; (c) a light-transmissive material; (d) a PC material; (e) an ABS material; (f) a nylon material; (g) a clear amorphous material; (h) a clarified resin. The cover base may comprise at least one of (a) an injection molded polypropylene; (b) a generally transparent resin material; (c) a light-transmissive material; (d) a PC material; (e) an ABS material; (f) a nylon material; (g) a clear amorphous material; (h) a clarified resin. The component may comprise a user interface system configured to present the user interface at the cover surface comprising (a) a light display configured to transmit light from a light source and (b) the input device. The cover structure may comprise a decorative layer on the cover layer; the decorative layer may comprise an aperture configured to transmit light from the light source to present the input device at the cover surface. The decorative layer may comprise a color different than a color the cover layer; the aperture may be configured to present an illuminated icon comprising the color of the cover layer. The decorative layer may comprise an opaque material; the cover layer may comprise a light-transmissive material; the cover base may comprise a light-transmissive material. The cover layer may comprise a light-transmissive material; the cover base may comprise an opaque material; the cover layer may be configured to form an illuminated border around the core of the cover base. The cover layer may comprise a light-transmissive material; the cover base may comprise an opaque material; the cover layer may be configured to transmit light from the light source between the core of the cover base and the perimeter of the cover base. The input device may comprise a light guide between the light source and the core of the cover base. The component may comprise a sensor between the light guide and the core of the cover base. The component may comprise a user interface system configured to present the user interface at the cover surface comprising (a) an actuator configured to provide feedback at the cover surface and (b) the input device. The actuator may be configured to provide at least one of (a) a force at the cover surface; (b) vibration at the cover surface; (c) motion at the cover surface. The actuator may be coupled to the core of the cover base. The actuator may be configured to deform the cover layer between the core of the cover base and the perimeter of the cover base. The cover structure may comprise a decorative layer on the cover layer; the decorative layer may comprise an aperture configured to transmit light from the light source to present a light display. The cover layer may be configured to transmit light from a light source between the core of the cover base and the perimeter of the cover base. The input device may comprise a light guide between a light source and the core of the cover base. The component may comprise a light guide configured to transmit light from a light source to the core of the cover base. The light guide may be configured to transmit at least one of (a) a force from the actuator to the cover surface; (b) vibration from the actuator to the cover surface; (c) motion from the actuator to the cover surface. The component may comprise a sensor between the light guide and the core of the cover base. The cover structure may be configured to facilitate deployment of an airbag into the vehicle interior. The cover base may comprise a recess formed as an indentation in a rear side of the cover base; the recess may be configured to direct deployment of the airbag through the cover structure. The input device may comprise a light guide configured to transmit light from a light source to the core of the cover base. The input device may comprise at least one of a sensor and/or a switch. The input device may comprise a sensor; the sensor may comprise at least one of (a) a detector; (b) a capacitive sensor; (c) a touch sensor; (d) a mechanical switch. The input device may comprise an operator control for at least one vehicle system. The user interface may comprise the input device and an output device. The output device may comprise at least one of a light display and/or a haptics transducer. The output device may comprise a light display; the light display may comprise at least one of (a) a panel; (b) a display panel; (c) a button panel; (d) lighting; (e) a light guide; (f) LED lighting. The output device may comprise a light display; the light display may be configured to present at least one of (a) an image; (b) an icon. The light display may be configured to present a decorative effect; the decorative effect may comprise an illuminated state. The component may comprise a user interface system for the cover structure configured to present the user interface. The user interface system may comprise at least one of (a) a haptics system; (b) a haptics system comprising a transducer; (c) a haptics system comprising a transducer and an actuator; (d) an output device comprising a haptics system; (e) an output device comprising a lighted panel. The user interface system may comprise an output device comprising a haptics system comprising a transducer and an actuator; the user interface system may be actuated by the input device. The component may comprise an assembly comprising the composite structure and a functional module; the functional module may be configured to operate at least one of (a) a sensor or (b) a switch or (c) a detector or (d) a light display or (e) a display panel or (f) a control panel or (g) a transducer or (h) a haptics actuator or (i) a haptics transducer. The composite structure may comprise a base; the base may comprise a functional module; the functional module may be configured to present the user interface. The cover structure may comprise at least one of (a) an integrally-formed structure; (b) an integrally-molded structure; (c) a molded structure; (d) a molded resin structure; (e) a resin structure; (f) a cover layer; (g) a single-layer cover. The cover layer may comprise a resin structure. The cover layer may comprise a feature. The feature may comprise at least one of (a) a projection; (b) a projection at a surface of the cover layer; (c) a projection below the cover layer; (d) a rib; (e) a set of ribs; (f) an aperture; (g) an indentation; (h) an indentation and a projection; (i) a projection configured to fit within a recess in the cover base. The feature may be configured to provide the input device for the user interface. The feature may be configured to provide a decorative effect at the cover structure; the decorative effect may comprise the user interface. The cover structure may comprise a decorative layer configured to provide a decorative effect at a surface. The decorative effect may comprise at least one of (a) an image; (b) an icon. The decorative effect may comprise a set of indicators for the input device. The cover layer may comprise a panel presenting the user interface. The cover layer may comprise a panel comprising the input device and an output device. The cover layer may comprise at least one of (a) a flexible structure; (b) a deformable structure. The cover structure of the composite structure may comprise a recess configured to facilitate formation of an airbag door in the cover structure during deployment of an airbag. The input device may comprise an operator control for at least one vehicle system; the at least one vehicle system may comprise at least one of (a) a vehicle communication system; (b) vehicle entry locks; (c) an HVAC system; (d) an occupant comfort system; (e) an occupant safety system; (f) vehicle lighting; (g) a vehicle entertainment system; (h) a vehicle audio system; (i) vehicle instrumentation; (j) vehicle status information; (k) vehicle operation system; (l) mobile device connectivity; (m) network connectivity. The component may comprise at least one of (a) a steering wheel assembly; (b) a console; (c) a floor console; (d) a center console; (e) an instrument panel; (f) a door panel; (g) a dashboard; (h) a display; (i) an arm rest; (j) a cockpit; (k) a trim panel, (l) an overhead console; (m) an overhead system; (n) an operator control.

According to an exemplary embodiment as shown schematically in the FIGURES, a component for a vehicle interior configured to provide a user interface for interaction with a vehicle occupant in a vehicle providing at least one vehicle system may comprise (a) a cover structure comprising a cover surface; and (b) an input device. The cover structure may comprise a composite cover comprising a cover layer and a cover base. The cover layer may be configured to cover at least a portion of the cover base. The cover base may comprise a core and a perimeter surrounding the core. The input device may comprise the core of the cover base.

Exemplary Embodiments—B

According to an exemplary embodiment as shown schematically in the FIGURES, a component for a vehicle interior configured to present a user interface may comprise a composite structure comprising a cover structure comprising a cover base and a cover layer. The cover structure may be configured to provide the user interface. The user interface may comprise an input device. The cover structure may comprise the cover base and the cover layer and a cover surface. The cover layer may be configured to cover at least a portion of the cover base. The cover base may comprise a core and a perimeter surrounding the core. The cover layer extends into the cover base between the core of the cover base and the perimeter of the cover base. The cover layer may be configured to facilitate movement of the core of the cover base relative to the perimeter of the cover base. The component may comprise an air gap between the core of the cover base and the perimeter of the cover base. The cover layer may be configured to form a border around the core of the cover base. The user interface may be configured for contact at the cover structure through the cover layer and the cover base. The cover layer may be molded on the cover base. The cover base may comprise an aperture surrounding the core of the cover base. The cover base may comprise an aperture between the core of the cover base and the perimeter of the cover base. The cover base may comprise an aperture configured to separate the core of the cover base and the perimeter of the cover base. The cover base may comprise an aperture; the cover layer may be molded in the aperture of the cover base. The cover base may comprise an aperture; the cover layer extends into the aperture between the core of the cover base and the perimeter of the cover base. The cover base may comprise an aperture; the cover layer fills the aperture between the core of the cover base and the perimeter of the cover base. The cover layer may comprise a first material and the cover base may comprise a second material different than the first material; the first material may be softer than the second material. The cover layer may provide the cover surface; the cover layer may comprise a projection configured to present the input device at the cover surface. The cover layer may provide the cover surface; the cover layer may comprise at least one of (a) a raised feature; (b) a depression; (c) an icon. The cover layer may be configured to deform as the input device is depressed. The cover surface may comprise (a) a surface of the core of the cover base and (b) a surface of the cover layer. The cover surface may comprise a surface of the core of the cover base projecting above a surface of the cover layer. The core of the cover base may provide the cover surface for the input device. The input device may comprise at least one of (a) a sensor; (b) a capacitive touch sensor; (c) a capacitive touch film. The cover base may comprise a runner configured to connect the core of the cover base and the perimeter of the cover base. The cover structure may comprise a decorative layer on the cover layer. The decorative layer may comprise an aperture configured to present the input device at the cover surface. The aperture may comprise at least one of (a) a depression; (b) an icon. The decorative layer may comprise a material different than a material of the cover layer. The material of the decorative layer may comprise a color different than a color of the material of the cover layer. The aperture may be configured to present an icon comprising the color of the cover layer. The decorative layer may comprise an aperture configured to transmit light from a light source to the cover surface. The decorative layer may provide the cover surface; the decorative layer may be configured to present the input device at the cover surface. The decorative layer may provide the cover surface; the decorative layer may comprise at least one of (a) a raised feature; (b) a depression; (c) an icon. The decorative layer may comprise a laminate. The decorative layer may be laminated on the cover layer. The decorative layer may comprise at least one of (a) a paint material; (b) an ink material. The decorative layer may comprise a depression formed by removal of a portion of the at least one of (a) the paint material; (b) the ink material. The decorative layer may comprise an opaque material. The cover layer may comprise a light-transmissive material; the cover base may comprise a light-transmissive material. The cover layer may comprise at least one of (a) an injection molded polypropylene; (b) a generally transparent resin material; (c) a light-transmissive material; (d) a PC material; (e) an ABS material; (f) a nylon material; (g) a clear amorphous material; (h) a clarified resin. The cover base may comprise at least one of (a) an injection molded polypropylene; (b) a generally transparent resin material; (c) a light-transmissive material; (d) a PC material; (e) an ABS material; (f) a nylon material; (g) a clear amorphous material; (h) a clarified resin. The component may comprise a user interface system configured to present the user interface at the cover surface comprising (a) a light display configured to transmit light from a light source and (b) the input device. The cover structure may comprise a decorative layer on the cover layer; the decorative layer may comprise an aperture configured to transmit light from the light source to present the input device at the cover surface. The aperture may comprise at least one of (a) a depressed feature; (b) an icon. The decorative layer may comprise a color different than a color the cover layer; the aperture may be configured to present an illuminated icon comprising the color of the cover layer. The decorative layer may comprise an opaque material; the cover layer may comprise a light-transmissive material; the cover base may comprise a light-transmissive material. The cover layer may comprise a light-transmissive material; the cover base may comprise an opaque material; the cover layer may be configured to form an illuminated border around the core of the cover base. The cover layer may comprise a light-transmissive material; the cover base may comprise an opaque material; the cover layer may be configured to transmit light from the light source between the core of the cover base and the perimeter of the cover base. The input device may comprise a light guide between the light source and the core of the cover base. The light guide may be configured to transmit light from the light source to the core of the cover base. The component may comprise a sensor between the light guide and the core of the cover base. The sensor may comprise at least one of (a) a capacitive touch sensor; (b) a capacitive touch film. The component may comprise a user interface system configured to present the user interface at the cover surface comprising (a) an actuator configured to provide feedback at the cover surface and (b) the input device. The actuator may be configured to provide at least one of (a) a force at the cover surface; (b) vibration at the cover surface; and/or (c) motion at the cover surface. The cover layer may be configured to facilitate vibration of the core of the cover base. The actuator may be coupled to the core of the cover base. The actuator may be configured to deform the cover layer between the core of the cover base and the perimeter of the cover base. The user interface system may comprise a light display configured to transmit light from a light source. The cover structure may comprise a decorative layer on the cover layer; the decorative layer may comprise an aperture configured to transmit light from the light source to present the light display. The cover structure may comprise a decorative layer on the cover layer; the decorative layer may be configured to present an icon illuminated by the light source. The cover layer may be configured to transmit light from the light source between the core of the cover base and the perimeter of the cover base. The input device may comprise a light guide between the light source and the core of the cover base. The light guide may be configured to transmit light from the light source to the core of the cover base. The light guide may be coupled to the actuator. The light guide may be configured to transmit at least one of (a) a force from the actuator to the cover surface; (b) vibration from the actuator to the cover surface; and/or (c) motion from the actuator to the cover surface. The component may comprise a sensor between the light guide and the core of the cover base. The sensor may comprise at least one of (a) a capacitive touch sensor; (b) a capacitive touch film. The cover structure may be configured to facilitate deployment of an airbag into the vehicle interior. The cover base and the cover layer may be configured to break apart to facilitate deployment of the airbag into the vehicle interior. The cover base may comprise a recess formed as an indentation in the rear side of the cover base; the recess may be configured to direct deployment of the airbag through the cover structure. The cover layer may be configured to prevent visibility of the recess in the cover base. The cover structure may comprise a decorative layer on the cover layer; the decorative layer may be configured to prevent visibility of the recess in the cover base. The cover base may comprise a through hole configured to direct deployment of the airbag through the cover structure; the cover layer may be molded in the through hole. The input device may comprise a light guide configured to transmit light from a light source to the core of the cover base. The component may comprise at least one of (a) a steering wheel assembly; (b) a console; (c) a floor console; (d) a center console; (e) an instrument panel; (f) a door panel; (g) a dashboard; (h) a display; (i) an arm rest; (j) a cockpit. The user interface may comprise the input device and an output device. The input device may comprise at least one of a sensor and/or a switch. The sensor may comprise a detector. The sensor may comprise a capacitive sensor. The sensor may comprise a touch sensor. The switch may comprise a mechanical switch. The input device may comprise an operator control for at least one vehicle system. The output device may comprise at least one of a light display and/or a haptics transducer. The light display may comprise a panel. The light display may comprise a display panel. The light display may comprise a button panel. The light display may comprise lighting. Lighting may comprise LED lighting. The light display may comprise a light guide. The light display may comprise the light guide and LED lighting. The light display may be configured to present an image. The light display may be configured to present an image; the icon may comprise a set of icons. The light display may be configured to present an icon. The light display may be configured to present an icon; the icon may comprise a set of icons. The light display may be configured to present a decorative effect. The decorative effect may comprise an illuminated state and an unilluminated state. The illuminated state may comprise a set of icons. The haptics transducer may comprise a vibrating transducer. The haptics transducer may be configured to provide a tactile vibration. The component may comprise a user interface system for the cover structure configured to present the user interface. The component may comprise a functional module. The component may comprise an assembly comprising the composite structure and a functional module. The functional module may be configured to operate at least one of (a) a sensor or (b) a switch or (c) a detector or (d) a light display or (e) a display panel or (f) a control panel or (g) a transducer or (h) a haptics actuator or (i) a haptics transducer. The user interface system may be configured to provide the user interface with the functional module. The user interface system may comprise an interface with the functional module. The functional module may be coupled to vehicle systems. The functional module may be coupled to a network. The network may comprise a vehicle network. The network may comprise the internet. The network may comprise a communications network configured to provide data for the user interface. The functional module may be operated by a control module. The functional module may comprise a control module. The user interface system may comprise a haptics system. The user interface system may comprise a haptics system comprising a transducer. The user interface system may comprise a haptics system comprising a transducer and an actuator. The user interface system may comprise a haptics system comprising a transducer and an actuator; the user interface system may be actuated by the input device. The user interface system may comprise an output device comprising a haptics system. The user interface system may comprise an output device comprising a haptics system for the user interface. The user interface system may comprise an output device comprising a haptics system comprising a transducer and an actuator; the user interface system may be actuated by the input device. The user interface system may comprise an output device comprising a lighted panel. The user interface system may comprise an output device comprising a lighted panel for the user interface. The composite structure may comprise a base. The composite structure may comprise a substrate. The composite structure may comprise a panel. The cover structure may comprise a cover panel. The composite structure may comprise a base; the base may comprise a functional module; the functional module may be configured to present the user interface. The composite structure may comprise a base; the base may comprise a user interface system; the user interface system may comprise a functional module; the functional module may be configured to present the user interface. The cover structure may comprise an integrally-formed structure. The cover structure may comprise an integrally-molded structure. The cover structure may comprise a molded structure. The cover structure may comprise a molded resin structure. The cover structure may comprise a resin structure. The cover structure may comprise a cover layer. The cover structure may comprise a single-layer cover. The cover layer may comprise a resin structure. The cover structure may comprise a base structure comprising the cover base. The cover base may comprise an aperture. The cover layer may be configured to present the user interface. The cover layer may be configured to present a decorative effect. The cover layer may be configured to present a decorative effect and the user interface. The cover layer may comprise a feature. The feature may comprise a projection. The feature may comprise a projection at a surface of the cover layer. The feature may comprise a projection below the cover layer. The feature may comprise a rib. The feature may comprise a set of ribs. The feature may comprise an aperture. The feature may comprise an indentation. The feature may comprise an indentation and a projection. The feature may comprise a projection configured to fit within a recess in the cover base. The feature may be configured to provide the input device for the user interface. The feature may be configured to provide a decorative effect at the cover structure. The decorative effect of the input device may comprise the user interface. The cover structure may comprise a decorative layer. The cover structure may comprise a decorative layer on the cover layer. The cover structure may comprise a decorative layer configured to provide a decorative effect at a surface. The decorative effect may comprise an image. The decorative effect may comprise an icon. The decorative effect may comprise a set of icon. The decorative effect may comprise a set of indicators. The decorative effect may comprise a set of indicators for the input device. The decorative effect may comprise a set of indicators for a touch panel for the input device. The decorative effect may comprise a set of buttons for the input device. The cover layer may comprise a panel. The cover layer may comprise a panel within an aperture in the cover base. The cover layer may comprise a panel connected to the cover base. The cover layer may comprise a panel presenting the user interface. The cover layer may comprise a panel comprising the input device. The cover layer may comprise a panel comprising the input device comprising a touch panel. The cover layer may comprise a panel comprising the input device and an output device. The cover layer may comprise a flexible panel comprising the input device. The cover layer may comprise a flexible structure. The cover layer may comprise a deformable structure. The cover layer may comprise a deformable panel comprising the input device. The cover base may comprise a functional module for the user interface system. The cover base may comprise a sensor. The cover base may comprise a sensor element. The cover base may comprise a lighting system. The cover base may comprise a lighting system comprising a light guide and an LED system. The cover layer may comprise a light-transmissive material. The cover layer may comprise a light-transmissive material and an opaque material. The cover layer may comprise a light-transmissive material and an opaque material configured to provide an illumination effect. The composite structure may comprise a decorative layer; the cover layer may comprise a light-transmissive material and an opaque material configured to provide an illumination effect. The composite structure may be configured to provide a visual effect. The visual effect may comprise a decorative effect of the decorative layer. The visual effect may comprise the illumination effect. The visual effect may comprise a decorative effect of the decorative layer and the illumination effect. The composite structure may comprise a panel. The composite structure may comprise a fiber panel. The composite structure may be configured to facilitate deployment of an airbag. The composite structure may be configured to facilitate deployment of an airbag from an airbag module. The composite structure may be configured to facilitate deployment of an airbag through an airbag door formed in the cover structure. The composite structure may be configured to facilitate formation of an airbag door in the cover structure during deployment of an airbag. The composite structure may be configured to facilitate formation of an airbag door in the cover structure during deployment of an airbag from an airbag module. The cover structure of the composite structure may comprise a recess configured to facilitate formation of an airbag door in the cover structure during deployment of an airbag from an airbag module. The input device may comprise an operator control for at least one vehicle system; the vehicle system may comprise at least one of a vehicle communication system, vehicle entry locks, an HVAC system, an occupant comfort system, an occupant safety system, vehicle lighting, a vehicle entertainment system, a vehicle audio system, vehicle instrumentation, vehicle status information, vehicle operation system, mobile device connectivity, network connectivity. The component may comprise at least one of a trim panel, an instrument panel, a door panel, a console, a floor console, an overhead console, an overhead system, an operator control, a steering wheel. The cover structure may comprise a cover surface and the input device may comprise a button. The cover structure may comprise a composite cover comprising the cover layer and the cover base. The cover layer may be configured to cover at least a portion of the cover base. The cover base may comprise a core and a perimeter surrounding the core. The input device may comprise the core of the cover base. The cover structure may comprise a cover surface. The cover structure may comprise a composite cover comprising the cover layer and the cover base. The cover layer may be configured to cover at least a portion of the cover base. The cover base may comprise a core and a perimeter surrounding the core. The input device may comprise the core of the cover base.

According to an exemplary embodiment as shown schematically in the FIGURES, a component for a vehicle interior configured to provide a user interface for interaction with a vehicle occupant in a vehicle providing at least one vehicle system may comprise (a) a cover structure comprising a cover surface; and (b) an input device comprising a button. The cover structure may comprise a composite cover comprising a cover layer and a cover base. The cover layer may be configured to cover at least a portion of the cover base. The cover base may comprise a core and a perimeter surrounding the core. The input device may comprise the core of the cover base.

Exemplary Embodiments—C

According to an exemplary embodiment as shown schematically in the FIGURES, a component C for a vehicle interior configured to provide a user interface UI for interaction with a vehicle occupant in a vehicle providing at least one vehicle system may comprise (a) a cover structure TS comprising a cover surface T; and (b) an input device ID comprising a button. The cover structure may comprise a composite cover comprising a cover layer TL and a cover base TB. The cover layer may be configured to cover at least a portion of the cover base. The cover base may comprise a core CR and a perimeter PM surrounding the core. The input device may comprise the core of the cover base. The cover layer may extend into the cover base between the core of the cover base and the perimeter of the cover base. (See projection PN of the cover layer in FIGS. 16A-16C, 17A-17C, 18A-18C, 19A-19D, 22, 23, 27, 28, 29, 30, 31, 32 and 33.) The cover layer may be configured to facilitate movement of the core of the cover base relative to the perimeter of the cover base. The component may comprise an air gap AG between the core of the cover base and the perimeter of the cover base. The cover layer may be configured to form a border around the core of the cover base. The user interface may be configured for contact at the cover structure through the cover layer and the cover base. The cover layer may be molded on the cover base. The cover base may comprise an aperture AP surrounding the core of the cover base. The cover base may comprise an aperture AP between the core of the cover base and the perimeter of the cover base. The cover base may comprise an aperture AP configured to separate the core of the cover base and the perimeter of the cover base. The cover base may comprise an aperture AP; the cover layer may be molded in the aperture of the cover base. The cover base may comprise an aperture AP; the cover layer may extend into the aperture between the core of the cover base and the perimeter of the cover base. The cover base may comprise an aperture AP; the cover layer may fill the aperture between the core of the cover base and the perimeter of the cover base. The cover layer may comprise a first material and the cover base may comprise a second material different than the first material; the first material may be softer than the second material. The cover layer may provide the cover surface; the cover layer may comprise a projection configured to present the input device at the cover surface. The cover layer may provide the cover surface; the cover layer may comprise at least one of (a) a raised feature; (b) a depressed feature; (c) an icon IC. The cover layer may be configured to deform as the button is depressed. The cover surface may comprise (a) a surface of the core of the cover base and (b) a surface of the cover layer. The cover surface may comprise a surface of the core of the cover base projecting above a surface of the cover layer. The core of the cover base may provide the cover surface for the input device. The input device may comprise at least one of (a) a sensor SN; (b) a capacitive touch sensor; (c) a capacitive touch film. The cover base may comprise a runner RN configured to connect the core of the cover base and the perimeter of the cover base. The component may comprise a circuit board CB. The circuit board may comprise a sensor SN and/or a light source such as a light-emitting diode LED.

According to an exemplary embodiment as shown schematically in FIGS. 18A-18C and 30, the cover structure may comprise a decorative layer DL on the cover layer. The decorative layer may comprise an aperture configured to present the input device at the cover surface. The aperture may comprise at least one of (a) a depressed feature; (b) an icon IC. The decorative layer may comprise a material different than a material of the cover layer. The material of the decorative layer may comprise a color different than a color of the material of the cover layer. The aperture may be configured to present an icon IC comprising the color of the cover layer. The decorative layer may comprise an aperture configured to transmit light L from a light source shown schematically as a light-emitting diode LED to the cover surface. The aperture may not be noticeably visible (at casual observance) on the surface of the cover when not illuminated (e.g. when “dead-fronted”) by the light source. The decorative layer may provide the cover surface; the decorative layer may be configured to present the input device at the cover surface. The decorative layer may provide the cover surface; the decorative layer may comprise at least one of (a) a raised feature; (b) a depressed feature; (c) an icon IC. The decorative layer may comprise a laminate. The decorative layer may be laminated on the cover layer. The decorative layer may comprise at least one of (a) a paint material; (b) an ink material. The decorative layer may comprise a depressed feature formed by removal of a portion of the at least one of (a) the paint material; (b) the ink material. The decorative layer may comprise an opaque material. The cover layer may comprise a light-transmissive material; the cover base may comprise a light-transmissive material.

According to an exemplary embodiment, the cover layer may comprise at least one of (a) an injection molded polypropylene; (b) a generally transparent resin material; (c) a light-transmissive material; (d) a PC material; (e) an ABS material; (f) a nylon material; (g) a clear amorphous material; (h) a clarified resin. The cover base may comprise at least one of (a) an injection molded polypropylene; (b) a generally transparent resin material; (c) a light-transmissive material; (d) a PC material; (e) an ABS material; (f) a nylon material; (g) a clear amorphous material; (h) a clarified resin.

According to an exemplary embodiment as shown schematically in FIGS. 1D and 4-7, the component may comprise a user interface system UIS configured to present the user interface at the cover surface comprising (a) a light display configured to transmit light L from a light source and (b) the input device. The user interface may not be noticeably visible (at casual observance) on the cover surface when not illuminated (e.g. when “dead-fronted”) by the light source. The cover structure may comprise a decorative layer DL on the cover layer; the decorative layer may comprise an aperture configured to transmit light L from the light source to present the input device at the cover surface. The aperture may comprise at least one of (a) a depressed feature; (b) an icon IC. The decorative layer may comprise a color different than a color the cover layer; the aperture may be configured to present an illuminated icon comprising the color of the cover layer. The decorative layer may comprise an opaque material; the cover layer may comprise a light-transmissive material; the cover base may comprise a light-transmissive material. The cover layer may comprise a light-transmissive material; the cover base may comprise an opaque material; the cover layer may be configured to form an illuminated border around the core of the cover base. The cover layer may comprise a light-transmissive material; the cover base may comprise an opaque material; the cover layer may be configured to transmit light L from the light source between the core of the cover base and the perimeter of the cover base. The input device may comprise a light guide LG between the light source and the core of the cover base. The light guide may be configured to transmit light L from the light source to the core of the cover base. The component may comprise a sensor SN between the light guide and the core of the cover base. The sensor may comprise at least one of (a) a capacitive touch sensor; (b) a capacitive touch film.

Figure 32:
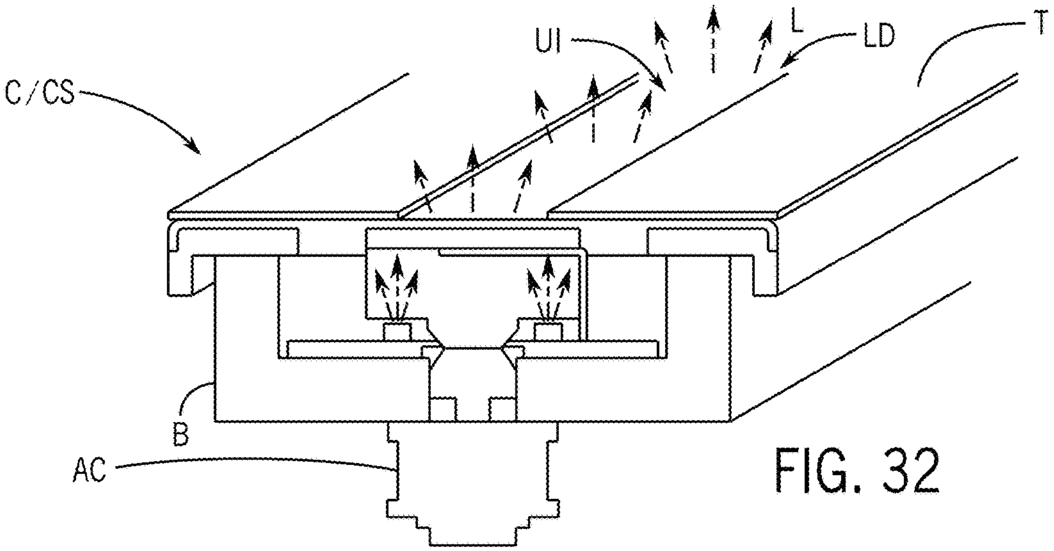
FIG. 32 is a schematic section perspective view of a component for a vehicle interior according to an exemplary embodiment.
Figure 33:
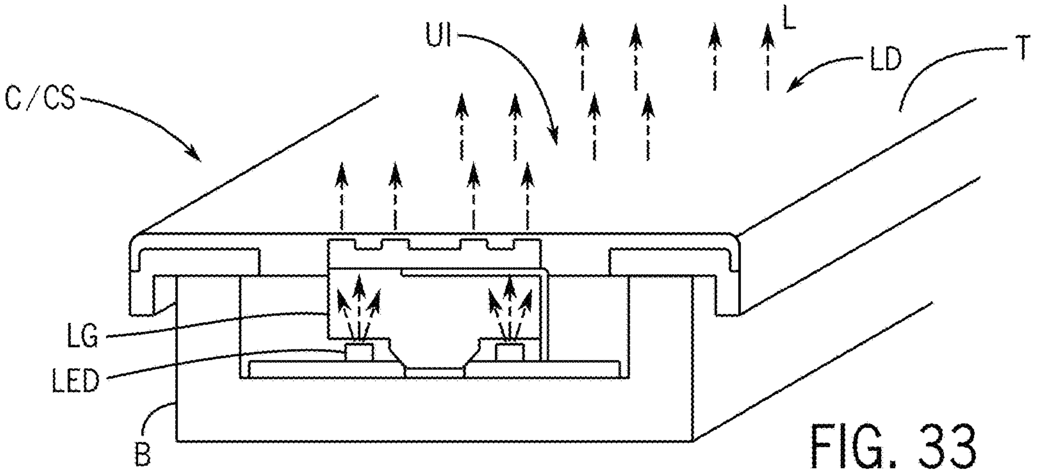
FIG. 33 is a schematic section perspective view of a component for a vehicle interior according to an exemplary embodiment.

According to an exemplary embodiment as shown schematically in FIG. 32, the component may comprise a user interface system configured to present the user interface at the cover surface comprising (a) an actuator AC configured to provide feedback at the cover surface and (b) the input device. The actuator may be configured to provide at least one of (a) a force at the cover surface; (b) vibration at the cover surface; and/or (c) motion at the cover surface. The cover layer may be configured to facilitate vibration of the core of the cover base. The actuator may be coupled to the core of the cover base. The actuator may be configured to deform the cover layer between the core of the cover base and the perimeter of the cover base. The user interface system may comprise a light display configured to transmit light L from a light source. The cover structure may comprise a decorative layer on the cover layer; the decorative layer may comprise an aperture configured to transmit light L from the light source to present the light display. The cover structure may comprise a decorative layer on the cover layer; the decorative layer may be configured to present an icon illuminated by the light source. The cover layer may be configured to transmit light L from the light source between the core of the cover base and the perimeter of the cover base. The input device may comprise a light guide LG between the light source and the core of the cover base. The light guide may be configured to transmit light L from the light source to the core of the cover base. The light guide may be coupled to the actuator. The light guide may be configured to transmit at least one of (a) a force from the actuator to the cover surface; (b) vibration from the actuator to the cover surface; and/or (c) motion from the actuator to the cover surface. The component may comprise a sensor SN between the light guide and the core of the cover base. The sensor may comprise at least one of (a) a capacitive touch sensor; (b) a capacitive touch film.

Figure 34A:
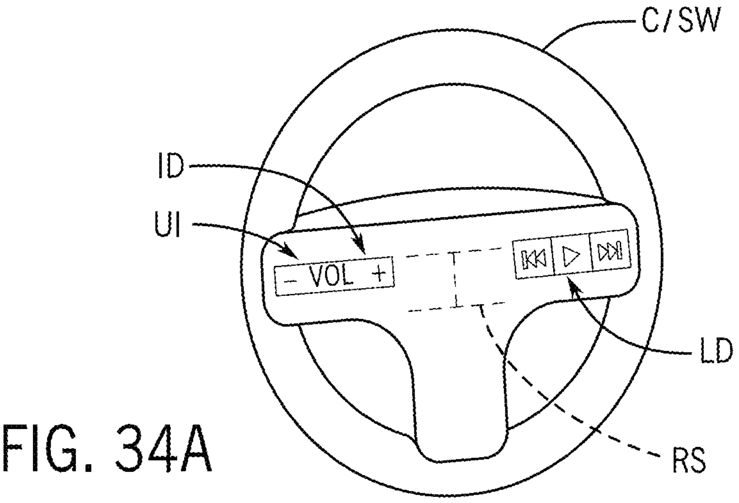
FIGS. 34A through 34C are schematic perspective views of a component for a vehicle interior according to an exemplary embodiment.
Figure 34B:
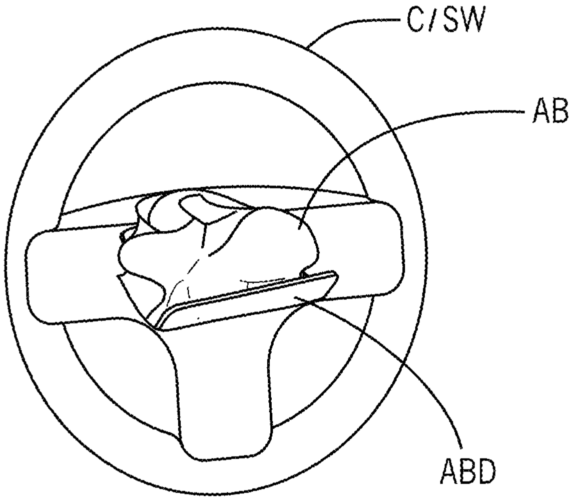
Figure 34C:
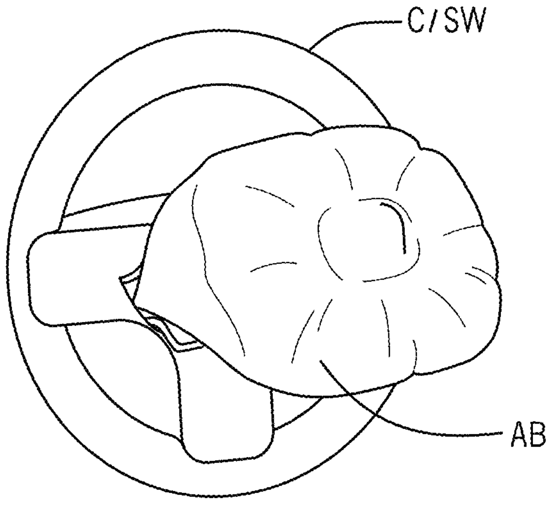
Figure 35:
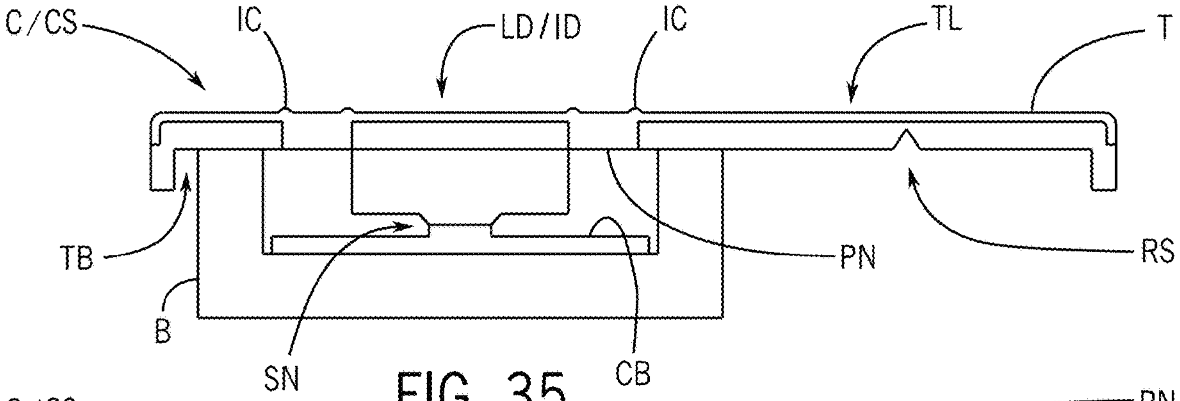
FIG. 35 is a schematic partial section view of a component for a vehicle interior according to an exemplary embodiment.
Figure 36:
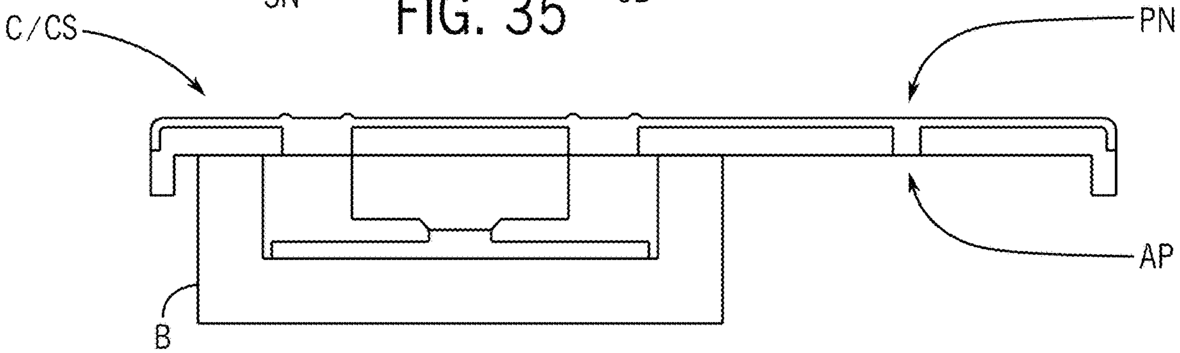
FIG. 36 is a schematic partial section view of a component for a vehicle interior according to an exemplary embodiment.
Figure 37:
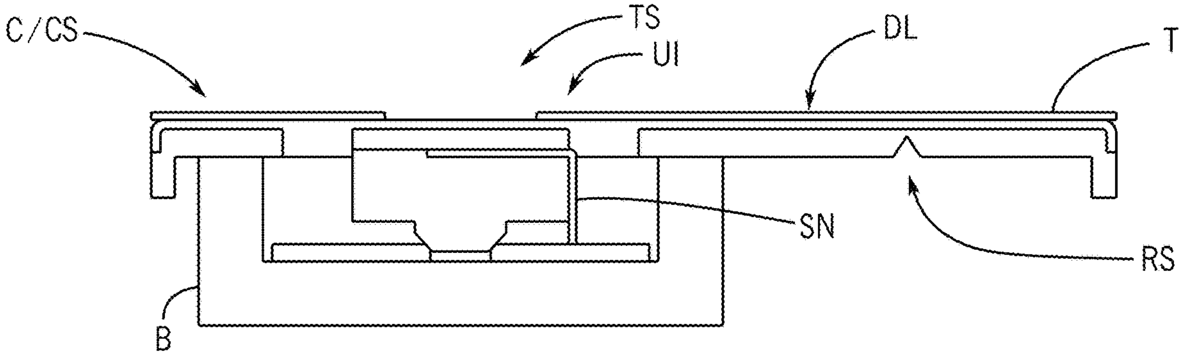
FIG. 37 is a schematic partial section view of a component for a vehicle interior according to an exemplary embodiment.
Figure 38:
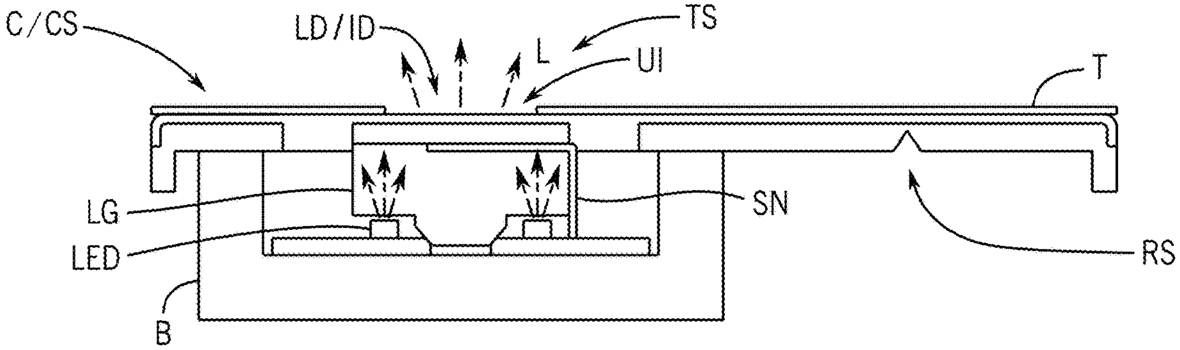
FIG. 38 is a schematic partial section view of a component for a vehicle interior according to an exemplary embodiment.
Figure 39A:
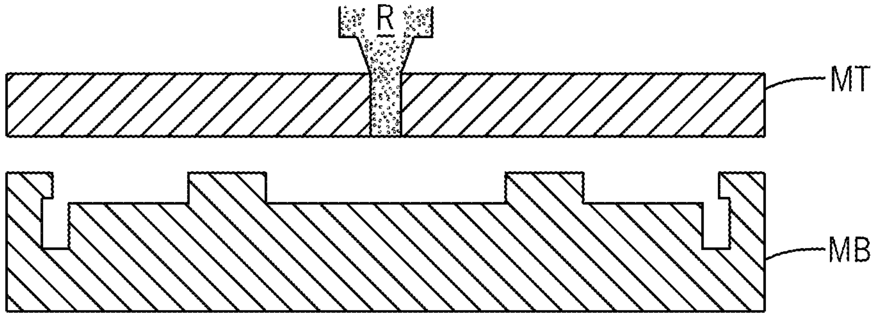
FIGS. 39A through 39F are schematic section views of a method of manufacturing a component for a vehicle interior according to an exemplary embodiment.
Figure 39B:
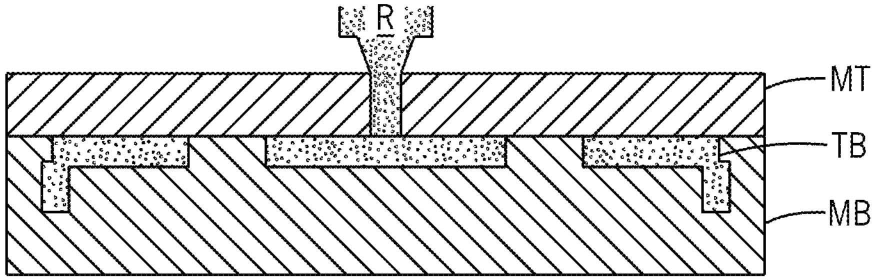
Figure 39C:
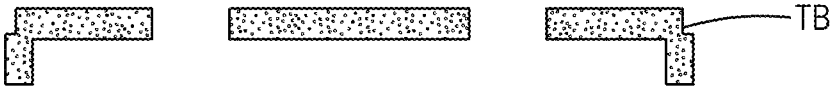
Figure 39D:
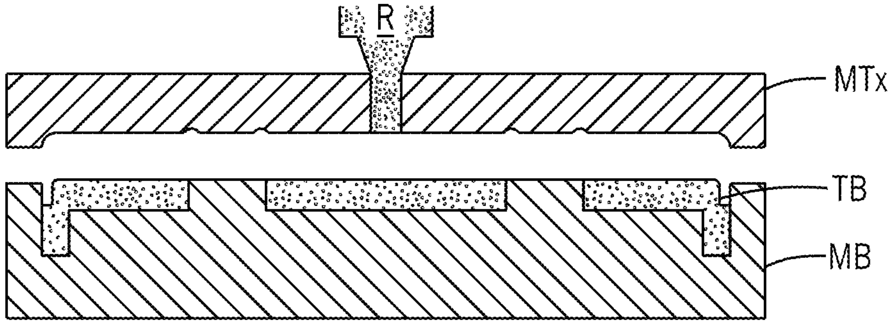
Figure 39E:
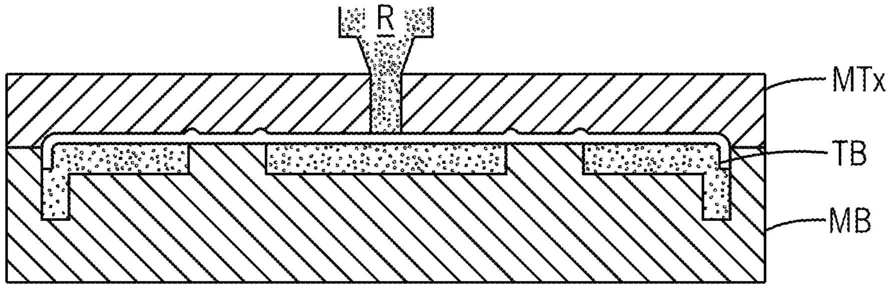
Figure 39F:
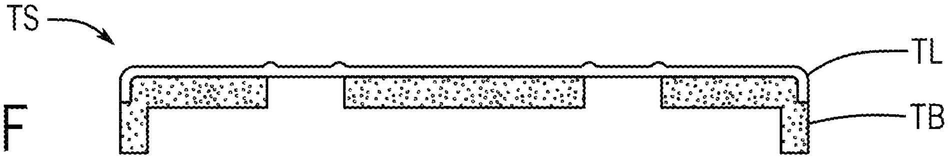
Figure 40:
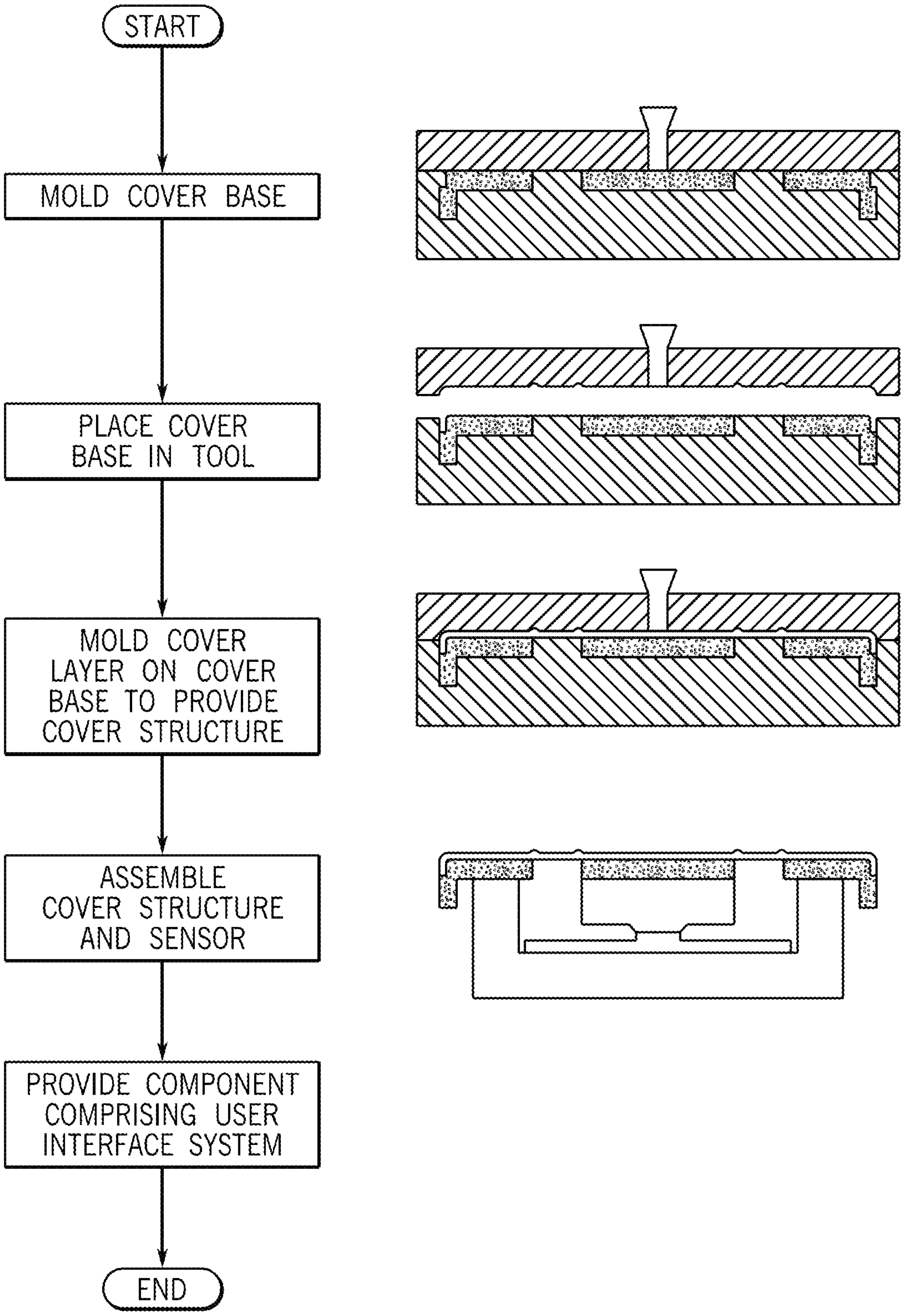
FIG. 40 is a schematic flow diagram of a method of constructing/assembling/manufacturing a component for a vehicle interior according to an exemplary embodiment.

According to an exemplary embodiment as shown schematically in FIGS. 34A-34C, a component C for a vehicle interior (such as a floor console as shown schematically in FIG. 4, a steering wheel as shown schematically in FIGS. 5 and 34A-34C, a door panel as shown schematically in FIG. 6, an instrument panel as shown schematically in FIG. 1C, a trim panel, etc.) may be configured to provide/support an airbag AB configured to be deployed through an opening into the vehicle interior. As shown schematically in FIGS. 34A-34C, the component may provide a weakened shape/zone shown as a recess RS to facilitate an airbag deployment through an airbag door ABD. The weakened shape/zone may comprise an "I" shape pattern. According to an exemplary embodiment, the weakened shape/zone may comprise an "H" shape pattern, a "U" shape pattern, a "bow tie" shape pattern, or any pattern suitable for airbag deployment.

According to an exemplary embodiment as shown schematically in FIGS. 34A-34C and 35-38, the cover structure may be configured to facilitate deployment of an airbag into the vehicle interior. The cover base and the cover layer may be configured to break apart to facilitate deployment of the airbag into the vehicle interior. The cover base may comprise a recess RS formed as an indentation in the rear side of the cover base; the recess may be configured to direct deployment of the airbag through the cover structure. The cover layer may be configured to prevent visibility of the recess in the cover base. The cover structure may comprise a decorative layer DL on the cover layer; the decorative layer may be configured to prevent visibility of the recess in the cover base. The cover base may comprise a through hole (shown schematically in FIG. 36 as aperture AP) configured to direct deployment of the airbag through the cover structure; the cover layer may be molded in the through hole (shown schematically as a projection PN in FIG. 36). The input device may comprise a light guide LG configured to transmit light from a light source to the core of the cover base.

According to an exemplary embodiment, the component may comprise at least one of (a) a steering wheel assembly; (b) a console; (c) a floor console; (d) a center console; (e) an instrument panel; (f) a door panel; (g) a dashboard; (h) a display; (i) an arm rest; (j) a cockpit.

Figure 41A:
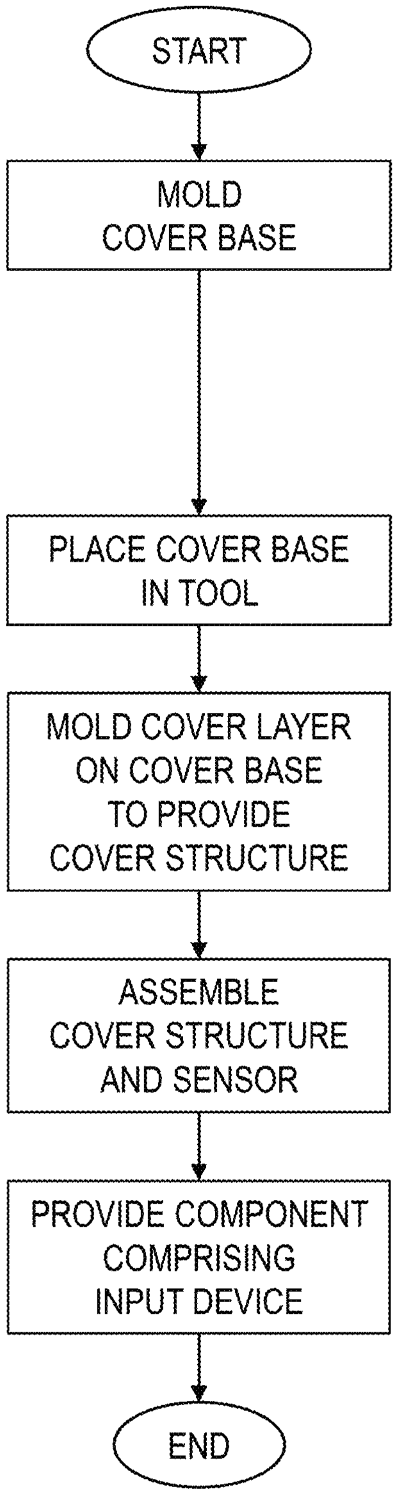
FIGS. 41A and 41B are schematic flow diagrams of methods of constructing/assembling/manufacturing a component for a vehicle interior according to an exemplary embodiment.

According to an exemplary embodiment as shown schematically in FIG. 41A, a process for producing a component for a vehicle interior may comprise molding a cover base, placing the cover base in a tool, molding a cover layer on the cover base to provide a cover structure, assembling the cover structure and a sensor, and providing the component comprising an input device.

Figure 41B:
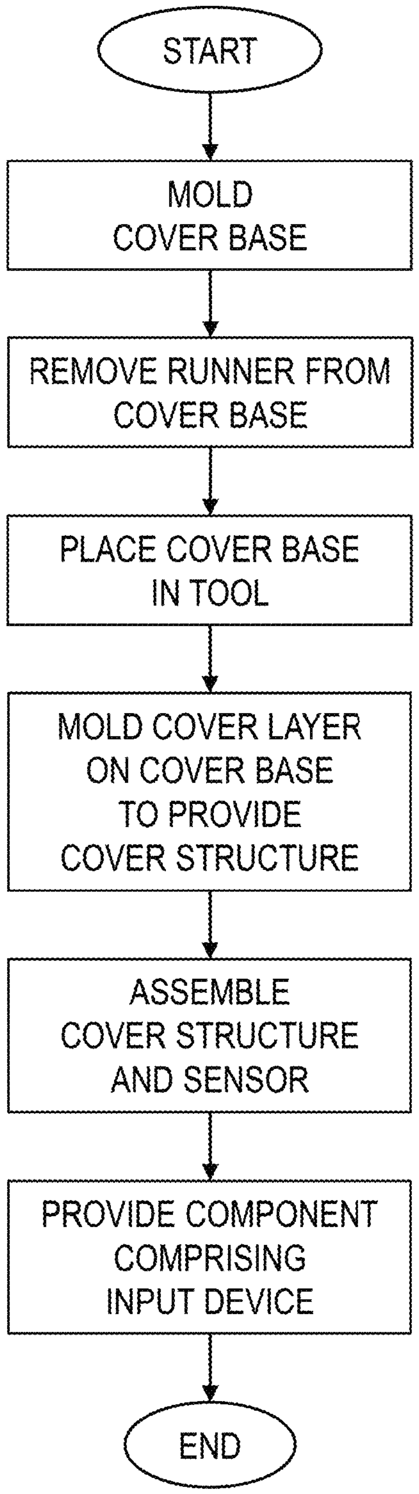

According to an exemplary embodiment as shown schematically in FIG. 41B, a process for producing a component for a vehicle interior may comprise molding a cover base, removing a runner from the cover base, placing the cover base in a tool, molding a cover layer on the cover base to provide a cover structure, assembling the cover structure and a sensor, and providing the component comprising an input device.

Figure 42A:
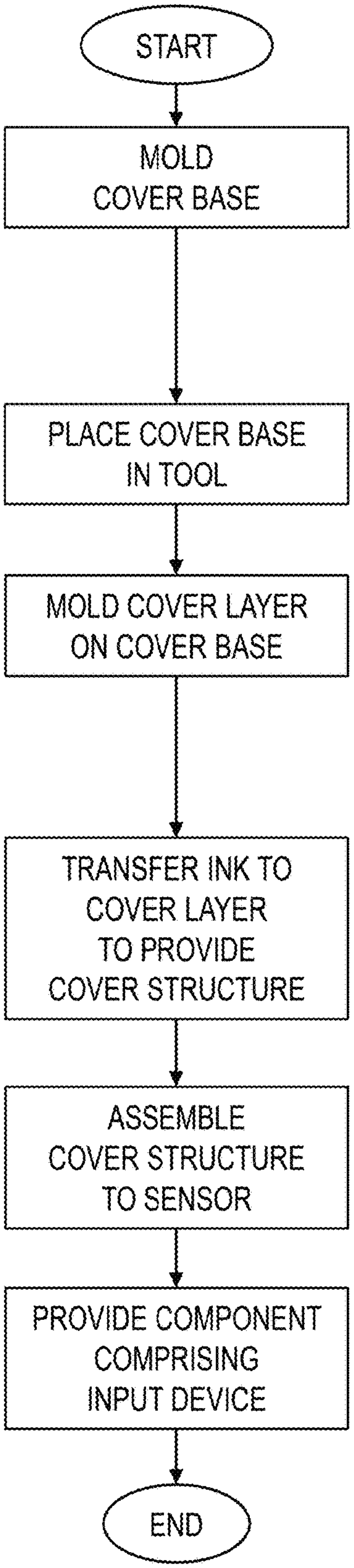
FIGS. 42A through 42C are schematic flow diagrams of methods of constructing/assembling/manufacturing a component for a vehicle interior according to an exemplary embodiment.

According to an exemplary embodiment as shown schematically in FIG. 42A, a process for producing a component for a vehicle interior may comprise molding a cover base, placing the cover base in a tool, molding a cover layer on the cover base, transferring ink to the cover layer to provide a cover structure, assembling the cover structure and a sensor, and providing the component comprising an input device.

Figure 42B:
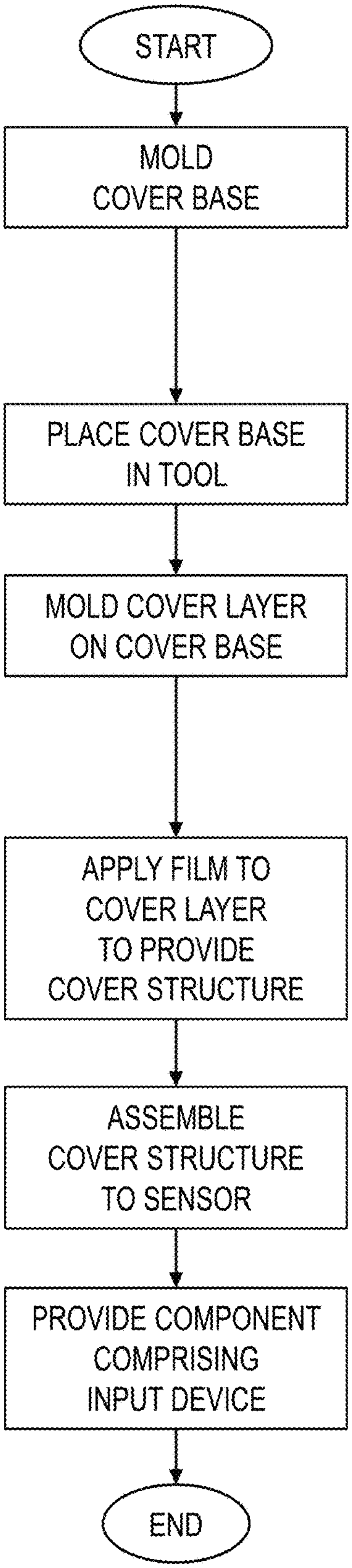

According to an exemplary embodiment as shown schematically in FIG. 42B, a process for producing a component for a vehicle interior may comprise molding a cover base, placing the cover base in a tool, molding a cover layer on the cover base, applying a film to the cover layer to provide a cover structure, assembling the cover structure and a sensor, and providing the component comprising an input device.

Figure 42C:
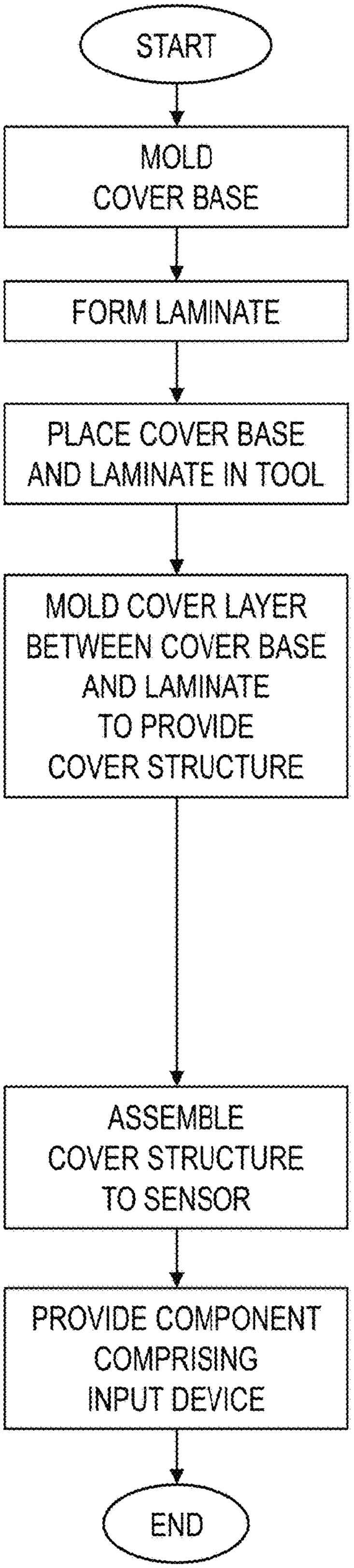

According to an exemplary embodiment as shown schematically in FIG. 42C, a process for producing a component for a vehicle interior may comprise molding a cover base, forming a laminate, placing the cover base and the laminate in a tool, molding a cover layer between the cover base and the laminate to provide a cover structure, assembling the cover structure and a sensor, and providing the component comprising an input device.

Figure 43A:
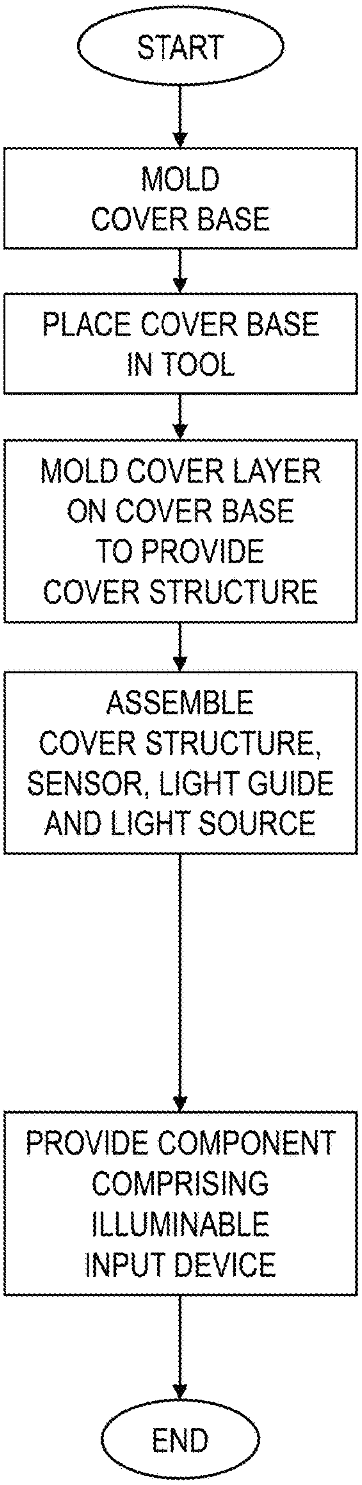
FIGS. 43A through 43C are schematic flow diagrams of methods of constructing/assembling/manufacturing a component for a vehicle interior according to an exemplary embodiment.

According to an exemplary embodiment as shown schematically in FIG. 43A, a process for producing a component for a vehicle interior may comprise molding a cover base, placing the cover base in a tool, molding a cover layer on the cover base to provide a cover structure, assembling the cover structure, a sensor, a light guide and a light source, and providing the component comprising an illuminable input device.

Figure 43B:
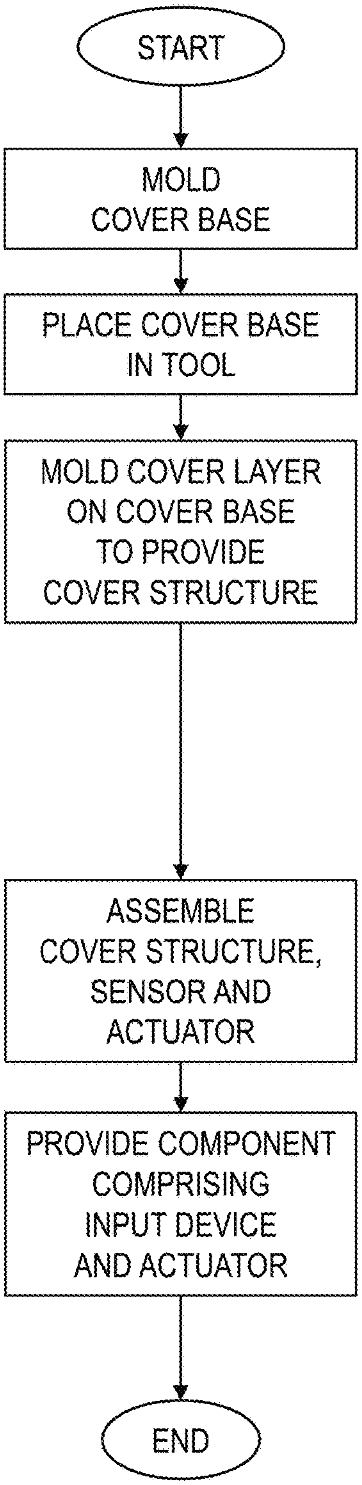

According to an exemplary embodiment as shown schematically in FIG. 43B, a process for producing a component for a vehicle interior may comprise molding a cover base, placing the cover base in a tool, molding a cover layer on the cover base to provide a cover structure, assembling the cover structure, a sensor and an actuator, and providing the component comprising an input device and an actuator.

Figure 43C:
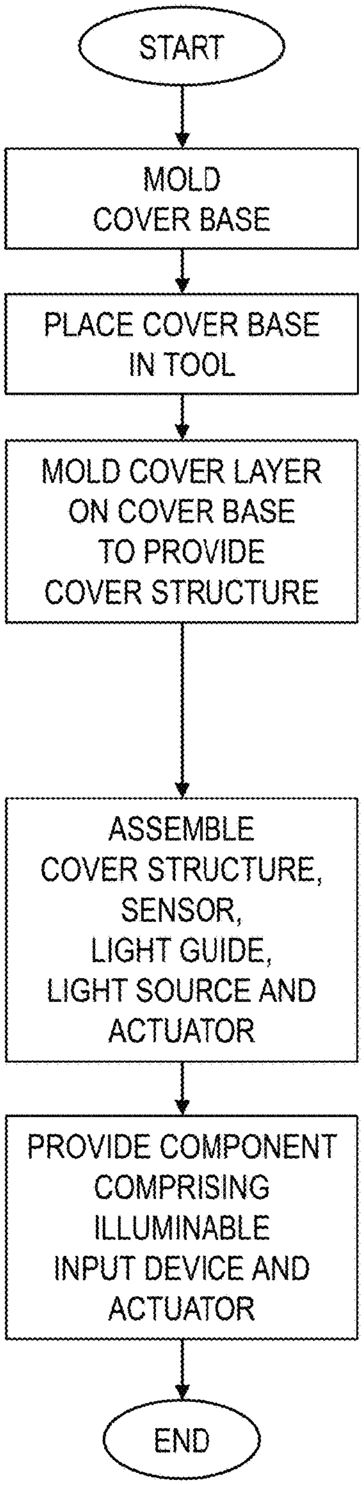

According to an exemplary embodiment as shown schematically in FIG. 43C, a process for producing a component for a vehicle interior may comprise molding a cover base, placing the cover base in a tool, molding a cover layer on the cover base to provide a cover structure, assembling the cover structure, a sensor, a light guide, a light source and an actuator, and providing the component comprising an illuminable input device and an actuator.

TABLE A

REFERENCE SYMBOL LIST

| REFERENCE SYMBOL | ELEMENT, PART OR COMPONENT |
|---|---|
| V | vehicle |
| I | interior |
| C | component |
| DP | door panel |
| SW | steering wheel |
| FC | floor console |
| IP | instrument panel |
| SZ | seat |
| OHP | overhead panel |
| AR | armrest |
| UIS | user interface system |
| UI | user interface (input device and/or output device) |
| VS | vehicle systems |
| MC | control module |
| VN | vehicle network |
| N | network |
| FM | functional module |
| ID | input device |
| LD | light display |
| FP | panel/fiber panel |
| B | base (base structure) |
| SB | substrate |
| TS | cover structure (cover) |
| TB | cover base |
| TL | cover layer |
| CR | core region/section (of cover base) |
| PM | perimeter region/section (of cover base) |
| AP | aperture |
| PN | projection |
| RN | connector/runner (e.g. web/material connecting core and perimeter of cover base) |
| CB | circuit/circuit board |
| T | cover surface |
| DL | decorative layer |
| IC | icon |
| SN | sensor/detector |
| AG | gap/space |
| LED | LED/light arrangement |
| L | light |
| LG | light guide |
| AC | actuator |

TABLE A-continued

REFERENCE SYMBOL LIST

| REFERENCE SYMBOL | ELEMENT, PART OR COMPONENT |
|---|---|
| RS | recess |
| ABD | airbag door |
| AB | airbag |
| MT | mold top |
| MB | mold bottom |
| R | resin |
| MTx | mold top |
| CS | composite structure |

It is important to note that the present inventions (e.g. inventive concepts, etc.) have been described in the specification and/or illustrated in the FIGURES of the present patent document according to exemplary embodiments; the embodiments of the present inventions are presented by way of example only and are not intended as a limitation on the scope of the present inventions. The construction and/or arrangement of the elements of the inventive concepts embodied in the present inventions as described in the specification and/or illustrated in the FIGURES is illustrative only. Although exemplary embodiments of the present inventions have been described in detail in the present patent document, a person of ordinary skill in the art will readily appreciate that equivalents, modifications, variations, etc. of the subject matter of the exemplary embodiments and alternative embodiments are possible and contemplated as being within the scope of the present inventions; all such subject matter (e.g. modifications, variations, embodiments, combinations, equivalents, etc.) is intended to be included within the scope of the present inventions. It should be noted that various/other modifications, variations, substitutions, equivalents, changes, omissions, etc. may be made in the configuration and/or arrangement of the exemplary embodiments (e.g. in concept, design, structure, apparatus, form, assembly, construction, means, function, system, process/method, steps, sequence of process/method steps, operation, operating conditions, performance, materials, composition, combination, etc.) without departing from the scope of the present inventions; all such subject matter (e.g. modifications, variations, embodiments, combinations, equivalents, etc.) is intended to be included within the scope of the present inventions. The scope of the present inventions is not intended to be limited to the subject matter (e.g. details, structure, functions, materials, acts, steps, sequence, system, result, etc.) described in the specification and/or illustrated in the FIGURES of the present patent document. It is contemplated that the claims of the present patent document will be construed properly to cover the complete scope of the subject matter of the present inventions (e.g. including any and all such modifications, variations, embodiments, combinations, equivalents, etc.); it is to be understood that the terminology used in the present patent document is for the purpose of providing a description of the subject matter of the exemplary embodiments rather than as a limitation on the scope of the present inventions.

It is important to note that according to exemplary embodiments the present inventions may comprise conventional technology (e.g. as implemented and/or integrated in exemplary embodiments, modifications, variations, combinations, equivalents, etc.) or may comprise any other applicable technology (present and/or future) with suitability and/or capability to perform the functions and processes/operations described in the specification and/or illustrated in the FIGURES. All such technology (e.g. as implemented in embodiments, modifications, variations, combinations, equivalents, etc.) is considered to be within the scope of the present inventions of the present patent document.

The invention claimed is:

1. A component for a vehicle interior configured to present a user interface comprising:

a composite structure comprising a base structure and a cover structure;

a functional module configured to operate the user interface for the composite structure;

wherein the user interface is configured to comprise an input device and/or an output device;

wherein the base structure is configured to support the cover structure;

wherein the cover structure comprises a cover layer and a cover base;

wherein the cover base comprises a core region and a perimeter region;

wherein the cover base comprises a generally rigid material;

wherein the cover layer is molded on the cover base;

wherein the cover structure with the core region and the perimeter region is configured to present the input device of the user interface;

wherein the functional module is configured to present the user interface at the cover structure of the composite structure.

2. The component of claim 1 wherein the functional module is provided at the base structure of the composite structure.

3. The component of claim 1 wherein the user interface comprises the input device and an output device.

4. The component of claim 1 wherein the input device comprises a sensor and/or a button and/or a switch.

5. The component of claim 1 wherein the input device is integrated with the output device.

6. The component of claim 1 wherein the input device comprises an illuminable object and/or the output device comprises an illuminable object; wherein the illuminable object comprises an icon and/or a light and/or a light display.

7. The component of claim 1 wherein the base structure comprises a carrier and/or a substrate.

8. The component of claim 1 wherein the cover structure comprises the cover base and the cover layer and a cover surface; wherein the cover layer comprises a generally compressible material.

9. The component of claim 1 wherein the cover layer comprises a projection configured to fit within a recess in the cover base.

10. The component of claim 1 wherein the cover structure comprises an integrally-formed structure.

11. The component of claim 1 wherein the cover layer comprises a light-transmissive material; wherein the cover base comprises an opaque material.

12. The component of claim 1 wherein the cover structure comprises a decorative layer.

13. The component of claim 11 wherein the decorative layer comprises an opaque material; wherein the cover layer comprises a light-transmissive material; wherein the cover base comprises a light-transmissive material.

14. The component of claim 1 wherein the cover structure with the core region and the perimeter region is configured to present the output device of the user interface.

15. The component of claim 1 wherein the functional module is configured to operate at least one of a sensor and/or a switch and/or a detector and/or a light display and/or a display panel and/or a control panel and/or a transducer and/or a haptics actuator and/or a haptics transducer.

16. A component for a vehicle interior configured to present a user interface comprising:

a composite structure comprising a cover structure;

wherein the user interface is configured to comprise an input device and an output device;

wherein the cover structure comprises a cover layer and a cover base;

wherein the cover base comprises a core region and a perimeter region;

wherein the cover base comprises a generally rigid material;

wherein the cover structure with the core region and the perimeter region is configured to present the input device of the user interface;

wherein the cover structure with the core region and the perimeter region is configured to present the output device of the user interface;

wherein the input device comprises a sensor;

wherein the output device comprises a light.

17. The component of claim 16 wherein the composite structure comprises a cover surface.

18. The component of claim 17 wherein the cover base comprises a core region and a perimeter region; wherein the input device comprises a button presented at the core region; wherein the output device comprises an icon presented at the core region.

19. The component of claim 16 further comprising a user interface system comprising a functional module configured to operate the user interface for the composite structure.

20. A component for a vehicle interior configured to present a user interface comprising:

a composite structure comprising a cover structure comprising a cover base, a cover layer and a cover surface;

wherein the cover structure is configured to provide the user interface;

wherein the user interface comprises an input device;

wherein the cover layer is configured to cover at least a portion of the cover base;

wherein the cover base comprises a generally rigid material;

wherein the cover base of the cover structure comprises a core and a perimeter;

wherein the core of the cover base provides the cover surface for the input device material;

wherein the core of the cover base of the cover structure is configured to present the input device for the user interface;

wherein the composite structure comprises a base structure configured to support the cover structure;

wherein the base structure comprises a functional module structure under the cover base comprising a functional module configured to present the user interface.

* * * * *